(12) United States Patent
Hahn

(10) Patent No.: US 12,530,209 B2
(45) Date of Patent: Jan. 20, 2026

(54) SYSTEMS AND METHODS FOR RENDERING AND RETAINING APPLICATION DATA ASSOCIATED WITH A PLURALITY OF APPLICATIONS WITHIN A GROUP-BASED COMMUNICATION SYSTEM

(71) Applicant: Salesforce, Inc., San Francisco, CA (US)

(72) Inventor: Michael Hahn, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/513,447

(22) Filed: Nov. 17, 2023

(65) Prior Publication Data
US 2024/0103889 A1    Mar. 28, 2024

Related U.S. Application Data

(63) Continuation of application No. 17/493,371, filed on Oct. 4, 2021, now Pat. No. 11,861,380, which is a continuation of application No. 16/949,223, filed on Oct. 20, 2020, now Pat. No. 11,138,025.

(60) Provisional application No. 62/923,987, filed on Oct. 21, 2019.

(51) Int. Cl.
*G06F 9/451* (2018.01)
*G06F 8/36* (2018.01)
*G06F 8/38* (2018.01)

(52) U.S. Cl.
CPC ............... *G06F 9/451* (2018.02); *G06F 8/36* (2013.01); *G06F 8/38* (2013.01)

(58) Field of Classification Search
None
See application file for complete search history.

(56) References Cited

U.S. PATENT DOCUMENTS

| 5,579,472 | A  | * | 11/1996 | Keyworth, II | H04M 1/2473 340/7.29 |
| 7,624,439 | B2 | * | 11/2009 | Koestler | G06F 21/62 726/16 |
| 8,219,133 | B2 | * | 7/2012  | Counts | H04W 4/08 709/227 |
| 8,843,853 | B1 | * | 9/2014  | Smoak | H04L 67/52 715/830 |
| 9,632,851 | B1 | * | 4/2017  | Johansson | G06F 3/0482 |

(Continued)

OTHER PUBLICATIONS

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

(Continued)

*Primary Examiner* — Anil K Bhargava
(74) *Attorney, Agent, or Firm* — Lee & Hayes, P.C.

(57) ABSTRACT

Various examples are directed to systems, methods, and apparatuses for providing an interactive developer interface of a group-based communication system. Various examples are directed to systems, methods, and apparatuses for consolidating application data associated with an application within a group-based communication interface. Various examples are directed to systems, methods, and apparatuses for indexing processing actions associated with a plurality of applications.

20 Claims, 19 Drawing Sheets

(56) References Cited

U.S. PATENT DOCUMENTS

| | | | |
|---|---|---|---|
| 10,637,815 B2 | | 4/2020 | Goenka et al. |
| 11,068,127 B2* | | 7/2021 | Wang .................. G06F 3/04847 |
| 2010/0333131 A1* | | 12/2010 | Parker ................ H04N 21/2347 |
| | | | 725/63 |
| 2012/0276883 A1* | | 11/2012 | Counts .................. H04W 8/186 |
| | | | 455/566 |
| 2013/0339873 A1* | | 12/2013 | Hrastnik ............... H04L 51/046 |
| | | | 715/752 |
| 2016/0156584 A1* | | 6/2016 | Hum ..................... G06F 3/0482 |
| | | | 715/752 |
| 2016/0241609 A1* | | 8/2016 | Xin ........................ H04L 67/125 |
| 2016/0299672 A1* | | 10/2016 | Lindenberg ........... H04L 65/403 |
| 2017/0185592 A1* | | 6/2017 | Frei ......................... H04N 21/84 |
| 2017/0228266 A1* | | 8/2017 | Johansson ............. G06F 21/606 |
| 2017/0277424 A1* | | 9/2017 | Witkowski ........... G06Q 10/107 |
| 2017/0293479 A1* | | 10/2017 | Kumar ................ G06F 9/44505 |
| 2018/0248996 A1* | | 8/2018 | Johnson .................. H04W 4/08 |
| 2018/0287982 A1* | | 10/2018 | Draeger ................ H04L 51/216 |
| 2019/0129575 A1* | | 5/2019 | Wang ........................ G06F 9/451 |
| 2020/0106731 A1* | | 4/2020 | Goenka ................. H04L 51/043 |
| 2021/0117211 A1 | | 4/2021 | Hahn |
| 2022/0027175 A1 | | 1/2022 | Hahn |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Adrienne LaFrance, "The Triumph of Email", Atlantic Online, Lexisnexis, https://advance.lexis.com/api/permalink/32d7ddd9-d4c1-4a73-86f7-08ab5842ide6/?context=1000516, (dated Jan. 6, 2016) 6 pages.

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications", Fujitsu Sci. Tech. J., 36, 2, (Dec. 2000) pp. 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 3 pages.

Office Action for U.S. Appl. No. 17/493,371, mailed on Mar. 30, 2023, Michael Hahn, "Systems And Methods For Rendering And Retaining Application Data Associated With A Plurality Of Applications Within A Group-Based Communication System", 12 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c> (dated Jun. 2, 2015, 3;25 PM), 4 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

* cited by examiner

SYSTEMS AND METHODS FOR RENDERING AND RETAINING APPLICATION DATA ASSOCIATED WITH A PLURALITY OF APPLICATIONS WITHIN A GROUP-BASED COMMUNICATION SYSTEM

PRIORITY

This application is a continuation of and claims priority to U.S. patent application Ser. No. 17/493,371, filed Oct. 4, 2021, and entitled "Systems And Methods For Rendering And Retaining Application Data Associated With A Plurality Of Applications Within A Group-Based Communication System," which is a continuation of and claims priority to U.S. patent application Ser. No. 16/949,223, filed Oct. 20, 2020, and entitled "Systems And Methods For Rendering And Retaining Application Data Associated With A Plurality Of Applications Within A Group-Based Communication System," now known as U.S. Pat. No. 11,138,025, which issued on Oct. 5, 2021, which claims priority to U.S. Provisional Patent Application No. 62/923,987, filed Oct. 21, 2019, and entitled "Systems And Methods For Rendering And Retaining Application Data Associated With A Plurality Of Applications Within A Group-Based Communication System," the entire contents of both applications are incorporated herein by reference.

BACKGROUND

Systems have been provided for rendering and retaining application data associated with a plurality of applications within a group-based communication system.

Through applied effort, ingenuity, and innovation many deficiencies of such systems have been solved by developing solutions that are in accordance with the examples as discussed herein, many examples of which are described in detail herein.

BRIEF DESCRIPTION OF THE DRAWINGS

Reference will now be made to the accompanying drawings, which are not necessarily drawn to scale.

DETAILED DESCRIPTION

Figure 1:
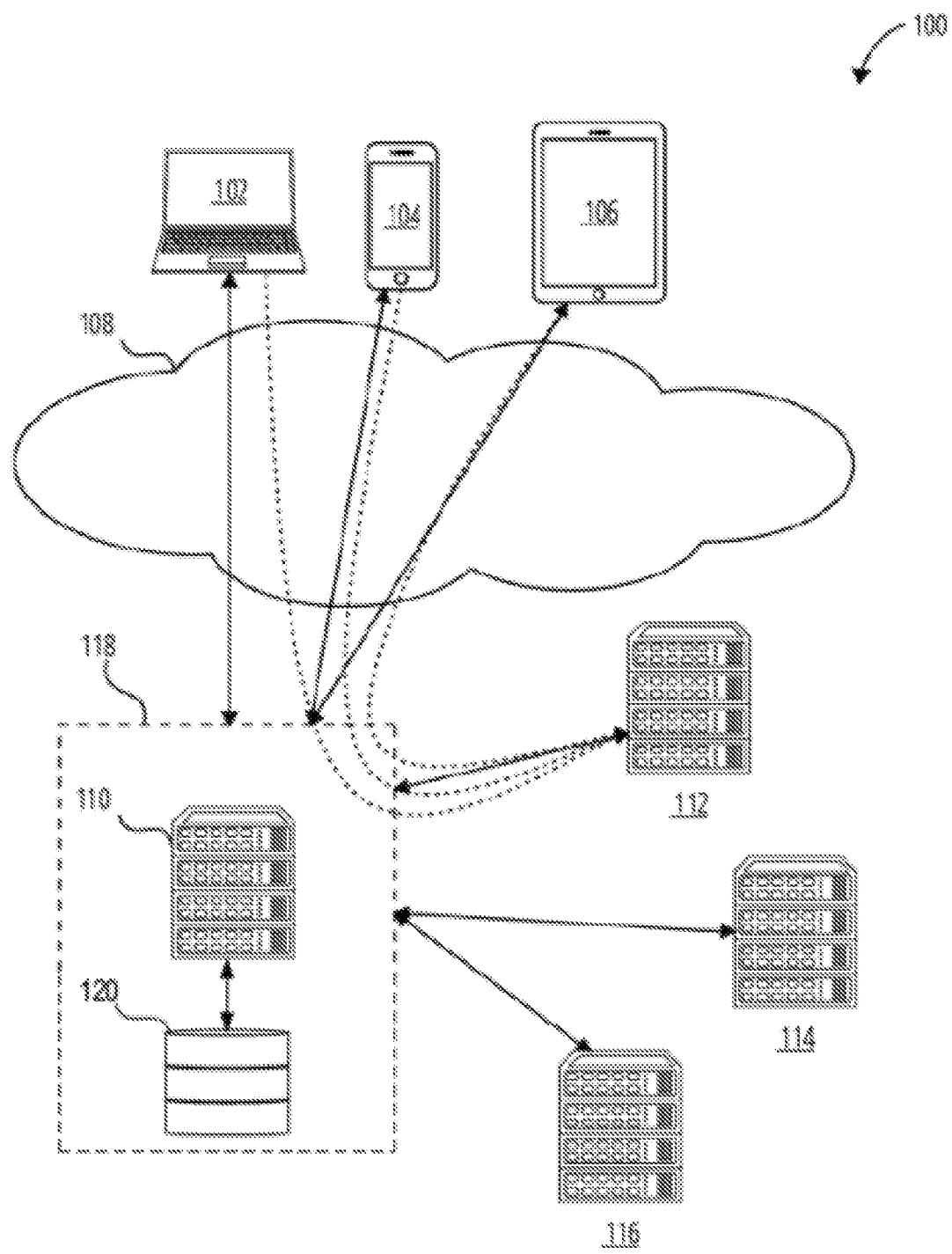
FIG. 1 illustrates a schematic view of a system encompassing a group-based communication system in communication with one or more client devices in accordance with one embodiment.

Various examples are directed to systems and methods for enabling a robust implementation of an application and the functionalities thereof throughout a group-based communication system by facilitating the production, centralization, and organization of application-specific data defined by uniform system-defined specifications. In at least one example, the group-based communication system can be a channel-based messaging system or any other system that facilitates communication between users in a same organization and/or between users across organizations.

A first embodiment is directed to a system configured for consolidating application data associated with an application within a group-based communication interface, the system comprising at least one processor, and at least one non-transitory memory comprising instructions that, with the at least one processor, cause the system to: upon detecting a trigger event associated with an application via a group-based communication interface, retrieve application data associated with the application from a group-based communication repository, the application data comprising application contextual data and application home interface contextual data; generate an application home interface associated with the application based at least in part on the application data retrieved from the group-based communication repository, the application home interface comprising: one or more application home interface pages configured to display at least a portion of the application data; and one or more executable processing action elements, each executable processing action element being associated with a respective processing action of the application and configured to initialize the processing action respectively associated therewith upon a selection of the executable processing action elements by a client device; and transmit the application home interface to the client device for rendering within the group-based communication interface via a display device of the client device.

In various examples, the application home interface further comprises a user engagement pane configured to display application data received from an application system associated with the application; wherein the user engagement pane is configured to reflect execution of one or more user engagement pane instructions associated with the application, the one or more user engagement pane instructions corresponding to one or more functionalities of the application.

In some examples, the one or more processors are further configured to: receive from the application system a notification signal associated with at least one of the one or more user engagement blocks defined by the user engagement pane upon the occurrence of a notification triggering event, the notification signal corresponding at least in part to the one or more user engagement pane instructions associated with the at least one of the user engagement blocks, wherein the notification triggering event is based at least in part on user engagement with the application home interface; and render within the user engagement pane the notification signal associated with at least a portion of the application data and the at least one user engagement blocks. In various examples, each of the one or more executable processing action elements are arranged relative to one another based at least in part on an executable processing action element priority order, wherein the executable processing action element priority order defines the organization of each of the one or more executable processing action elements relative to the other executable processing action elements. Further, in some examples, the executable processing action element priority order is based at least in part on at least one of environmental contextual data and application contextual data associated with a user identifier associated with the client device.

In some examples, the one or more processers are further configured to: receive from the client device a selection of an executable action interaction element of the one or more executable processing action elements displayed within the application home interface; upon receipt of a selection of an executable processing action element, retrieve processing action data associated with the selected processing action from the group-based communication repository; generate a processing action execution data packet comprising processing action routing data and payload data, the processing action routing data is generated based at least in part on the processing action data and identifies (1) a processing action to be performed by the application system and (2) a client token identifying a client device requesting the processing action data, and the payload data comprising processing action execution data; and provide the processing action execution data packet to the application system to enable the application system to execute the selected processing action based at least in part on the payload data. In various examples, the one or more processors are further configured to: retrieve environmental contextual data generated for the client device from the group-based communication repository; and populate at least a portion of an interactive dialog based at least in part on the environmental contextual data.

In various examples, the one or more processors are further configured to: upon detecting a trigger event associated with the application home interface via the group-based communication interface, determine an initial page of the one or more application home interface pages for display based at least in part on detection of one or more of a previously unvisited indicator, a previously visited indicator, and an unread message indicator associated with the application home interface and a user identifier associated with the client device; and wherein transmitting the application home interface to the client device for rendering within the group-based communication interface via the display device of the client device comprises causing display of the initial page within the application home interface. In various examples, determining an initial page of the one or more application home interface pages for display comprises: detecting an unread message indicator associated with the application home interface identifier and the user identifier; upon detecting an unread message indicator associated with the application home interface identifier and the user identifier, selecting an application home interface message page as the initial page.

In some examples, the one or more processors are further configured to: collect application contextual data associated with an application identifier associated with the application, wherein the application contextual data is based on user interaction with the application within the group-based communication interface; and store the application contextual data associated with the application identifier within the group-based communication repository; and display within the application home interface at least a portion of the application contextual data retrieved from the group-based communication repository and application home configuration data generated as user input received from a developer client device associated with a developer user identifier associated with a developer user, the application, and the application contextual data.

In various examples, the one or more processors are further configured to: store application settings preference data within the group-based communication repository, the application settings preference data being associated with the application and a user identifier associated with the client device; and display, within the application home interface, at least a portion of the application settings preference data; wherein the application home interface comprises an interactive settings pane comprising one or more interactive settings pane inputs configured based at least in part on user input received from a developer client device associated with a developer user identifier associated with the application. Further, in various examples, the one or more processors are further configured to: provide an application settings data packet to the application system, the applications settings data packet comprising application settings routing data and payload data, wherein the application settings routing data identifies a configurable application functionality corresponding to application settings preference data received at the interactive settings pane to be stored by the application system, and the payload data comprises the application settings preference data.

Various examples are directed to methods for providing application data associated with an application within a group-based communication interface, an exemplary method comprising: upon detecting a trigger event associated with an application via a group-based communication interface, retrieving application data associated with the application from a group-based communication repository, the application data comprising application contextual data and application home interface contextual data; generating an application home interface associated with the application based at least in part on the application data retrieved from the group-based communication repository, the application home interface comprising: one or more application home interface pages configured to display at least a portion of the application data; and one or more executable processing action elements, each executable processing action element being associated with a respective processing action of the application and configured to initialize the processing action respectively associated therewith upon a selection of the executable processing action elements by a client device; and transmitting the application home interface to the client device for rendering within the group-based communication interface via a display device of the client device.

In some examples, the application home interface may further comprise a user engagement pane configured to display application data received from an application system associated with the application; wherein the user engagement pane may be configured to reflect execution of one or more user engagement pane instructions associated with the application, the one or more user engagement pane instructions corresponding to one or more functionalities of the application.

In various examples, an example method may further comprise receiving from the application system a notification signal associated with at least one of the one or more user engagement blocks defined by the user engagement pane upon the occurrence of a notification triggering event, the notification signal corresponding at least in part to the one or more user engagement pane instructions associated with the at least one of the user engagement blocks, wherein the notification triggering event may be based at least in part on user engagement with the application home interface; and rendering within the user engagement pane the notification signal associated with at least a portion of the application data and the at least one user engagement blocks.

In some examples, each of the one or more executable processing action elements may be arranged relative to one another based at least in part on an executable processing action element priority order, wherein the executable processing action element priority order defines an organization of each of the one or more executable processing action elements relative to the other executable processing action elements. Further, in various examples, the executable processing action element priority order may be based at least in part on at least one of environmental contextual data and application contextual data associated with a user identifier associated with the client device.

In various examples, an example method may further comprise receiving from the client device a selection of an executable processing action element of the one or more executable processing action elements displayed within the application home interface; upon receipt of the selection of the executable processing action element, retrieve processing action data associated with the selected processing action from the group-based communication repository; generating a processing action execution data packet comprising processing action routing data and payload data, the processing action routing data is generated based at least in part on the processing action data and identifies (1) a processing action to be performed by an application system associated with the application and (2) a client token identifying a client device requesting the processing action data, and the payload data comprising processing action execution data; and providing the processing action execution data packet to the application system to enable the application system to execute the selected processing action based at least in part on the payload data. Further, in some examples, an exemplary method may comprise retrieving environmental contextual data generated for the client device from the group-based communication repository; and populating at least a portion of an interactive dialog based at least in part on the environmental contextual data.

In various examples, an example method may further comprise, upon detecting a trigger event associated with the application home interface via the group-based communication interface, determining an initial page of the one or more application home interface pages for display based at least in part on detection of one or more of a previously unvisited indicator, a previously visited indicator, and an unread message indicator associated with the application home interface and a user identifier associated with the client device. Further, in various examples, transmitting the application home interface to the client device for rendering within the group-based communication interface via the display device of the client device may comprise causing display of the initial page within the application home interface. In various examples, determining an initial page of the one or more application home interface pages for display may comprise: detecting an unread message indicator associated with the application home interface and the user identifier; and upon detecting an unread message indicator associated with the application home interface and the user identifier, selecting an application home interface message page as the initial page.

In various examples, an example method may further comprise collecting application contextual data associated with an application identifier associated with the application, wherein the application contextual data is based on user interaction with the application within the group-based communication interface; storing the application contextual data associated with the application identifier within the group-based communication repository; and displaying within the application home interface at least a portion of the application contextual data retrieved from the group-based communication repository and application home configuration data generated as user input received from a developer client device associated with a developer user identifier associated with a developer user, the application, and the application contextual data.

In some examples, an example method may further comprise storing application settings preference data within the group-based communication repository, the application settings preference data being associated with the application and a user identifier associated with the client device; and displaying, within the application home interface, at least a portion of the application settings preference data. In various examples, the application home interface may comprise an interactive settings pane comprising one or more interactive settings pane inputs configured based at least in part on user input received from a developer client device associated with a developer user identifier associated with the application. In some examples, an example method may further comprise providing an application settings data packet to an application system associated with the application, the applications settings data packet comprising application settings routing data and payload data, wherein the application settings routing data may identify a configurable application functionality corresponding to application settings preference data received at the interactive settings pane to be stored by the application system, and the payload data comprises the application settings preference data.

Various examples are directed to a computer program product for providing application data associated with an application within a group-based communication interface, the computer program product comprising at least one processor, and at least one non-transitory memory comprising instructions that, with the at least one processor, cause the computer program product to: upon detecting a trigger event associated with an application via a group-based communication interface, retrieve application data associated with the application from a group-based communication repository, the application data comprising application contextual data and application home interface contextual data; generate an application home interface associated with the application based at least in part on the application data retrieved from the group-based communication repository, the application home interface comprising: one or more application home interface pages configured to display at least a portion of the application data; and one or more executable processing action elements, each executable processing action element being associated with a respective processing action of the application and configured to initialize the processing action respectively associated therewith upon a selection of the executable processing action elements by a client device; and transmit the application home interface to the client device for rendering within the group-based communication interface via a display device of the client device.

In some examples, the application home interface further may comprise a user engagement pane configured to display application data received from an application system associated with the application; wherein the user engagement pane is configured to reflect execution of one or more user engagement pane instructions associated with the application, the one or more user engagement pane instructions corresponding to one or more functionalities of the application. In various examples, the one or more processors are further configured to: receive from the application system a notification signal associated with at least one of the one or more user engagement blocks defined by the user engagement pane upon the occurrence of a notification triggering event, the notification signal corresponding at least in part to the one or more user engagement pane instructions associated with the at least one of the user engagement blocks, wherein the notification triggering event is based at least in part on user engagement with the application home interface; and render within the user engagement pane the notification signal associated with at least a portion of the application data and the at least one user engagement blocks.

In some examples, each of the one or more executable processing action elements may be arranged relative to one another based at least in part on an executable processing action element priority order, wherein the executable processing action element priority order may define the organization of each of the one or more executable processing action elements relative to the other executable processing action elements. In various examples, the executable processing action element priority order is based at least in part on at least one of environmental contextual data and application contextual data associated with a user identifier associated with the client device.

In some examples, the one or more processors may be further configured to: receive from the client device a selection of an executable processing action element of the one or more executable processing action elements displayed within the application home interface; upon receipt of the selection of the executable processing action element, retrieve processing action data associated with the selected processing action from the group-based communication repository; generate a processing action execution data packet comprising processing action routing data and payload data, the processing action routing data is generated based at least in part on the processing action data and identifies (1) a processing action to be performed by an application system associated with the application and (2) a client token identifying a client device requesting the processing action data, and the payload data comprising processing action execution data; and provide the processing action execution data packet to the application system to enable the application system to execute the selected processing action based at least in part on the payload data. In various examples, the one or more processors may be further configured to: retrieve environmental contextual data generated for the client device from the group-based communication repository; and populate at least a portion of an interactive dialog based at least in part on the environmental contextual data.

In various examples, the one or more processors may be further configured to: upon detecting a trigger event associated with the application home interface via the group-based communication interface, determine an initial page of the one or more application home interface pages for display based at least in part on detection of one or more of a previously unvisited indicator, a previously visited indicator, and an unread message indicator associated with the application home interface and a user identifier associated with the client device. In various examples, transmitting the application home interface to the client device for rendering within the group-based communication interface via the display device of the client device may comprise causing display of the initial page within the application home interface.

In some examples, determining an initial page of the one or more application home interface pages for display may comprise: detecting an unread message indicator associated with the application home interface and the user identifier; and upon detecting an unread message indicator associated with the application home interface and the user identifier, selecting an application home interface message page as the initial page.

In various examples, the one or more processors may be further configured to: collect application contextual data associated with an application identifier associated with the application, wherein the application contextual data is based on user interaction with the application within the group-based communication interface; store the application contextual data associated with the application identifier within the group-based communication repository; and display within the application home interface at least a portion of the application contextual data retrieved from the group-based communication repository and application home configuration data generated as user input received from a developer client device associated with a developer user identifier associated with a developer user, the application, and the application contextual data.

In various examples, the one or more processors may be further configured to: store application settings preference data within the group-based communication repository, the application settings preference data being associated with the application and a user identifier associated with the client device; and display, within the application home interface, at least a portion of the application settings preference data. In certain circumstances, the application home interface may comprise an interactive settings pane comprising one or more interactive settings pane inputs configured based at least in part on user input received from a developer client device associated with a developer user identifier associated with the application. In various examples, the one or more processors may be further configured to: provide an application settings data packet to an application system associated with the application, the applications settings data packet comprising application settings routing data and payload data, wherein the application settings routing data identifies a configurable application functionality corresponding to application settings preference data received at the interactive settings pane to be stored by the application system, and the payload data comprises the application settings preference data.

A second embodiment is directed to a system configured for providing an interactive developer interface of a group-based communication system, the system comprising at least one processor, and at least one non-transitory memory comprising instructions that, with the at least one processor, cause the system to: receive application data provided via an interactive developer interface from a developer client device, the application data comprising processing action data and user engagement pane data, wherein at least a portion of the processing action data defines a functionality of a processing action, and wherein at least a portion of the user engagement pane data comprises block data associated with one or more user engagement blocks configured to reflect execution of one or more user engagement pane instructions corresponding to one or more functionalities of an application; based at least in part on a determination that the processing action data satisfies a user interface criteria, generate one or more executable processing action elements for display with an application home interface associated with the application; and store the application data within a group-based communication repository; wherein the user engagement pane data is configured for display within the application user interface via the one or more user engagement blocks; and wherein the processing action data comprises processing action type data associated with the processing action. In various examples, the processing action is defined by one or more processing action characteristics, wherein the one or more processing action characteristics comprise a processing action identifier, one or more processing action parameters, and a processing action type, wherein the one or more processing action parameters define one or more input variables associated with the processing action and configured to facilitate the execution of the processing action based at least in part on corresponding user input.

In some examples, the processing action type data comprises a processing action type associated with the processing action, wherein processing action type is defined at least in part by one or more required processing action parameters for executing the processing action; and wherein the processing action type may comprise one of a message processing action, a channel processing action, and a global processing action. Further, in various examples, the processing action type data is based at least in part on one or both of user input from the developer client device at the interactive developer interface and the one or more processing action parameters associated with the processing action.

In various examples, the one or more processors are further configured to: receive processing action type data from the developer client device via the interactive developer interface; based at least in part on the processing action type data, determine that the one or more processing action parameters associated with the processing action are configured so as to ensure that the processing action can be operably executed via a group-based communication interface. In various examples, the application data received from the client device further comprises application informational data and application settings data, wherein the application informational data and the application settings data define at least a portion of application home interface configuration data such that at least one of the application settings data or the application informational data may be selectively retrieved by a group-based communication server to render at least a portion of an application home interface associated with the application, wherein the application settings data comprises one or more instructions related to one or more application functionalities within the group-based communication system.

Various examples are directed to example methods for providing an interactive developer interface of a group-based communication system, the method comprising: receiving application data provided via an interactive developer interface from a developer client device, the application data comprising processing action data and user engagement pane data, wherein at least a portion of the processing action data defines a functionality of a processing action, and wherein at least a portion of the user engagement pane data comprises block data associated with one or more user engagement blocks configured to reflect execution of one or more user engagement pane instructions corresponding to one or more functionalities of an application; based at least in part on a determination that the processing action data satisfies a user interface criteria, generating one or more executable processing action elements for display with an application home interface associated with the application; and storing the application data within a group-based communication repository. In various examples, the user engagement pane data may be configured for display within the application home interface via the one or more user engagement blocks; and the processing action data may comprise processing action type data associated with the processing action.

In various examples, a processing action may defined by one or more processing action characteristics, wherein the one or more processing action characteristics comprise a processing action identifier, one or more processing action parameters, and a processing action type, wherein the one or more processing action parameters define one or more input variables associated with the processing action and configured to facilitate an execution of the processing action based at least in part on corresponding user input. In various examples, the processing action type data may comprise a processing action type associated with the processing action, wherein processing action type is defined at least in part by one or more required processing action parameters for executing the processing action; and wherein the processing action type may comprise one of a message processing action, a channel processing action, and a global processing action. In some examples, the processing action type data may be based at least in part on one or both of user input from the developer client device at the interactive developer interface and the one or more processing action parameters associated with the processing action.

In various examples, an exemplary method may further comprise receiving processing action type data from the developer client device via the interactive developer interface; and based at least in part on the processing action type data, determining that the one or more processing action parameters associated with the processing action are configured so as to ensure that the processing action can be operably executed via a group-based communication interface.

In some examples, the application data received from the client device further comprises application informational data and application settings data, wherein the application informational data and the application settings data may define at least a portion of application home interface configuration data such that at least one of the application settings data or the application informational data may be selectively retrieved by a group-based communication server to render at least a portion of an application home interface associated with the application, wherein the application settings data comprises one or more instructions related to one or more application functionalities within the group-based communication system.

Various examples are directed to a computer program product for providing an interactive developer interface of a group-based communication system. In various examples, the computer program product may comprise at least one processor, and at least one non-transitory memory comprising instructions that, with the at least one processor, cause the computer program product to: receive application data provided via an interactive developer interface from a developer client device, the application data comprising processing action data and user engagement pane data, wherein at least a portion of the processing action data defines a functionality of a processing action, and wherein at least a portion of the user engagement pane data comprises block data associated with one or more user engagement blocks configured to reflect execution of one or more user engagement pane instructions corresponding to one or more functionalities of an application; based at least in part on a determination that the processing action data satisfies a user interface criteria, generate one or more executable processing action elements for display with an application home interface associated with the application; and store the application data within a group-based communication repository. In various examples, the user engagement pane data may be configured for display within the application home interface via the one or more user engagement blocks; and the processing action data may comprise processing action type data associated with the processing action.

In some examples, the processing action may be defined by one or more processing action characteristics, wherein the one or more processing action characteristics may comprise a processing action identifier, one or more processing action parameters, and a processing action type, wherein the one or more processing action parameters define one or more input variables associated with the processing action and configured to facilitate an execution of the processing action based at least in part on corresponding user input.

In some examples, the processing action type data may comprise a processing action type associated with the processing action, wherein processing action type may be defined at least in part by one or more required processing action parameters for executing the processing action; and wherein the processing action type may comprise one of a message processing action, a channel processing action, and a global processing action. In various examples, the processing action type data may be based at least in part on one or both of user input from the developer client device at the interactive developer interface and the one or more processing action parameters associated with the processing action.

In some examples, the one or more processors may be further configured to: receive processing action type data from the developer client device via the interactive developer interface; and based at least in part on the processing action type data, determine that the one or more processing action parameters associated with the processing action are configured so as to ensure that the processing action can be operably executed via a group-based communication interface.

In various examples, the application data received from the client device further may comprise application informational data and application settings data, wherein the application informational data and the application settings data may define at least a portion of application home interface configuration data such that at least one of the application settings data or the application informational data may be selectively retrieved by a group-based communication server to render at least a portion of an application home interface associated with the application, wherein the application settings data may comprise one or more instructions related to one or more application functionalities within the group-based communication system.

A third embodiment is directed to a system configured for indexing processing actions associated with a plurality of applications, the system comprising at least one processor, and at least one non-transitory memory comprising instructions that, with the at least one processor, cause the system to: receive application data for a plurality of applications, wherein the application data comprises processing action data corresponding to one or more processing actions executable by a corresponding application of the plurality of applications, wherein each of the one or more processing actions is defined by a plurality of processing action characteristics comprising an application identifier and a processing action identifier; store the application data associated with the application identifier and each of the one or more processing action identifiers within an application table for a group, at a group-based communication repository; indexing at least one of the one or more processing actions within the application table for the group based at least in part on processing action characteristics.

In some examples, the one or more processors are further configured to: generate one or more processing action characteristic identifiers, each associated with a processing action characteristic and a processing action identifier associated with a corresponding processing action, wherein a corresponding processing action comprises a processing action of the one or more processing actions that is defined at least in part by the processing action characteristic; and associate the application identifier with each of the one or more processing action characteristic identifiers, such that the application data comprises each of the processing action characteristic identifiers.

In various examples, the application table comprises a processing action characteristic table identifying each of the plurality of processing action characteristics of each plurality of processing action characteristics defining each of the one or more processing actions; and the one or more processors are further configured to: receive environmental contextual data generated for a client device, wherein the environmental contextual data is generated based at least in part on interactions of the client device with the group-based communication system during a current connection session; generate relevance scores for each of the one or more processing action characteristics identified within the processing action characteristic table based at least in part on the environmental contextual data generated for the client device; based at least in part on the relevance scores, generate a contextual processing action characteristics list of at least one of the one or more processing action characteristics; retrieve processing action characteristic data associated with each of the processing action characteristic identifiers associated with each of the one or more processing action characteristics; based at least on the environmental contextual data, generate one or more contextual processing action lists of one or more processing actions associated with a processing action characteristic identifier associated with the one or more processing action characteristics, each of the one or more contextual processing action lists respectively corresponding to the at least one of the one or more of processing action characteristics of the contextual processing action characteristics list; retrieve processing action data associated with each of the processing actions of the processing actions of the one or more contextual processing action lists; and transmit the contextual processing action characteristic list and the corresponding one or more contextual processing action lists to the client device for presentation via a group-based communication interface; wherein each processing action of the one or more contextual processing action lists is associated with an application of the plurality of applications.

In some examples, the one or more processors are further configured to: receive environmental contextual data generated for a client device, wherein the environmental contextual data is generated based at least in part on interactions of the client device with the group-based communication system during a current connection session; generate relevance scores for each of a plurality of applications identified within the application table based at least in part on the environmental contextual data generated for the client device; based at least in part on the relevance scores, generate a contextual application list of one or more of the plurality of applications; retrieve processing action data associated with each of the processing action identifiers associated with each of the one or more of the plurality of applications; based at least on the environmental contextual data, generate one or more contextual processing action lists, each of the one or more contextual processing action lists corresponding to an application of the one or more of the plurality of applications; and transmit the contextual processing action list of the one or more of the plurality of processing actions to the client device for presentation via a group-based communication interface; wherein each of the one or more contextual processing action lists comprises one or more processing actions associated with one or more processing action identifiers, each of the one or more processing action identifiers being associated with an application of one or more of the plurality of applications.

In various examples, the one or more processors are further configured to: receive from a client device a processing action pin request associated with a user identifier associated with the client device, a group-based communication channel identifier, and a processing action associated with an application of a plurality of applications, wherein the user identifier is associated with access rights to a group-based communication channel associated with the group-based communication channel identifier, and wherein the processing action pin request is further associated with a processing action identifier and an application identifier associated with the application; associating the group-based communication channel identifier and the processing action identifier associated with the processing action pin request; rendering for display within a group-based communication channel interface associated with the group-based communication channel identifier an executable processing action element corresponding to the processing action identifier associated with the processing action pin request. Further, in various examples, the one or more processors are further configured to: receive from the client device associated with the processing action pin request a secondary processing action accessibility data associated with the group-based communication channel identifier and the processing action identifier, wherein the secondary processing action accessibility data comprises an executable instruction configured to at least partially restrict access to the processing action within the group-based communication channel.

Various examples are directed to an exemplary method for indexing processing actions associated with a plurality of applications, the method comprising: receiving application data for a plurality of applications, wherein the application data comprises processing action data corresponding to one or more processing actions executable by a corresponding application of the plurality of applications, wherein each of the one or more processing actions is defined by a plurality of processing action characteristics comprising an application identifier and a processing action identifier; storing the application data associated with the application identifier and each of the one or more processing action identifiers within an application table for a group, at a group-based communication repository; and indexing at least one of the one or more processing actions within the application table for the group based at least in part on processing action characteristics.

In some examples, the exemplary method may further comprise: generating one or more processing action characteristic identifiers, each associated with a processing action characteristic and a processing action identifier associated with a corresponding processing action, wherein a corresponding processing action comprises a processing action of the one or more processing actions that is defined at least in part by the processing action characteristic; and associating the application identifier with each of the one or more processing action characteristic identifiers, such that the application data comprises each of the processing action characteristic identifiers.

In some examples, the exemplary method may further comprise: receiving environmental contextual data generated for a client device, wherein the environmental contextual data may be generated based at least in part on interactions of the client device with a group-based communication system during a current connection session; generating relevance scores for each of the one or more processing action characteristics identified within a processing action characteristic table based at least in part on the environmental contextual data generated for the client device; based at least in part on the relevance scores, generating a contextual processing action characteristics list of at least one of the one or more processing action characteristics; retrieving processing action characteristic data associated with each of the processing action characteristic identifiers associated with each of the one or more processing action characteristics; based at least on the environmental contextual data, generating one or more contextual processing action lists of one or more processing actions associated with a processing action characteristic identifier associated with the one or more processing action characteristics, each of the one or more contextual processing action lists respectively corresponding to the at least one of the one or more of processing action characteristics of the contextual processing action characteristics list; retrieving processing action data associated with each of the processing actions of the processing actions of the one or more contextual processing action lists; and transmitting the contextual processing action characteristic list and the one or more contextual processing action lists corresponding thereto to the client device for presentation via a group-based communication interface. In various examples, each processing action of the one or more contextual processing action lists may be associated with an application of the plurality of applications. In various examples, the application table may comprise the processing action characteristic table identifying each of the plurality of processing action characteristics of each plurality of processing action characteristics defining each of the one or more processing actions.

In some examples, the exemplary method may further comprise: receiving environmental contextual data generated for a client device, wherein the environmental contextual data may be generated based at least in part on interactions of the client device with a group-based communication system during a current connection session; generating relevance scores for each of a plurality of applications identified within the application table based at least in part on the environmental contextual data generated for the client device; based at least in part on the relevance scores, generating a contextual application list of one or more of the plurality of applications; retrieving processing action data associated with each of the processing action identifiers associated with each of the one or more of the plurality of applications; based at least on the environmental contextual data, generating one or more contextual processing action lists, each of the one or more contextual processing action lists corresponding to an application of the one or more of the plurality of applications; and transmitting the contextual processing action lists of the one or more processing actions to the client device for presentation via a group-based communication interface. In various examples, each of the one or more contextual processing action lists may comprise one or more processing actions associated with one or more processing action identifiers, each of the one or more processing action identifiers being associated with an application of one or more of the plurality of applications.

In some examples, the exemplary method may further comprise: receiving from a client device a processing action pin request associated with a user identifier associated with the client device, a group-based communication channel identifier, and a processing action associated with an application of a plurality of applications, wherein the user identifier may be associated with access rights to a group-based communication channel associated with the group-based communication channel identifier, and wherein the processing action pin request may be further associated with a processing action identifier and an application identifier associated with the application; associating the group-based communication channel identifier and the processing action identifier associated with the processing action pin request; and rendering for display within a group-based communication channel interface associated with the group-based communication channel identifier an executable processing action element corresponding to the processing action identifier associated with the processing action pin request. In some examples, the exemplary method may further comprise: receiving from the client device associated with the processing action pin request a secondary processing action accessibility data associated with the group-based communication channel identifier and the processing action identifier, wherein the secondary processing action accessibility data comprises an executable instruction configured to at least partially restrict access to the processing action within the group-based communication channel.

Various examples may be directed to a computer program product for indexing processing actions associated with a plurality of applications. In various examples, the computer program product may comprise at least one processor, and at least one non-transitory memory comprising instructions that, with the at least one processor, cause the apparatus to: receive application data for a plurality of applications, wherein the application data comprises processing action data corresponding to one or more processing actions executable by a corresponding application of the plurality of applications, wherein each of the one or more processing actions is defined by a plurality of processing action characteristics comprising an application identifier and a processing action identifier; store the application data associated with the application identifier and each of the one or more processing action identifiers within an application table for a group, at a group-based communication repository; and index at least one of the one or more processing actions within the application table for the group based at least in part on processing action characteristics.

In some examples, the one or more processors are further configured to: generate one or more processing action characteristic identifiers, each associated with a processing action characteristic and a processing action identifier associated with a corresponding processing action, wherein a corresponding processing action may comprise a processing action of the one or more processing actions that is defined at least in part by the processing action characteristic; and associate the application identifier with each of the one or more processing action characteristic identifiers, such that the application data comprises each of the processing action characteristic identifiers. In various examples, the application table may comprise a processing action characteristic table identifying each of the plurality of processing action characteristics of each plurality of processing action characteristics defining each of the one or more processing actions. In some examples, the one or more processors may be further configured to: receive environmental contextual data generated for a client device, wherein the environmental contextual data is generated based at least in part on interactions of the client device with a group-based communication system during a current connection session; generate relevance scores for each of the one or more processing action characteristics identified within the processing action characteristic table based at least in part on the environmental contextual data generated for the client device; based at least in part on the relevance scores, generate a contextual processing action characteristics list of at least one of the one or more processing action characteristics; retrieve processing action characteristic data associated with each of the processing action characteristic identifiers associated with each of the one or more processing action characteristics; based at least on the environmental contextual data, generate one or more contextual processing action lists of one or more processing actions associated with a processing action characteristic identifier associated with the one or more processing action characteristics, each of the one or more contextual processing action lists respectively corresponding to the at least one of the one or more of processing action characteristics of the contextual processing action characteristics list; retrieve processing action data associated with each of the processing actions of the processing actions of the one or more contextual processing action lists; and transmit the contextual processing action characteristic list and the one or more contextual processing action lists corresponding thereto to the client device for presentation via a group-based communication interface. In certain circumstance, each processing action of the one or more contextual processing action lists may be associated with an application of the plurality of applications.

In various examples, the one or more processors may be further configured to: receive environmental contextual data generated for a client device, wherein the environmental contextual data may be generated based at least in part on interactions of the client device with a group-based communication system during a current connection session; generate relevance scores for each of a plurality of applications identified within the application table based at least in part on the environmental contextual data generated for the client device; based at least in part on the relevance scores, generate a contextual application list of one or more of the plurality of applications; retrieve processing action data associated with each of the processing action identifiers associated with each of the one or more of the plurality of applications; based at least on the environmental contextual data, generate one or more contextual processing action lists, each of the one or more contextual processing action lists corresponding to an application of the one or more of the plurality of applications; and transmit the contextual processing action lists of the one or more processing actions to the client device for presentation via a group-based communication interface. In some examples, each of the one or more contextual processing action lists may comprise one or more processing actions associated with one or more processing action identifiers, each of the one or more processing action identifiers being associated with an application of one or more of the plurality of applications.

In various examples, the one or more processors may be further configured to: receive from a client device a processing action pin request associated with a user identifier associated with the client device, a group-based communication channel identifier, and a processing action associated with an application of a plurality of applications, wherein the user identifier may be associated with access rights to a group-based communication channel associated with the group-based communication channel identifier, and wherein the processing action pin request may be further associated with a processing action identifier and an application identifier associated with the application; associate the group-based communication channel identifier and the processing action identifier associated with the processing action pin request; and render for display within a group-based communication channel interface associated with the group-based communication channel identifier an executable processing action element corresponding to the processing action identifier associated with the processing action pin request.

In some examples, the one or more processors are further configured to: receive from the client device associated with the processing action pin request a secondary processing action accessibility data associated with the group-based communication channel identifier and the processing action identifier, wherein the secondary processing action accessibility data may comprise an executable instruction configured to at least partially restrict access to the processing action within the group-based communication channel.

The present disclosure more fully describes various examples with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

As discussed herein, some examples of the present disclosure are directed to systems and methods of providing application data associated with an application within a group-based communication interface. Such application data may be consolidated within the group-based communication interface so as to facilitate search and/or access to various application data (e.g., across a plurality of applications). The group-based communication system is configured to implement various functionalities of a plurality of applications within the group-based communication system. Such configurations enable users of the group-based communication platform to initiate various actions within various systems (e.g., either external applications or the group-based communication system) based on commands and/or processes performed within a group-based communication interface of the group-based communication system. As used herein, a user may include an individual, a group of individuals, business, organization, and the like. Users may access a group-based communication or messaging system using client devices.

In various examples, to facilitate a meaningful interaction between a user and an application implemented within the group-based communication system, a singular application home interface configured to display various information associated with the application may be generated within the group-based communication interface upon a user's request. For example, the application home interface may consolidate various application-specific informational data (e.g., a title, brief description, application version/update information, and/or the like), contextual data (e.g., information about the various group-based communication channels, workspaces, and/or the like throughout the group-based communication system at which the application is installed, application usage information specific to a particular use), and various application settings menus may be provided within a single interface. Further, the interface may provide a messaging pane and/or a developer-configured user engagement pane, each configured to facilitate a user's direct communication to the developer of the application and engagement thereof. Additionally, the application home interface may comprise a list of each of the processing actions associated with the application that are available for a user to initialize. The application home interface functions as a convenient interface through which a user may initialize a processing action. Moreover, the comprehensive itemization of each of the processing actions associated with an application can facilitate user interaction with the application by introducing the user to various functionalities with which the user was previously unaware.

Moreover, the present invention allows an application developer to personalize the informational content provided to a user at the centralized interactive interface. Such a configuration enables a developer to display prioritized application functionalities based on perceived growth potential and may facilitate the promotion of the developer's application throughout the group-based communication system.

Various examples of the present invention are directed to providing each developer seeking to implement an application within the group-based communication system with an interactive developer interface. As described herein, each interactive interface may comprise various fillable fields configured to not only direct a developer through the application implementation process, but to function as systematic structures within which each application and processing action must be implemented so as to ensure the seamless implementation of the application throughout the group-based communication system. The interactive developer interface is be configured to present a consistent interface layout to each developer so as to establish a processing action framework within the group-based communication system that is defined by application- and/or action-specific data organized throughout a plurality of server-defined trans-application data arrays so as to ensure system operability and functional consistency.

Further, various examples of the present invention utilize the uniform configuration and internalized data collection associated with the application and/or processing action implementation process to enable a group-based communication system wherein each of the various processing actions associated with the plurality of applications may be indexed based on one or more characteristics. As described herein, indexing each of the plurality of processing actions may facilitate a broader, more robust, user-friendly searching functionality within the group-based communication system. For example, as described herein, various examples of the present invention are configured to generate a list of available processing actions being presented to a user based on a user search of an application name, description of the processing action, processing action parameter, processing action type, and/or the like.

Accordingly, the present disclosure provides a technological improvement that results in an improved search functionality within a group-based communication system. The improved search functionality may reduce a number of search queries a user may submit to receive a relevant response. A reduction in the number of search queries may result in a decreased amount of processing power and/or memory used by a user computing device and/or a server computing device configured to provide a response to a search query. As such, the techniques described herein may improve both the functioning of the user computing device and the server computing device.

Additionally, the reduction in a number of search queries submitted may result in a total amount of data transmitted via a network, such as from the user computing device to the server computing device configured to provide the response to the search query. Accordingly, the techniques described herein may result in additional network bandwidth being available for other functions.

Furthermore, the present disclosure provides a technological improvement for providing an interactive developer interface of a group-based communication system. The interactive developer interface can enable a user to submit feedback to an application developer, such as to improve the application.

Example System Architecture

Methods, apparatuses, and computer program products of the present invention may be embodied by any of a variety of devices. For example, the method, apparatus, and computer program product of an example embodiment may be embodied by a network device, such as a server or other network entity, configured to communicate with one or more devices, such as one or more client devices. In some preferred and non-limiting examples, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates an example computing system 100 within which examples of the present invention may operate. Users may access a group-based communication system 118 via a communication network 108 using client devices 102-106. The client devices 102, 104, and 106 (collectively referred to as client devices 102-106) may include computer hardware and/or software that is configured to access a service made available by a server. The server is often (but not always) on another computer system, in which case the client device accesses the service by way of a network. In at least one example, the client devices 102-106 include computer hardware and/or software that is configured to access the group-based communication system 118. The term "group-based" as used herein refers to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers may be used to associate data, information, objects, messages, etc., with specific groups.

The group-based communication system 118 may include a platform through which client devices 102-106 may communicate and interact in a group-based setting. The group-based communication system 118 may comprise a collection of computing services that are accessible to one or more client device 102-106, and that are operable to provide access to a plurality of software applications related to operations of databases. The client device 102-106 may access the group-based communication system 118 during a connection session in which the client device 102-106 maintains an active connection with the group-based communication system 118.

A single connection session may encompass a continuous time period during which the client device 102-106 maintains a connection with the group-based communication system 118 (e.g., between consecutive interruptions in connection, between consecutive occurrences of establishing and ending a connection, and/or the like). It should be understood that in some examples, a connection session may continue between consecutive occurrences for establishing and ending a connection between a client device 102-106 and the group-based communication system 118, despite the inclusion of one or more short-duration interruptions, during which the client device 102-106 and/or the group-based communication system 118 is configured to cache any data to be exchanged which is generated and/or retrieved during the short-duration interruption. While a connection session remains active, it may be referred to as a "current connection session." Once a current connection session ends (e.g., by termination of the connection between the client device and the group-based communication system) the current connection session becomes a prior connection session. In various examples, each connection sessions may have associated therewith a session identifier (e.g., alphanumeric string, symbol, etc.), which uniquely identifies a particular connection session, thereby enabling a client device 102-106 and/or the group-based communication system 118 to distinguish between a current connection session and prior connection sessions.

In some examples, the group-based communication system 118 may take the form of one or more central servers disposed in communication with one or more additional servers running software applications and having access to one or more databases storing digital content items, application-related data, and/or the like. The group-based communication system 118 may also support client retention settings and other compliance aspects. Further, the group-based communication system 118 may provide comprehensive third-party developer support that grants appropriate access to the data and allows third parties to build applications and bots to integrate with customer's workflows. Users of the group-based communication system 118 may be organized into organization groups (e.g., employees of each company may be a separate organization group) and each organization group may have one or more communication channels (e.g., group-based communication channels) to which users may be assigned or which the users may join (e.g., group-based communication channels may represent departments, geographic locations such as offices, product lines, user interests, topics, issues, and/or the like). Each group of the group-based communication system 118 may have associated therewith a group identifier usable to facilitate access control for a message (e.g., access to the message, such as having the message return as part of search results in response to a search query, may be restricted to those users having the group identifier associated with their user profile).

In some examples, the group identifier may be used to determine context for the message (e.g., a description of the group, such as the name of an organization and/or a brief description of the organization, may be associated with the group identifier). The users of the group-based communication system 118 may join and/or create communication channels (e.g., group-based communication channels). Some group-based communication channels may be globally accessible to those users having a particular organizational group identifier associated with their user profile (i.e., users who are members of the organization). A user profile (e.g., associated with a user account, including user account details) may include information associated with a user, including, but not limited to, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, a plurality of historical conversation primitives associated with the user profile, an avatar, an email address, a real name (e.g., John Doe), a username (e.g., j doe), a password, a real name, a time zone, a status, conversation segments associated with the user, metadata indicating historical messages with same conversation primitive shared with other user profiles, a digital signature data structure, and the like. The user account details can include a subset designation of user credentials, such as, for example, login information for the user including the user's username and password.

Access to some group-based communication channels may be restricted to members (e.g., users) of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

In various examples, one or more computing devices associated with the group-based communication system 118, the user devices 102-106 and/or one or more third-party computing devices, such as one or more computing devices associated with one or more application systems 112-116, may be configured to communicate via the communication network 108 (e.g., one or more networks). The communication network 108 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 108 may include a cellular telephone, an 802.11, 802.16, 802.20, and/or WiMax network. Further, the communication network 108 may include a public network, such as the Internet, a private network, such as an intranet, or combinations thereof, and may utilize a variety of networking protocols now available or later developed including, but not limited to TCP/IP based networking protocols. As discussed herein, the networking protocol is configured to enable data transmission via websocket communications. For instance, the networking protocol may be customized to suit the needs of the group-based communication system. In some examples, the protocol is a custom protocol of JSON objects sent via a websocket channel. In some examples, data may be transmitted via a plurality of protocols, such as JSON over RPC, JSON over REST/HTTP, and the like.

In the illustrated embodiment, the group-based communication system 118 includes at least one group-based communication server(s) 110 accessible via the communication network 108. The at least one group-based communication server(s) 110 may be configured to interact with various client devices 102-106 for receiving and/or disseminating messages for distribution within the communication channels described above and/or one or more direct messaging instances (e.g., private mode of communication between a user and one or more other users).

The functionality of the group-based communication server(s) 110 may be provided via a single server or collection of servers having a common functionality, or the functionality of the group-based communication server(s) 110 may be segmented among a plurality of servers or collections of servers performing subsets of the described functionality of the group-based communication servers. For example, a first subset of group-based communication servers may be configured for receiving messages from client devices 102-106 and/or for transmitting messages to client devices 102-106 (e.g., via one or more interface servers). The group-based communication server(s) 110 may be in communication with a second subset of group-based communication server(s) 110 configured for collecting messages distributed within communication channels and for storing those messages within a message repository database for indexing and archiving.

In at least one example, the group-based communication system 118 encompasses one or more group-based communication repositories 120, which may define one or more cache memory storage areas and/or one or more long term storage areas, such as for storing historical data utilized for executing one or more models, as discussed herein. In some examples, the historical data may include environmental contextual data (and/or routing data) associated with a previous execution of a processing action (e.g., during a prior connection session).

In some examples, the historical data may include environmental contextual data deemed relevant for the execution of the processing action under similar circumstances to those associated with a current connection session. For example, the historical data may indicate which processing actions are generally selected by one or more users during similar circumstances; which environmental contextual data is relevant for a processing action under similar circumstances; and/or the like. The historical data may encompass user historical data that is unique to a particular user and identifies how that particular user has interacted with the group-based communication system 118 in the past. In some examples, the historical data encompasses universal historical data, which identifies how a plurality of users have generally interacted with the group-based communication system 118 in the past under similar circumstances. In accordance with some examples, the similar circumstances are determined and/or monitored via artificial intelligence and/or machine learning algorithms which monitor generated environmental contextual data and a user's resulting interaction with the group-based communication system under the circumstances of the generated environmental contextual data. In some examples, the historical data may be consolidated and/or summarized into characteristics of the processing action and/or environmental contextual data associated with a particular user under the particular circumstances.

In at least one example, the at least one group-based communication server(s) 110 is configured to receive messages transmitted from one or more client devices 102-106, store the messages within a group-based communication repository 120 for individual communication channels, and/or transmit messages to appropriate client devices 102-106, such as based on the communication channel, direct messaging instance, or the like. The messages (e.g., group-based communication messages) may include any electronically generated digital content object provided by a user that has security sufficient such that it is accessible only to a defined group of users and that is configured for display within a group-based communication channel. The messages may include any text, image, video, audio, or combination thereof provided by a user (using a client device). For instance, the user may transmit a first message that includes text as well as an image and a video. In such a case, the text, image, and video would comprise the message or digital content object. Each message sent or posted to a group-based communication channel of the group-based communication system includes metadata including one or more of a timestamp associated with post of the message, a sending user identifier, a message identifier, message contents, a group identifier, a group-based communication channel identifier, a thread identifier, and/or other data associated with the message. Each of the foregoing identifiers may comprise ASCII text, a pointer, a memory address, and the like.

The group-based communication repository 120 may include a computing location where data is stored, accessed, modified and otherwise maintained by the group-based communication system 118. The stored data includes information that facilitates the operation of the group-based communication system 118. The group-based communication repository 120 may be embodied as a data storage device or devices, as a separate database server or servers, or as a combination of data storage devices and separate database servers. Further, in some examples, the group-based communication repository 120 may be embodied as a distributed repository such that some of the stored data is stored centrally in a location within the group-based communication system 118 and other data stored in a single remote location or a plurality of remote locations. Alternatively, in some examples, the group-based communication repository 120 may be distributed over a plurality of remote storage locations only The client devices 102-106 may be any computing device as defined above. Electronic message data exchanged between the group-based communication server(s) 110 and the client devices 102-106 may be provided in various forms and via various methods.

In some preferred and non-limiting examples, one or more of the client devices 102-106 are mobile devices, such as smartphones or tablets. The one or more client devices 102-106 may execute an application ("app") to interact with the group-based communication server(s) 110. Such apps are typically designed to execute on mobile devices, such as smartphones or tablets. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another, and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system. Thus, via the app executing on the client devices 102-106, these client devices 102-106 are configured for communicating with the group-based communication system 118.

In some preferred and non-limiting examples, the client devices 102-106 may interact with the group-based communication server(s) 110 via a web browser. The client devices 102-106 may also include various hardware or firmware designed to interact with the group-based communication server(s) 110. Again, via the browser of the client devices 102-106, the client devices 102-106 are configured for communicating with the group-based communication system 118.

In some examples of an exemplary group-based communication system 118, a message or messaging communication may be sent from a client device 102-106 to a group-based communication system 118. In various implementations, messages may be sent to the group-based communication system 118 over communication network 108 directly by one of the client devices 102-106. The messages may be sent to the group-based communication system 118 via an intermediary such as a message server, and/or the like. For example, a client device 102-106 may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., file objects), message hierarchy data (e.g., the message may be a reply to another message), third-party metadata, and/or the like. In one embodiment, the client device 102-106 may provide the following example message, substantially in the form of a (Secure) Hypertext Transfer Protocol ("HTTP(S)") POST message including eXtensible Markup Language ("XML") formatted data, as provided below:

POST /authrequest.php HTTP/1.1
Host: www.example.com
Content-Type: Application/XML
Content-Length: 667

```xml
<?XML version ="1.0" encoding = "UTF-8"?>
<auth_request>
 <timestamp>2020-12-31 23:59:59</timestamp>
 <user_accounts_details>
    <user_account_credentials>
      <user_name>ID_user_1</user_name>
      <password>abc123</password>
      //OPTIONAL <cookie>cookieID</cookie>
      //OPTIONAL    <digital_cert_link>www.mydigitalcertificate.com/
JohnDoeDaDoeDoe@gmail.com/mycertifcate.dc</digital_cert_link>
      //OPTIONAL <digital_certificate>_DATA_</digital_certificate>
    </user_account_credentials>
 </user_accounts_details>
 <client_details>//iOS Client with App and Webkit
    //it should be noted that although several client details
    //sections are provided to show example variants of client
    //sources, further messages will include only on to save
    //space
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201 Safari/9537.53</user_agent_string>
    <client_product_type>iPhone6,1</client_product_type>
    <client_serial_number>DNXXX1X1XXXX(</client_serial_number>
    <client_UDID>3XXXXXXXXXXXXXXXXXXXXXXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
    <app_name>MSM.app</app_name>
    <app_version>1.0 </app_version>
    <app_webkit_name>Mobile Safari</client_webkit_name>
    <client_version>537.51.2</client_version>
 </client_details>
 <client_details> //iOS Client with Webbrowser
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201 Safari/9537.53</user_agent_string>
    <client_product_type>iPhone6,1</client_product_type>
    <client_serial_number>DNXXX1X1XXXX(</client_serial_number>
    <client_UDID>3XXXXXXXXXXXXXXXXXXXXXXXD</client UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
 </client_details>
 <client_details> //Android Client with Webbrowser
    <client_IP>10.0.0.123</client_IP>
    <user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
  </client_details>
  <client_details> //Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3 Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
  </client_details>
  <message>
    <message_identifier>ID_message_10</message_identifier>
    <team_identifier>ID_team_1</team_identifier>
    <channel_identifier>ID_channel_1</channel_identifier>
    <contents>That is an interesting invention. I have attached a copy our patent policy.</contents>
```

```
    <attachments>patent_policy.pdf</attachments>
  </message>
</auth_request>
```

In the illustrated embodiment, the group-based communication system 118 comprises a plurality of group-based communication server(s) 110 configured to receive messages transmitted between a plurality of client devices 102-106 within a group-based communication channel identified by a channel identifier and/or a group identifier, and to facilitate dissemination of those messages among client devices 102-106 that collectively form the membership of the group-based communication channel. As used herein, a group-based communication channel represents a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) may be displayed to each member of the group-based communication channel. For instance, in one embodiment, a common set of group-based messaging communications will be displayed to each member of the respective group-based communication channel such that the content of the group-based communication channel (i.e., messaging communications) will not vary per member of the channel. However, in another embodiment, a member may join a group-based communication channel and only be able to view subsequent group-based messaging communications (as opposed to historical group-based messaging communications). The group-based communication channels are generally topic-oriented, long-lasting channels as opposed to ad hoc ephemeral conversations in conventional messaging apps. Each group-based communication channel may have associated therewith at least one group-based communication channel identifier including items of data by which the group-based communication channel may be uniquely identified (e.g., ASCII text, a pointer, a memory address, etc.).

The group-based communication channels discussed herein may be private or public communication channels. A private group-based communication channel refers to a group-based communication channel with restricted access such that it is not generally accessible and/or searchable by other members of the group-based communication system 118. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel. In various examples, a private group-based communication channel may be associated with a group-based communication channel identifier. A public group-based communication channel refers to a group-based communication channel that may be accessible to any member of an organization associated therewith. For example, a member of an organization may search for and access a public group-based communication channel, regardless of the member's permissions. The member may then be able to transmit, receive, and/or react to messages via the public group-based communication channel.

In some examples, data indicating responses to a message may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel interface in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In some examples, attachments may be included with the message. If there are attachments, file objects may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In some examples, third-party metadata may be associated with the message. For example, third-party metadata may provide additional context regarding the message or the user that is specific to a company, group, group-based communication channel, and/or the like. In one implementation, the message may be parsed (e.g., using PHP commands) to determine third-party metadata. For example, third-party metadata may indicate whether the user who sent the message is an authorized representative of the group-based communication channel (e.g., an authorized representative may be authorized by the company to respond to questions in the group-based communication channel).

In some examples, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In some examples, various metadata, determined as described above, and/or the contents of the message may be viewable by members of the associated group-based communication channel via a group-based communication channel interface. The group-based communication channel interface may include a virtual communications environment or feed that is configured to display messaging communications posted by channel members (e.g., validated users accessing the environment using client devices) that are viewable only to the members of the group. The format of the group-based communication channel interface may appear differently to different members of the group-based communication channel; however, the content of the group-based communication channel interface (i.e., messaging communications) will be displayed to each member of the group-based communication channel. For instance, a common set of group-based messaging communications will be displayed to each member of the respective group-based communication channel such that the content of the group-based communication channel interface (i.e., messaging communications) will not vary per member of the group-based communication channel. In some examples, messages may be transmitted via a direct messaging instance. In such examples, the messages may be viewable to members associated with the direct messaging instance via a direct messaging instance interface.

In some examples, various metadata, determined as described above, and/or the contents of the message may be used to index the message (e.g., using the conversation primitive) and/or to facilitate various facets of searching (i.e., search queries that return results from the group-based communication servers 110). Metadata associated with the message may be determined and the message may be indexed in the group-based communication server(s) 110. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). If there are attachments associated with the message, file contents of the associated files may be used to index such files in the group-based communication server(s) 110 to facilitate searching. In one embodiment, the files may be indexed such that a company's or a group's files are indexed at a separate distributed repository. Similarly, as discussed herein, app data associated with various application systems and/or processing actions may be stored in association with a particular group's messages, such that app data associated with a plurality of groups are stored separately.

Examples of electronic message exchange among one or more client devices 102-106 and the group-based communication system 118 are described below in reference to FIG. 1.

As shown in FIG. 1, the group-based communication system 118 enables individual client devices 102-106 to exchange objects (e.g., messages) with one another and to interact with one or more application systems 112-116. To exchange messages and/or other objects between client devices 102-106, individual client devices 102-106 transmit messages (e.g., text-based messages, file objects, video and/or audio streams, and/or the like) to the group-based communication system 118. Those messages are ultimately provided to one or more group-based communication server(s) 110, which indexes the messages and distributes those messages to the intended recipients (e.g., client devices 102-106) of the message.

In accordance with the embodiment shown in FIG. 1, the client devices 102-106 are configured to display the received messages in a contextually-relevant user interface available to the user of the client device. For example, messages transmitted from a first client device 102 as a part of a group-based communication channel are displayed in a user interface display on client devices 102-106 associated with other members of the group-based communication channel. In at least one example, the user interface may include a group-based communication interface including of a virtual communications environment configured to facilitate user interaction with the group-based communication system 118. Each group-based communication interface may be accessible and viewable to a select group of users, such as a group of employees of a business or organization. The group-based communication interface may include a plurality of workspaces (e.g., one or more communication channels associated with a particular identifier), group-based communication channels (e.g., a marketing channel, sales channel, accounting channel, etc.), direct messaging interfaces, or the like.

As discussed in greater detail herein, messages, other objects, and/or other data may be provided to application systems 112-116 to initiate one or more processing actions executable within the respective application systems. The application systems 112-116 may include a software programs, applications, platforms, or services that are configured to communicate with the group-based communication system 118 and which service, manage, and/or perform actions that form various functions of an application that is accessible to a client device via a group-based communication interface. An application system 112, 114, and/or 116, such as application system 114, may operate on a compiled code base or repository that is separate and distinct from that which supports the group-based communication system 118. The application system 112, 114, and/or 116 may comprise additional storage repositories (e.g., databases) associated with tasks, functions, and/or actions that may be performed via the application system 112, 114, and/or 116. In some examples, the application system 112, 114, and/or 116 may communicate with the group-based communication system 118, and vice versa, through one or more application program interfaces (APIs). In some examples, the application system 112, 114, and/or 116 receives tokens or other authentication credentials that are used to facilitate secure communication between the application system 112, 114, and/or 116 and the group-based communication system in view of group-based communication system network security layers or protocols (e.g., network firewall protocols). As various examples, an application system 112, 114, and/or 116 may be configured for executing a calendaring/scheduling app, a to-do list app, a service provider app, a software testing app, a storage repository app, and/or the like. As described herein, it should be understood that the term "application" may be user to refer to either an external application or an internal application (i.e. an application hosted within the group-based communication server(s) 110).

The processing action(s) may include any executable action performed by an application system 112-116. The processing action may be embodied as a data generation process, a data manipulation process, and/or the like that is performed based at least in part on data included within a processing action execution data packet (e.g., data generated in response to user input received via a client device defining a configuration of one or more processing action parameters in order to execute the processing action) provided from the group-based communication system 118 to the application system 112-116. In some examples, the processing action execution data packet may be associated with a processing action identifier, a user identifier, and/or a client device 102, 104, or 106.

As used herein, a data packet may include a collection of individual data elements that may be transmitted between a plurality of computing entities collectively, such that the included data remains associated therewith. The data packet may be configured to store data (e.g., routing data) therein with a standardized formatting, such that computing entities may be configured to automatically determine the type of data stored within the data packet. For example, a data packet may comprise substantive data to be passed between computing entities stored within a payload of the data packet, and the data packet may comprise metadata associated with the generation of the data packet that is stored within a routing data portion of the data packet.

In some examples, the processing action data packet provided for execution of a processing action may comprise routing data (e.g., which identifies the application system and/or the processing action to be executed) and payload data, which encompasses substantive data for which the processing action is executed. In some examples, the payload data comprises a message, processing action execution data, or other object and/or encompasses environmental contextual data (e.g., data indicative of a user's interaction with a group-based communication interface and/or an application system at a time of or within a threshold time prior to the request of a processing action), as described herein, to be utilized in executing the processing action. However, it should be understood that in some examples, the payload data may be minimal (or empty), for processing actions not requiring an input for execution. As various examples, a processing action may be the creation of a calendar object (e.g., via a scheduling app), the creation of a "to-do" item (e.g., via a productivity app), the creation of a service ticket (e.g., via a service app), the creation of a bookmark (e.g., via a link compilation app), the creation of a file (e.g., via a document editing app), the initiation of a call (e.g., via a video conferencing app), and/or the like. In some examples, processing actions associated with an application may be configured at least in part based on processing action data provided by a developer associated with the application.

In some examples, the processing actions may be embodied as one of a plurality of processing action types. The processing action type of a processing action may be one of the processing action characteristics by which the processing action may be defined. For example, processing actions may comprise global processing actions, channel processing actions, message processing actions, object processing actions, and/or the like. As used herein, global processing actions are defined by a developer user associated with the global processing action as not being dependent on a particular channel, message, object, and/or the like. Global processing actions may be requested, for example, via an application home interface or a group-based communication interface menu (e.g., a file menu associated with the group-based communication interface displayed via a client device). As a non-limiting example, a global processing action may be the generation of a task item that is personal to a user.

In various examples, the processing actions may include channel processing actions, message processing actions, and/or object processing actions. A channel processing action may include a processing action that is dependent on the content of a particular group-based communication channel. For example, channel processing actions may be utilized for disseminating the result of a processing action to all (or some portion) of the members of a particular group-based communication channel. As another example, channel processing actions may utilize multiple group-based messages exchanged within a group-based communication channel as input (e.g., as payload data of a request for initiation of the processing action). Channel processing actions may be requested, for example, via a channel-specific menu (e.g., a menu adjacent to and/or associated with a user input portion for sharing messages and/or other objects within the channel).

A message processing action may include a processing action that is requested for initiation with respect to a particular group-based message. The group-based message associated with particular message processing actions may be provided as payload data with the request. As an example, message processing actions may encompass generating a task item for a particular user to address some content of a particular message. Message processing actions may be requested, for example, via a message-specific menu (e.g., a menu accessible via a graphical user interface element located adjacent a particular message).

An object processing action may include a processing action that is requested for initiation with respect to a particular group-based communication object. The group-based communication object associated with the particular object processing action may be provided as payload data with the request. As an example, object processing actions may encompass generating a task item for a particular user to address some attribute of a particular object. Object processing actions may be requested, for example, via an object specific menu (e.g., a menu accessible via a graphical user interface element located adjacent a particular object).

In some examples, each processing action type may be requested via discrete user interface elements presented to a user as a part of a group-based communication interface. In some examples, user interface elements associated with each of the processing action types may be presented simultaneously to the user as a part of the group-based communication interface. For example, a first user interface element corresponding to global processing actions may be presented to a user as a part of a global menu bar; a second user interface element corresponding to channel processing actions may be presented to a user as a part of a channel menu bar; a third user interface element corresponding to message processing actions may be accessible at and/or adjacent to each displayed message; a fourth user interface element corresponding to object processing actions may be presented at and/or adjacent to each displayed object.

In various examples, the processing actions may include processing action data, which may include a collection of data associated with a processing action that is capable of being transmitted, received, and/or stored. Processing action data may include data which defines the functionality of the processing action. For example, processing action data comprises data corresponding to each of the plurality of processing action characteristics (e.g., application identifier, processing action identifier, processing action description, one or more processing action parameters, processing action type, and/or the like). In some examples, processing action data may be configured by a developer associated with an application and/or a group-based communication server. In some examples, processing action data may be associated with an application identifier, a processing action identifier, one or more processing action characteristic identifiers, an executable processing action element, and/or an application home interface. In some examples, the processing action data may include at least a portion of application data associated with an application. The application data may include a collection of data associated with the application that is capable of being transmitted, received, and/or stored. In various examples, the application data may include data associated with an application system which defines the implementation and/or functionality of the application within a group-based communication system. For example, application data may comprise processing action data, application informational data, application settings data, application home interface configuration data, application contextual data (e.g., application home interface contextual data), and/or the like. In some examples, application data may be configured by a developer associated with an application and/or a group-based communication server.

As discussed above, the processing action data may include one or more processing action characteristics. The processing action characteristic(s) may include data which describes and/or defines, at least in part, one or more aspects of a processing action. For example, a processing action characteristic may comprise an application identifier, a processing action identifier, a processing action description, one or more processing action parameters, a processing action type, and/or the like. In some examples, a processing action parameter may define at least a part of the executable instructions associated with the processing action that may enable the execution of the processing action. In some examples, a processing action parameter may be represented as an input variable associated with the processing action that is required to facilitate the execution of the processing action based at least in part on corresponding user input. In some examples, a processing action parameter may be designated as either required or optional in relation to the execution of the processing action. In various examples, a processing action identifier may include one or more items of data by which a processing action may be uniquely identified. For example, a processing action identifier may comprise ASCII text, a pointer, a memory address, and the like. Further, as described herein, a processing action characteristic identifier may include one or more items of data by which a processing action characteristic may be uniquely identified. For example, a group-based processing action characteristic identifier may comprise ASCII text, a pointer, a memory address, and the like.

In some examples, processing actions may be made available to client devices 102-106 on a group-basis (e.g., such that individual processing actions are available to every member of a particular group), on a communication channel basis (e.g., such that individual processing actions are available to every member of a particular communication channel), on an individual basis (e.g., such that individual processing actions are available to certain individual client devices 102-106), on a sending user identifier basis (e.g., such that individual processing actions are available only for certain messages transmitted by particular users, such that the message is associated with a particular sending user identifier), and/or the like. As an added limitation, certain processing actions may only be executable via client devices 102-106 that are directly authenticated with a particular application system configured to execute the processing action (as indicated by the dashed lines between the individual client devices 102-106 and example application system 112-116).

In various examples, the processing actions may be made available to client devices 102-106 via an executable processing action element. The executable processing action element may include one or more discrete user interface elements (e.g., a selectable button) corresponding to a processing action that is presented to a user as a part of a group-based communication interface. In some examples, an executable processing action element may be configured to initialize a processing action associated therewith upon (e.g., responsive to) being selected via user input from a client device 102-106. In some examples, an executable processing action element may be selectively presented throughout a group-based communication interface based at least in part on the processing action type of the processing action with which the element is associated. For example, an executable processing action element corresponding to global processing actions may be presented to a user as a part of a global processing action menu, an application home interface, and/or a quick-access global processing action element displayed within the group-based communication interface. In some examples, an executable processing action element corresponding to a channel processing action may be presented to a user as a part of a channel processing action menu displayed within a group-based communication channel interface. In some examples an executable processing action element corresponding to a message processing action may be accessible at and/or adjacent to each displayed message.

The processing actions may be made available by the application system 112-116 based on developer interaction with the group-based communication system 118 setting access limitations for the processing actions. Those processing actions may comprise one or more discrete functions provided by the application system. For example, a single function of the application system may be called via the processing actions, or a plurality of processing actions, collectively considered a workflow characterized by passing input and/or output between each of the plurality of functions, may define a processing action. In some examples, a workflow may rely on one or more functions performed by the group-based communication system to begin a workflow, to end a workflow, and/or between other functions of a workflow. For example, a workflow may comprise functions performed by the application system 112-116 to generate an output passed back to the group-based communication system 118, that output causing the group-based communication system 112-116 to execution one or more additional functions, which may be utilized by one or more additional functions of the application system 112-116.

In some examples, a developer associated with the application system 112-116 may provide user input to the group-based communication system identifying the availability of one or more processing actions and/or identifying the processing action type to thereby enable the group-based communication system to determine how the processing action is to be made available to users. For example, user input may specify that a particular processing action is a message processing action, to be made available to users via message-specific menus.

Example Apparatuses Utilized with Various Embodiments

Figure 2:
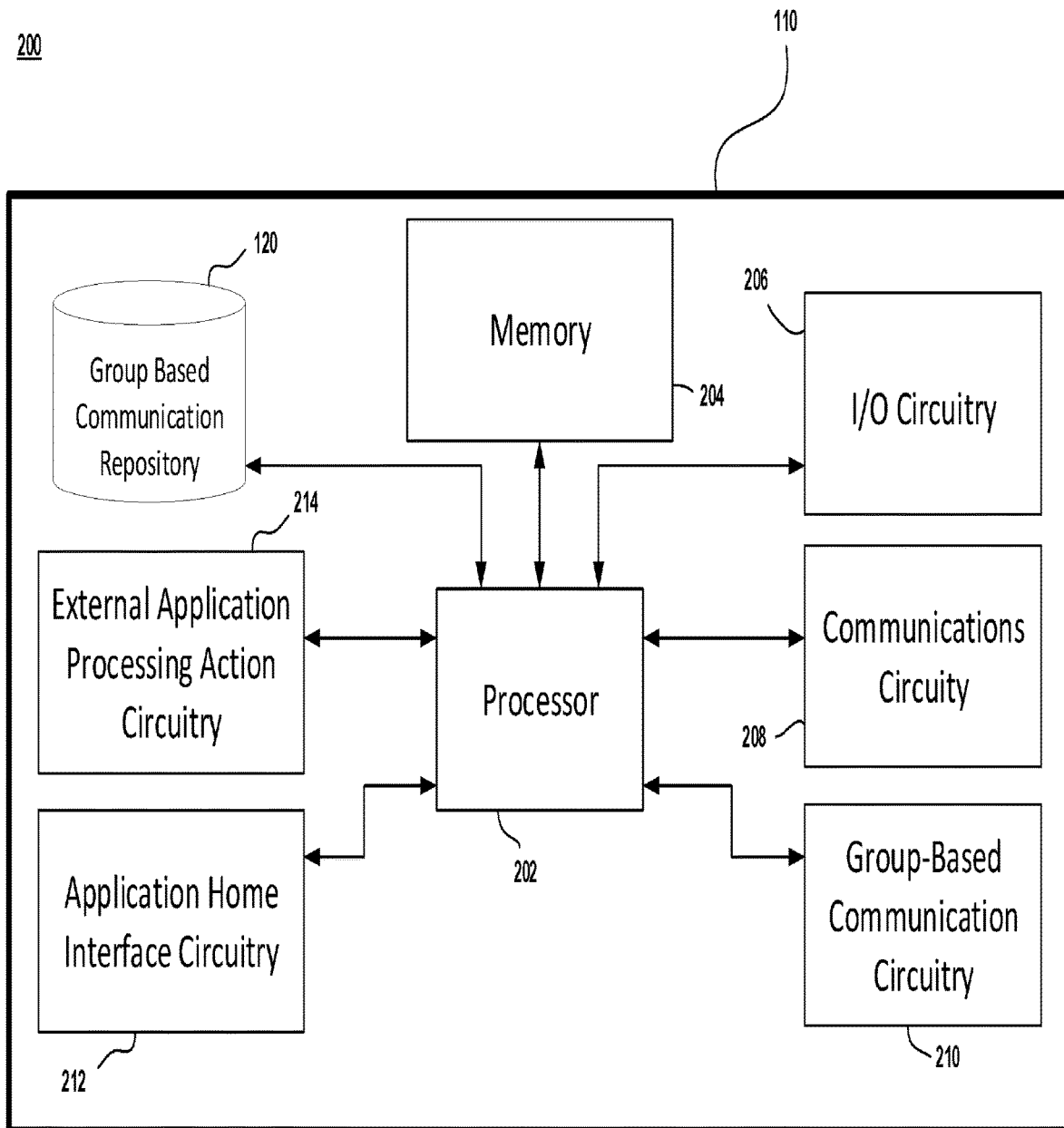
FIG. 2 illustrates an apparatus of a group-based communication server(s) in accordance with one embodiment.

Each group-based communication server(s) 110 may be embodied by one or more computing systems, such as apparatus 200 shown in FIG. 2. The apparatus 200 may include processor 202, memory 204, input/output circuitry 206, communications circuitry 208, and group-based communication circuitry 210, application home interface circuitry 212, and application processing action circuitry 214. The apparatus 200 may be configured to execute the operations described herein with respect to FIGS. 9A-11 and 14A-14C. Although these components 202-214 are described with respect to functional limitations, it should be understood that the particular implementations necessarily include the use of particular hardware. It should also be understood that certain of these components 202-214 may include similar or common hardware. For example, two sets of circuitries may both leverage use of the same processor, network interface, storage medium, or the like to perform their associated functions, such that duplicate hardware is not required for each set of circuitries.

In some examples, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus 200 to carry out various functions in accordance with example embodiments of the present invention.

The processor 202 may be embodied in a number of different ways and may, for example, include one or more processing devices configured to perform independently. In some preferred and non-limiting examples, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting examples, the processor 202 may be configured to execute instructions stored in the memory 204 or otherwise accessible to the processor 202. In some preferred and non-limiting examples, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 102-106 to enable message sharing therebetween. The processor 202 ensures that messages intended for exchange between the client devices 102-106 within the particular communication channel are properly disseminated to those client devices 102-106 for display within respective display windows provided via the client devices 102-106.

Moreover, the processor 202 may be configured to synchronize messages exchanged on a particular communication channel with a database for storage and/or indexing of messages therein. In some examples, the processor 202 may provide stored and/or indexed messages for dissemination to client devices 102-106.

In some examples, the apparatus 200 may include input/output circuitry 206 that may, in turn, be in communication with processor 202 to provide output to the user and, in some examples, to receive an indication of a user input. The input/output circuitry 206 may comprise a user interface and may include a display, and may comprise a web user interface, a mobile application, a client device, a kiosk, or the like. In some examples, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communication circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communication circuitry 208 may include, for example, a network interface for enabling communications with a wired or wireless communication network. For example, the communication circuitry 208 may include one or more network interface cards, antennae, buses, switches, routers, modems, and supporting hardware and/or software, or any other device suitable for enabling communications via a network. Additionally or alternatively, the communication circuitry 208 may include the circuitry for interacting with the antenna/antennae to cause transmission of signals via the antenna/antennae or to handle receipt of signals received via the antenna/antennae.

Group-based communication circuitry 210 includes hardware configured to support a group-based communication system 118. The group-based communication circuitry 210 may utilize processing circuitry, such as the processor 202, to perform these actions. The group-based communication circuitry 210 may send and/or receive data from group-based communication repository 120. In some implementations, the sent and/or received data may be of digital content objects organized among a plurality of group-based communication channels. It should also be appreciated that, in some examples, the group-based communication circuitry 210 may include a separate processor, specially configured field programmable gate array (FPGA), or application specific interface circuit (ASIC). The group-based communication circuitry 210 may be implemented using hardware components of the apparatus 200 configured by either hardware or software for implementing these planned functions.

The application home interface circuitry 212 may be any means such as a device or circuitry embodied in either hardware or a combination of hardware and software that is configured to generate an application home interface based at least in part on application data and/or application home interface configuration data. In various examples, the application home interface configuration data may include a collection of data generated based at least in part on user input received from a developer client device associated with an application. In various examples, application home interface configuration data may be generated based on user input received from the developer via an interactive developer interface. In some examples, application home interface configuration data may comprise one or more executable instructions configured to facilitate the generation of an application home interface and/or the display of developer-provided information therein. In some examples, application home interface configuration data may comprise application informational data and/or application settings data.

In various examples, application informational data may include data providing various information about an application. For example, application informational data may comprise a detailed description of the application, the developer, various application functionalities, application reviews, and/or application history. In some examples, application informational data may include at least a portion of application contextual data associated with the application such that the application informational data may detail various application contextual data (e.g., usage data associated with engagement of the application within the group-based communication system (e.g., the number and/or name of group-based communication channels in which the application is associated), and/or the like). In some examples, at least a portion of the application informational data may be generated at least in part by user input from a developer associated with the application. In some examples, at least a portion of the application settings data may be rendered in the group-based communication interface (e.g., within an application home interface).

In some examples, application settings data may include data defining at least a portion of a settings framework associated with an application, which may be defined at least in part by a developer associated with the application. For example, the application settings data may define which application settings are available to be configured by a user. The application settings data may be selectable and/or configurable by a developer of the application at the time of application integration into a group-based communication system or any time thereafter. In some examples, the application settings data may define one or more of the interactive settings pane inputs rendered at the interactive settings pane. In some examples, application settings data may be generated by a group-based communication server. In some examples, at least a portion of the application settings data may be rendered in an interactive settings pane within a group-based communication interface (e.g., within an application home interface). In various examples, the applications settings data may include application settings preferences data including one or more preferences associated with a user identifier and generated based at least in part on user input at a client device corresponding to at least one of the application settings. In some examples, the application settings preference data may represent a user-preferred method by which one or more functionalities of an application are to be executed. In certain circumstances, application settings preference data may comprise a default setting configuration as set by a developer or the group-based communication server.

In various examples, the application home interface circuitry 212 may be configured to process one or more executable instructions generated based at least in part on user engagement by a client device with an element within an application home interface. The application home interface circuitry 212 may utilize processing circuitry, such as the processor 202, to perform these actions. The application home interface circuitry 212 may send and/or receive data from group-based communication repository 120. In some implementations, the sent and/or received data may be application data, processing action data, application home interface configuration data, and/or other data of a group-based communication data corpus (e.g., collection of data (e.g., group-based communication data work objects, group-based communication messages, group-based communication channels, and user profiles associated with the group-based communication system, etc.) that is received by a group-based communication system through the group-based communication interfaces). It should also be appreciated that, in some examples, the application home interface circuitry 212 may include a separate processor, specially configured field programmable gate array (FPGA), or application specific interface circuit (ASIC).

The application processing action circuitry 214 may be any means such as a device or circuitry embodied in either hardware or a combination of hardware and software that is configured to, upon detecting user engagement by a client device with an executable processing action element associated with a processing action of an application, initialize the processing action and facilitate the execution of the processing action by the application. The application processing action circuitry 214 may utilize processing circuitry, such as the processor 202, to perform these actions. The application processing action circuitry 214 may send and/or receive data from group-based communication repository 120. In some implementations, the sent and/or received data may be processing action data, environmental contextual data, or other data of a group-based communication data corpus. It should also be appreciated that, in some examples, the application processing action circuitry 214 may include a separate processor, specially configured field programmable gate array (FPGA), or application specific interface circuit (ASIC).

In various examples, the environmental contextual data may include contextual data (e.g., data indicative of a user's interaction with group-based communication interface and/or an application system) that is indicative of a user's interaction with a group-based communication interface at the time of, or immediately prior to the request of a processing action. In some examples, the environmental contextual data may refer to a graphical interface from which the user requests execution of a processing action (e.g., a graphical interface associated with a particular communication channel, a graphical interface associated with a particular group, a graphical interface associated with a particular application system, and/or the like); a history of graphical interfaces visited (e.g., during a current connection session or spanning multiple connection sessions) prior to arriving at the current graphical interface from which the user requests execution of the processing action, and the route taken between those graphical interfaces before the user requests execution of a processing action; the identity and/or characteristics of users, messages, and/or other objects visible to the user in a graphical user interface from which execution of a processing action is requested (e.g., the content of the graphical interface displayed to the user), and/or the like.

In various examples, the environmental contextual data may include a listing, table, or other data structure comprising one or more user identifiers, session identifiers, active group-based communication channel identifiers (indicative of a channel currently being viewed by a user (via a client device), active group identifiers (indicative of a group currently being viewed by a user (via a client device)), one or more prior group-based communication channel identifiers (indicative of one or more channels viewed during the current connection session and/or prior connection sessions), one or more application identifiers, one or more processing action search identifiers, and/or the like. The environmental contextual data may comprise additional identifying data as well, such as time stamps, dates, user identifiers with whom the user has corresponded with (e.g., a most-recently contacted user), and/or the like. Environmental contextual data may be generated and/or collected by the group-based communication system and/or a client device. The environmental contextual data may be stored in a cache memory storage area in some examples, which may be cleared upon the occurrence of certain events (e.g., the elapsing of a defined period of time from the generation of the environmental contextual data; the generation of a defined amount of newer-generated environmental contextual data, closing an application on the client device associated with the group-based communication system, and/or the like).

It is also noted that all or some of the information discussed herein can be based on data that is received, generated and/or maintained by one or more components of apparatus 200. In some examples, one or more application systems (such as a remote cloud computing and/or data storage system) may also be leveraged to provide at least some of the functionality discussed herein.

The term "circuitry" should be understood broadly to include hardware and, in some examples, software for configuring the hardware. With respect to components of each apparatus 200, the term "circuitry" as used herein should therefore be understood to include particular hardware configured to perform the functions associated with the particular circuitry as described herein. For example, in some examples, "circuitry" may include processing circuitry, storage media, network interfaces, input/output devices, and the like. In some examples, other elements of the apparatus 200 may provide or supplement the functionality of particular circuitry. For example, the processor 202 may provide processing functionality, the memory 204 may provide storage functionality, the communication circuitry 208 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, examples of the present invention may be configured as methods, mobile devices, backend network devices, and the like. Accordingly, examples may comprise various means including entirely of hardware or any combination of software and hardware. Furthermore, examples may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various examples of a group-based communication system 118 may comprise one or more databases configured for storing and/or indexing messages exchanged within various group-based communication channels.

Application Home Interface
Configuring an Exemplary Application Home Interface

The group-based communication server 110 may be configured to generate an application home interface for rendering within a group-based communication interface. An example application home interface 300 configuration is presented in FIG. 3. In various examples, the application home interface 300 may represent a centralized interactive virtual environment within a group-based communication interface configured to provide a user with application data associated with an application so as to facilitate user interaction with the application within the group-based communications system. The application home interface 300 may be configured to render application data associated with an application within a group-based communication interface so as to facilitate user interaction with the application within the group-based communications system. The application home interface 300 may be associated with an application identifier (e.g., items of data by which an application may be uniquely identified (e.g., ASCII text, a pointer, memory address, etc.)). The application home interface 300 may represent a centralized surface within a group-based communication interface configured to provide a user with information regarding each processing actions associated with an application, the basic functionality of the application, a high-level description about the application, one or more notifications and/or messages received from an application system associated with the application, application usage data (e.g., application contextual data); application settings data, and/or the like.

In some examples, an application home interface 300 may comprise one or more application home interface pages, one or more executable processing action elements, a welcome pane, and/or a user engagement pane. In various examples, each application home interface associated with each of the plurality of applications may comprise at least substantially similar structural layouts (e.g., with respect to the organization of the one or more application home interface elements within the interface) as defined by a group-based communication server. Conversely, the content of each application home interface (e.g., the information displayed within each of the application home interface elements) may be configured based on user input provided by a developer associated with the application. In some examples, an application home interface 300 may be configured at least in part based on application home interface configuration data provided by a developer via an interactive developer interface.

For example, an application home interface may be configured to provide information regarding each processing action associated with an application, the basic functionality of the application; a high-level description about the application, one or more notifications and/or messages received from an application system associated with the application, application contextual data, application settings data, and/or the like. The application contextual data may include data indicative of a user engagement with an application with a group-based communication system. In some examples, the application contextual data may include usage data (e.g., historical data, usage rate data, a favorite application identifier, and/or the like) associated with one or more user identifiers. of the group-based communication system. For example, application contextual data may comprise the number and/or name of each group-based communication channel with which the application is associated.

In some examples, the application contextual data may include application home interface contextual data. In such examples, the application home interface contextual data may include data indicative of user engagement with an application home interface within a group-based communication interface. In some examples, the application home interface contextual data may be associated with an application identifier, an application home interface identifier, a client device identifier, and/or a user identifier. In various examples, the application home interface contextual data may refer to usage data (e.g., historical data, usage rate data, and/or the like) associated with one or more user identifiers. For example, application home interface contextual data may comprise a previously visited indicator, a previously unvisited indicator, unread message indicator, and/or an abandoned page indicator associated with an application home interface identifier and a user identifier. As used herein, an indicator may include one or more items of data associated with one or more elements of a group-based communication system that indicates that a particular condition corresponding to the one or more elements associated therewith is present. In various examples, an indicator may comprise a textual or graphical statement generated as a representation that a given condition is present. For example, an indicator may be a data structure comprising a flag, or a record of a data structure whereby a logical "1" indicates that given condition is present and a logical "0" indicates that the given condition is not present.

Figure 3:
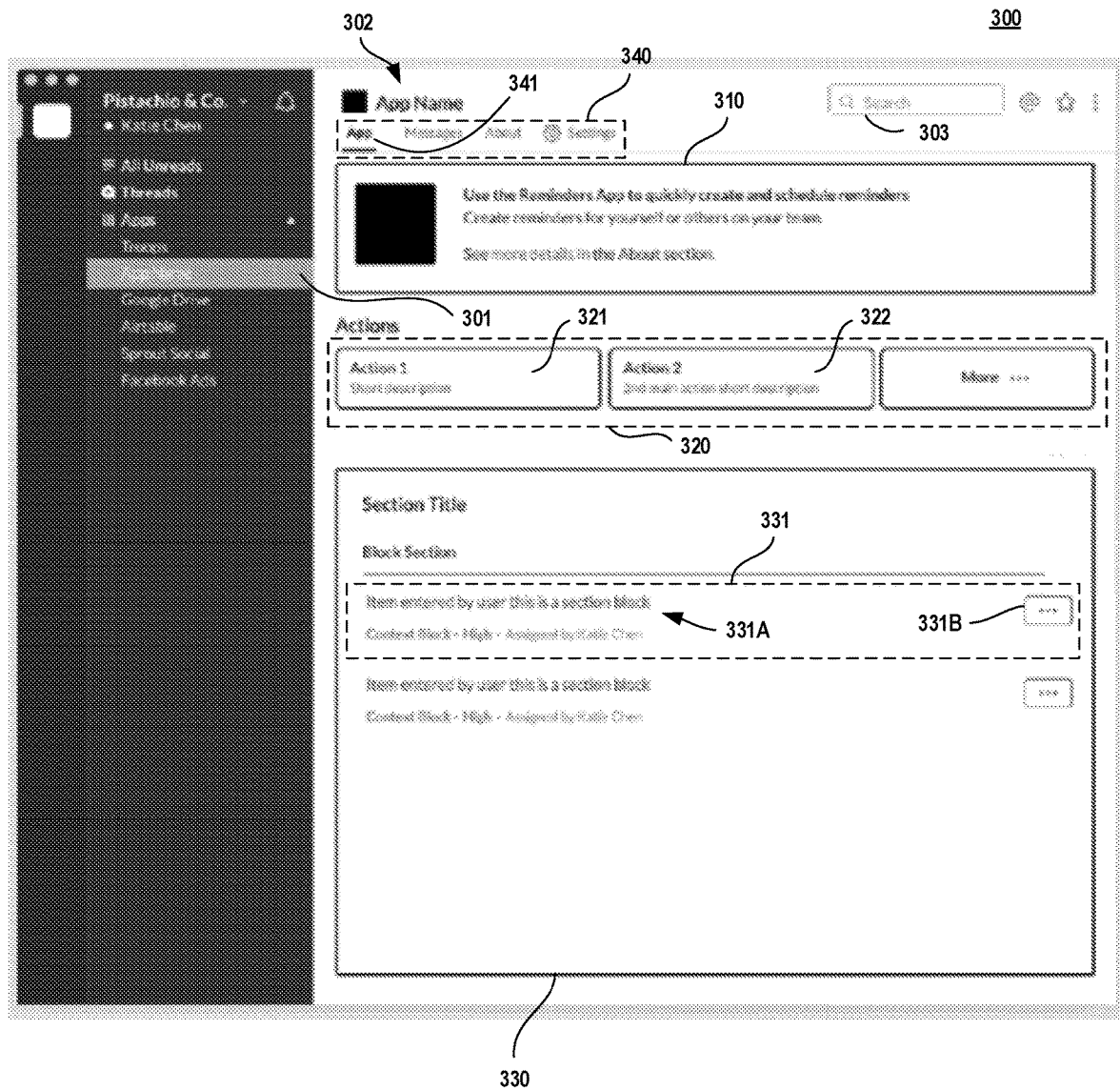
FIG. 3 shows an example group-based communication interface providing an application home interface.

As depicted in FIG. 3, the application home interface 300 may comprise various elements such as, for example, an application title element 302, an application home interface search bar 303, an application home interface welcome pane 310, one or more executable processing action elements 320, a user engagement pane 330, and one or more application home interface pages 340. In various examples, the group-based communication server 110 may be configured to generate the application home interface 300 responsive to receiving a selection of an application identifier element 301 associated with the application displayed within the group-based communication interface.

As shown in FIG. 3, the application title element 302 may be rendered within the application home interface 300 and may be associated with an application identifier associated with the application and configured so as to display the title of the application. Further, in various examples, the application title element 302 may be further configured to display an image associated with the application (e.g., an application logo).

In various examples, the application home interface search bar 303 is configured to receive user input and facilitate searching for otherwise unlisted processing actions not associated with the one or more executable processing action elements rendered within the application home interface. In various examples, the group-based communication server 110 may be configured to render a contextual list, as described herein, within a graphical interface component at the application home interface in response to user input at the application home interface search bar 303 received from the client device 102. In various examples, based at least in part on environmental contextual data associated with the client device 102, the contextual list may include one or more of the processing actions associated with the application 112 associated with the application home interface.

In various examples, the application home interface welcome pane 310 may be configured to display various informational data configured to represent a high-level description about the application and one or more functionalities thereof within the group-based communication system 118. In various examples, the application home interface welcome pane 310 may be further configured to display an image associated with the application (e.g., an application logo). The application home interface welcome pane 310 may be configured based at least in part on user input received from a developer client device associated with a developer user identifier associated with the application. For example, the application home interface welcome pane 310 may be configured based at least in part on application home interface configuration data.

Further, the application home interface 300 may comprise one or more executable processing action elements 320, each corresponding to a respective processing action of the application. An executable processing action element of the one or more executable processing action elements 320 may comprise a discrete user interface element (e.g., a selectable button) configured, for example, to initialize the processing action associated therewith responsive to being selected via user input from a client device. In various examples, each executable processing action element may be configured to display at least one of the processing action characteristics (e.g., processing action title and/or processing action description) of the processing action associated therewith. In some examples, the one or more executable processing action elements 320 may be selectively presented throughout a group-based communication interface (e.g., within an application home interface 300) based at least in part on the respective processing action types of each of the one or more processing actions with which the one or more elements 320 are associated. For example, the application home interface 300 may be configured to display executable processing action elements 320 associated with global processing actions (i.e. those processing actions wherein a message identifier and/or channel identifier are not required as processing action parameters in order for the processing action to be executed), as described herein.

In various examples, the one or more executable processing action elements 320 may be selectively displayed and/or spatially arranged relative to one another based at least in part on application home interface configuration data comprising an executable processing action element priority order, wherein the executable processing action element priority order defines the organization of each of the one or more executable processing action elements relative to the other executable processing action elements. In various examples, the executable processing action element priority order may be based at least in part on user input received from the developer client device associated with the developer user identifier such that the one or more executable processing action elements 320 are organized according to a priority rank (e.g., the executable processing action element associated with the highest priority processing action being arranged first) as established by the developer user.

Further, in various examples, the executable processing action element priority order may be based at least in part on environmental contextual data and/or application contextual data associated with the one or more processing actions and/or a user identifier. For example, the executable processing action element priority order may be configured such that the processing action that is most frequently executed by application (i.e. the most popular) or the processing action which is most frequently initialized by a user associated with the user identifier (i.e. the user's favorite processing action) may be associated with the highest relative priority, and thus arranged in a corresponding first position within the application home interface 300. In various examples, the one or more executable processing action elements 320 may correspond to only a subset of a plurality of processing actions associated with an application. In such a circumstance, an application home interface may be configured to render an interactive element corresponding to an option for searching for other processing actions associated with the application (for example, the application home interface 300 comprises an interactive interface element with an option for selecting "More . . . "). As various examples, a processing action may be the creation of a calendar object (e.g., via a scheduling app), the creation of a "to-do" item (e.g., via a productivity app), the creation of a service ticket (e.g., via a service app), the creation of a bookmark (e.g., via a link compilation app), the creation of a file (e.g., via a document editing app), the initiation of a call (e.g., via a video conferencing app), and/or the like.

In various examples, the application home interface 300 may comprise a user engagement pane 330 comprising a user engagement interface configured to display user engagement pane data so as to reflect the execution of one or more user engagement pane instructions associated with the application. As used herein, a pane may include a defined area within a group-based communication interface configured for rendering various data as determined and described herein. The pane may be embodied as a container, which may be populated with data received from an external data source. In various examples, the user engagement pane 330 may be configured to render user engagement pane data and receive user input associated with the user engagement pane data.

In various examples, a developer associated with the application may configure the user engagement interface with block kits, as described herein, provided by the group-based communication server 110 via transmitting block data to the server. The block data may include any data, data set, or data packet that is sent from an application and may be used by a group-based communication server of a group-based communication system for rendering a user engagement interface within a group-based communication interface associated with a client device. For example, the block data may include multiple "block arrays," each block array being associated with a respective block to be rendered for display within the user engagement interface.

In various examples, the user engagement interface may comprise one or more user engagement blocks 331 and may be configured to display block data including one or more block arrays, each block array being respectively associated with a user engagement block of the one or more user engagement blocks 331. A block array may comprise a plurality of block element values—electronically generated values associated with a respective attribute of a block element that may be used to define how the block element may be displayed within a user engagement block so as to reflect the block element configuration defined by a developer—associated with a user engagement block type. In various examples, the user engagement blocks 331 may include one or more designated sections or areas within a group-based communication interface that is used for displaying at least a portion of user engagement pane data. In some examples, a user engagement blocks 331 may be configured to reflect execution of one or more user engagement pane instructions corresponding to one or more functionalities of an application.

As described herein, a block array may comprise a plurality of block element values associated with a particular user engagement block type. In various examples, a block element value may be an electronically generated value associated with an attribute of a block elements 331A-B that may be used to define how the block elements 331A-B may be displayed within a user engagement block 331 so as to reflect the block element configuration defined by a developer. In various examples, each user engagement block 331 may comprise a user engagement block type of a plurality of user engagement block types available for rendering within the group-based communication interface, the plurality of user engagement block types comprising one or more of a text block type, a thumbnail block type, a divider block type, an image block type, a video block type, a meta block type, an action block type, a poll block type, a file block type, a call block type, a combination thereof, and/or the like.

In various examples, the user engagement interface may be defined by a customizable block configuration comprising the one or more user engagement blocks 331—as well as the one or more block elements 331A-B defined therein. In various examples, the customizable block configuration may be based at least in part on user input generated from a developer client device associated with the developer user identifier. In various examples, each user engagement block 331 may be associated with one or more user engagement pane instructions and configured to reflect the execution of the one or more user engagement pane instructions associated therewith by the application system 112-116. In various examples, the one or more user engagement pane instructions may correspond to one or more functionalities of the application.

In various examples, as shown in FIG. 3, while the customizable block configuration (e.g., the various block types associated with each of the user engagement blocks and their respective functionalities) may be defined based at least in part on user input generated by the developer associated with the application, at least a portion of the block data displayed within the one or more user engagement blocks may be generated based at least in part on the user identifier and/or user input generated by the client device 102 associated with the user identifier. For example, the block type of user engagement block 331, the display of a textual block element 331A corresponding to a user engagement pane instruction, and the display of an overflow menu button element 331B within the user engagement block 331 may be based on developer input, while the particular block data to be displayed at block element 331A may be based at least in part on user input generated by the client device 102 and/or application data associated with the user identifier.

The group-based communication server 110 may be configured to generate a user engagement pane within a group-based communication interface (e.g., an application home interface) at least partially in accordance with the systems and methods described in U.S. patent application Ser. No. 15/978,013, filed on May 11, 2018 the contents of which are incorporated herein by reference in their entirety.

In various examples, the application home interface 300 may comprise one or more application home interface pages 340 configured to display at least a portion of application data associated with an application. In certain circumstances, an application home interface may comprise a plurality of application home interface pages, which may each be configured for alternative display within the application home interface. The application home interface page 340 may include an interface element renderable to display an area by which at least a portion of application data associated with an application may be displayed. For example, an application home interface page 340 may be configured to display application message data associated with an application system, application informational data, application settings data, and/or the like. In some examples, an application home interface may comprise a plurality of application home interface pages, which may each be configured for alternative display within the application home interface. In examples wherein the application home interface 300 comprises a plurality of application home interface pages 340, each page may be configured to display different application data.

The group-based communication server 110 may be configured to display an application home interface page responsive to receiving a selection of an application home interface page identifier element associated therewith. In some examples wherein the application home interface comprises a plurality of application home interface pages, each page may be configured to display different application data. For example, the one or more application home interface pages 340 may be configured to display various processing action data, application message data associated with an application system, application informational data, application settings data, and/or the like. In some examples, the one or more application home interface pages 340 may comprise an application home interface home page, an application home interface message page, an application home interface about page, and/or an application home interface settings page. For example, FIG. 3 shows an exemplary embodiment of an application home interface 300 rendering an application home interface home page 341.

Figure 4:
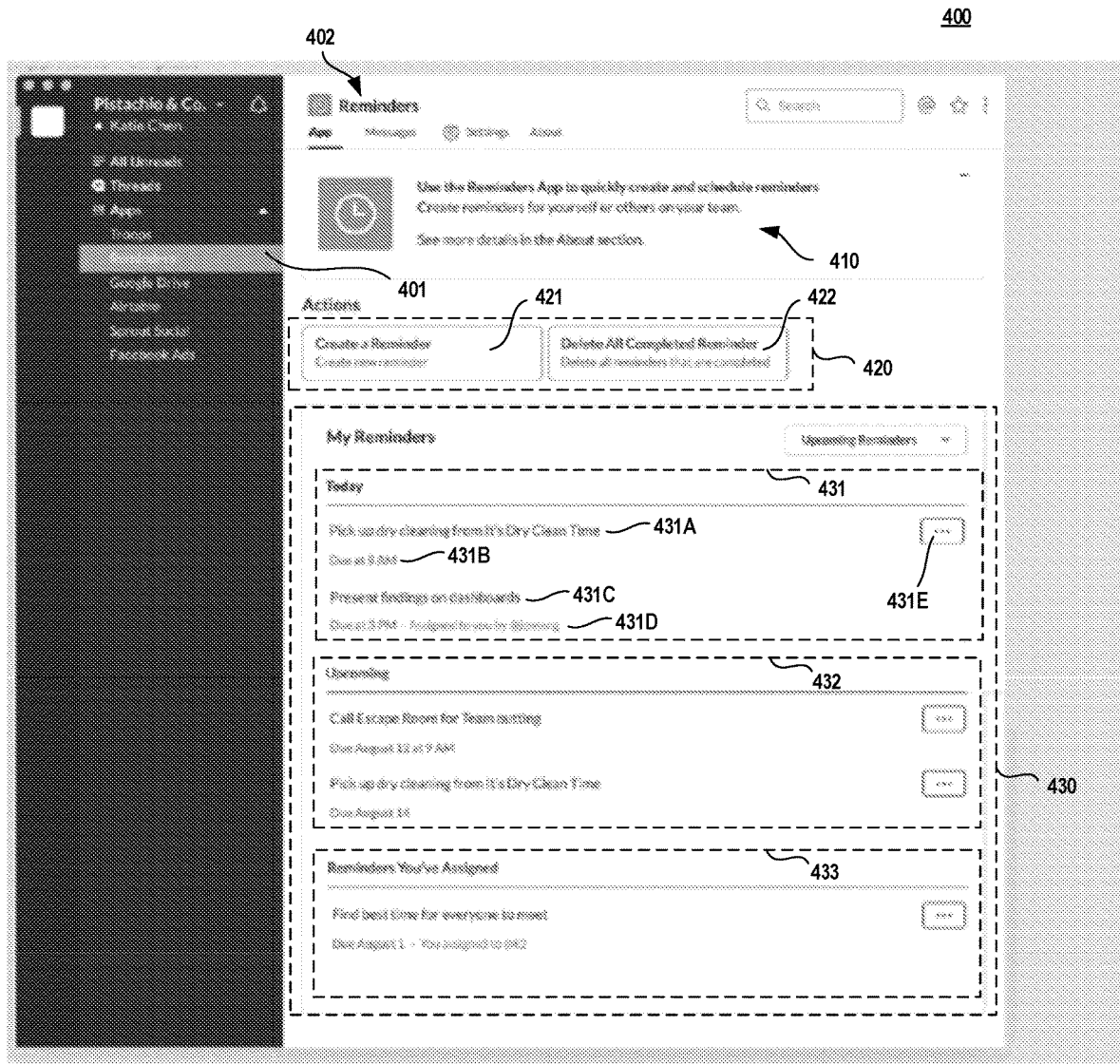
FIG. 4 shows another example group-based communication interface providing an application home interface.

An operational example of an application home interface 400 is presented in FIG. 4. As shown in FIG. 4, application home interface 400 is associated with application, wherein the application title element 402 is rendered within the application home interface 400 and associated with an application identifier associated with the application so as to display the title of the application, "Reminders." Further, the application title element 402 is configured to display the application logo associated with the exemplary application "Reminders." As shown, the group-based communication interface comprises an application identifier element 401 associated with an application identifier associated with the exemplary "Reminders" application such that the group-based communication server 110 may be configured to generate the application home interface 400 associated with "Reminders" responsive to receiving a selection thereof.

As illustrated in FIG. 4, the exemplary application home interface 400 comprises an application home interface welcome pane 410, one or more executable processing action elements 420, and a user engagement pane 430. The application home interface welcome pane 410 is configured to display various informational data associated with the "Reminders" application. As shown, in various examples, the application home interface welcome pane 410 may comprise a hyperlink configured to direct a user to a portion of the group-based communication interface (e.g., within the application home interface) configured to display at least a portion of the application information data associated with the application. The one or more executable processing action elements 420 of the exemplary application home interface 400 comprise a first executable processing action element 421 and a second executable processing action element 422, each corresponding to a respective processing action of the "Reminders" application. For example, the first executable processing action element 421 is associated with a processing action of the "Reminders" application titled "Create a Reminder," and the second executable processing action element 422 is associated with a processing action of the "Reminders" application titled "Delete All Completed Reminders." Each of the one or more executable processing action elements 420 are configured to display, within the rendered element, a plurality of processing action characteristics associated with the respective processing actions. For example, the first executable processing action element 421 is configured to display both the processing action title and an associated processing action description, indicating that the first executable processing action element 421 may function to create a new reminder upon execution. As a further example, the second executable processing action element 422 is configured to display both the processing action title and the associated processing action description, indicating that the second executable processing action element 422 may function to delete all reminders that are completed upon execution.

The exemplary application home interface 400 further comprises a user engagement pane 430 configured to render a user engagement interface. As shown, the one or more user engagement blocks comprise a first user engagement block 431, a second user engagement block 432, and a third user engagement block 433, each corresponding to a respective functionality of the "Reminders" application. For example, the first, second, and third user engagement blocks 431, 432, 433 are configured to display today's reminders, upcoming reminders, and reminders assigned by the user associated with the user identifier, respectively, each user engagement block corresponding to one or more user engagement pane instructions.

As shown, the one or more block elements of the first user engagement block 431 may include block elements 431A-431E. Block elements 431A and 431C, for example, comprise text elements generated based at least in part on application data associated with the user identifier and/or user input received from the client device 102 associated with the user identifier. The block elements 431A, 431C may be configured to display application data corresponding to the application functionality and the user engagement pant instructions associated with user engagement block 431. As shown, for example, block elements 431A and 431C are each configured to display a reminder (e.g., "Pick up dry cleaning from It's Dry Cleaning Time," "Present findings on dashboards") associated with the user identifier. In various examples, the application data displayed at each block element may be associated with a block element identifier.

Further, in various examples, the block elements 431B and 431D may comprise meta elements corresponding respectively to the block elements 431A and 431C, each being configured to display data (e.g., metadata) associated with a respective block element identifier of each block element 431A, 431C. For example, where block elements 431A, 431C are configured to display respective reminders associated with the user identifier, block elements 431B and 431D may be configured to display data associated with a reminder, such as a reminder deadline and/or reminder time (e.g., "Due at 9 AM," "Due at 3 PM").

Figure 5:
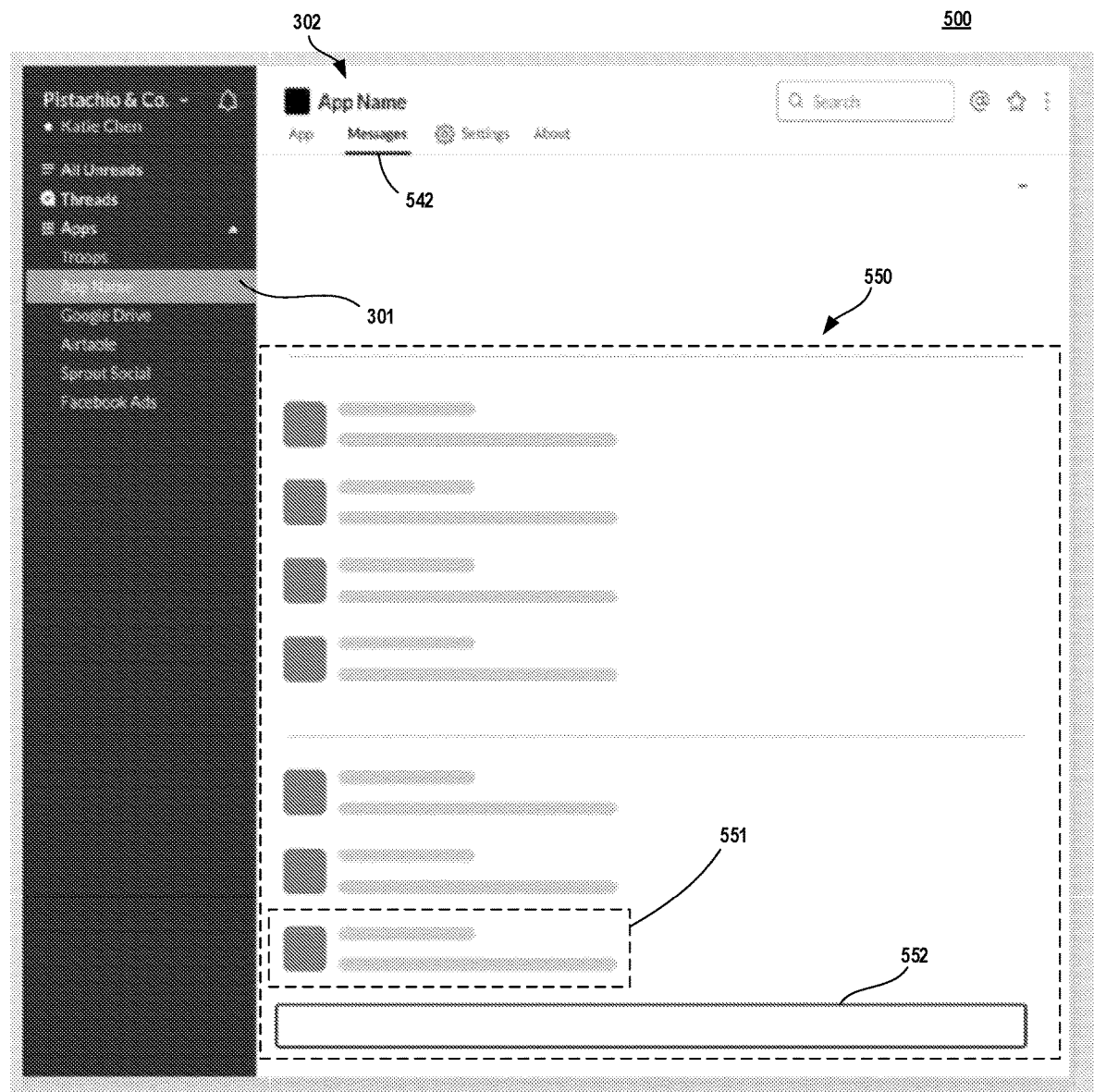
FIG. 5 shows another example group-based communication interface providing an application home interface.

FIG. 5 shows another example group-based communication interface providing an application home interface. Specifically, FIG. 5 shows an exemplary embodiment of an application home interface 500 rendering an application home interface message page 542. In various examples, an application home interface 500 may be configured to display application message data associated with an application and a user identifier received from an application system 112-116 and/or a client device 102 associated with the user identifier. In various examples, the application home interface 500 may be configured to receive and/or display the application message data 551 within an application messaging pane 550. In various examples, the application messaging pane 550 may comprise a message bar 552 configured to receive message content generated at the client device 102 associated with the user identifier.

In various examples, application message data 551 may comprise message content generated by the application system 112-116 corresponding to one or more functionalities of the application within the group-based communication system 118. Further, in various examples, application message data 551 may comprise message content generated by the client device 102 at the message bar 552 corresponding to one or more functionalities of the application within the group-based communication system 118. Message content displayed within the application home interface 500 may be representative of a correspondence between a user associated with the user identifier and the application system 112-116. In various examples, as described herein with respect to group-based communication messages, application message data 551 may further include data such as a message identifier, sending user identifier, application identifier, an application home interface identifier, attachments (e.g., files), message hierarchy data (e.g., the message may be a reply to another message), third-party metadata, an unread message identifier, and/or the like.

In various examples, the group-based communication server 110 may be configured to receive, generate, and display application message data 551 associated with an application home interface 500 such that the application home interface 500 may function as a private group-based communication channel interface, as described herein, wherein both the user identifier associated with the client device and a user identifier associated with a user profile associated with the application system are associated with access rights to the group-based communication channel (i.e. the application home interface). In various examples, as described herein, the group-based communication server 110 may be configured to display an unread message indicator within the application home interface 500. For example, an unread message indicator may be rendered within an application home interface 500 proximate an application home interface page identifier 542 and/or the application message data comprising the unread message content (e.g., application message data 551).

Figure 6:
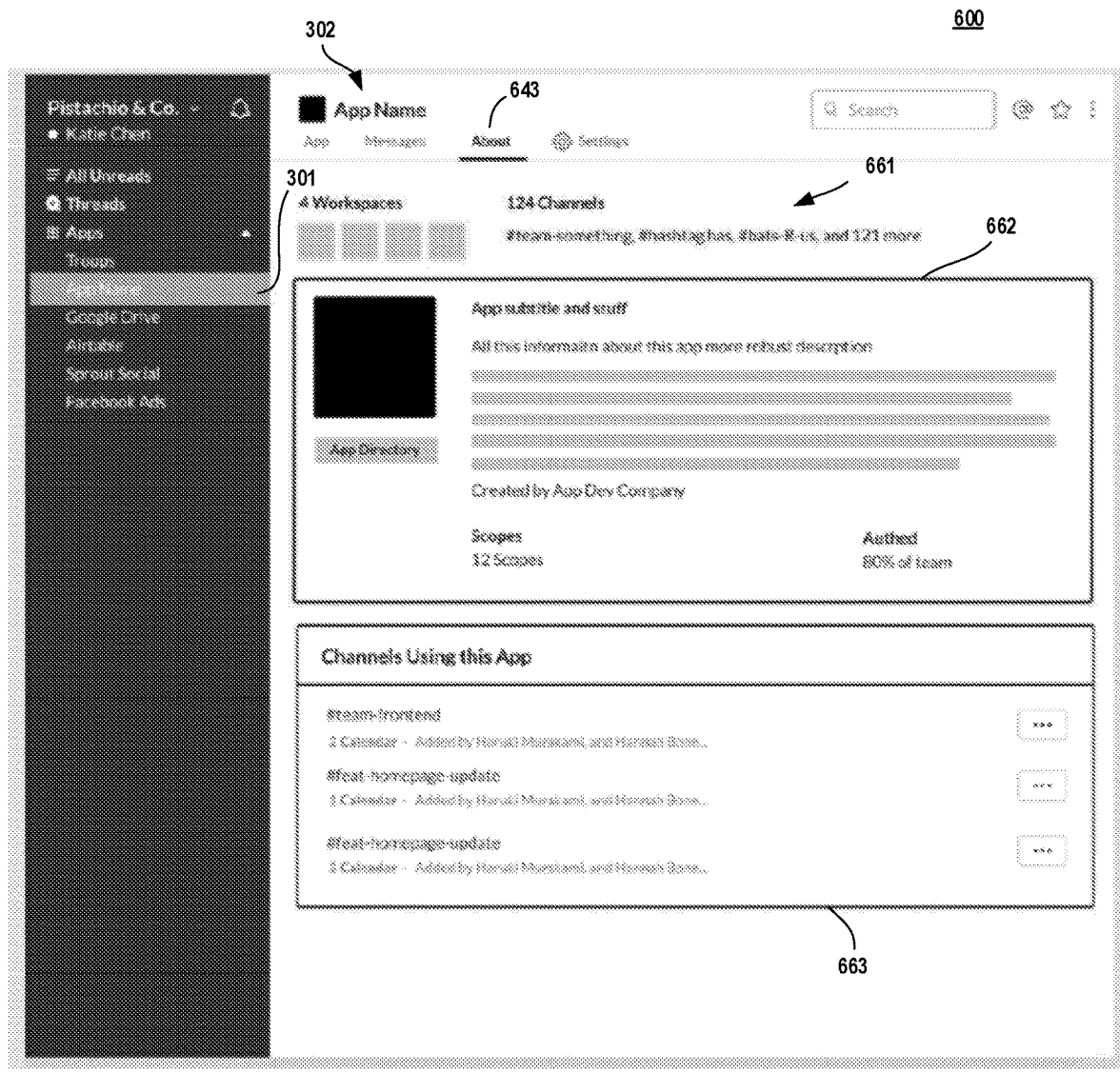
FIG. 6 shows another example group-based communication interface providing an application home interface.

FIG. 6 shows another example group-based communication interface providing an application home interface. Specifically, FIG. 6 shows an exemplary embodiment of an application home interface 600 rendering an application home interface about page 643. In various examples, an application home interface 600 may be configured to display at least a portion of application data comprising application informational data and/or application contextual data. As described herein, application informational data may comprise identifying information about the application (e.g., the title and/or subtitle of the application) and a detailed description of the application, the developer, various application functionalities, application reviews, and/or application history (e.g., application update history, currently installed application version identifier, application installation date, and/or the like). In some examples, at least a portion of the application informational data may be generated at least in part by user input from a developer associated with the application. Further, as described herein, application contextual data may comprise data indicative of user engagement with the application within a group-based communication system. For example, application contextual data may comprise to usage data (e.g., historical data, usage rate data, one or more favorite application identifiers, and/or the like) associated with one or more user identifiers of the group-based communication system 118. In various examples, the at least a portion of the application data configured for display within the application home interface 600 may be stored within a group-based communication repository 120, from which the group-based communication server 110 may be configured to retrieve the data.

As illustrated in FIG. 6, the exemplary application home interface 600 is configured to render both application informational data and application contextual data within the application home interface 600. For example, the application home interface 600 displays at least a portion of the application contextual data associated with the application at both a first interface element 661 and a third interface element 663. As shown, the application contextual data displayed at the first interface element 661 provides the number of group-based communication workspaces and the number of group-based communication channels associated with application. In various examples, a group-based communication workspace identifier and a group-based communication channel identifier associated with one or more of the workspaces and/or channels with which the application is associated may be displayed at the first interface element 661 within the application home interface 660.

Figure 7:
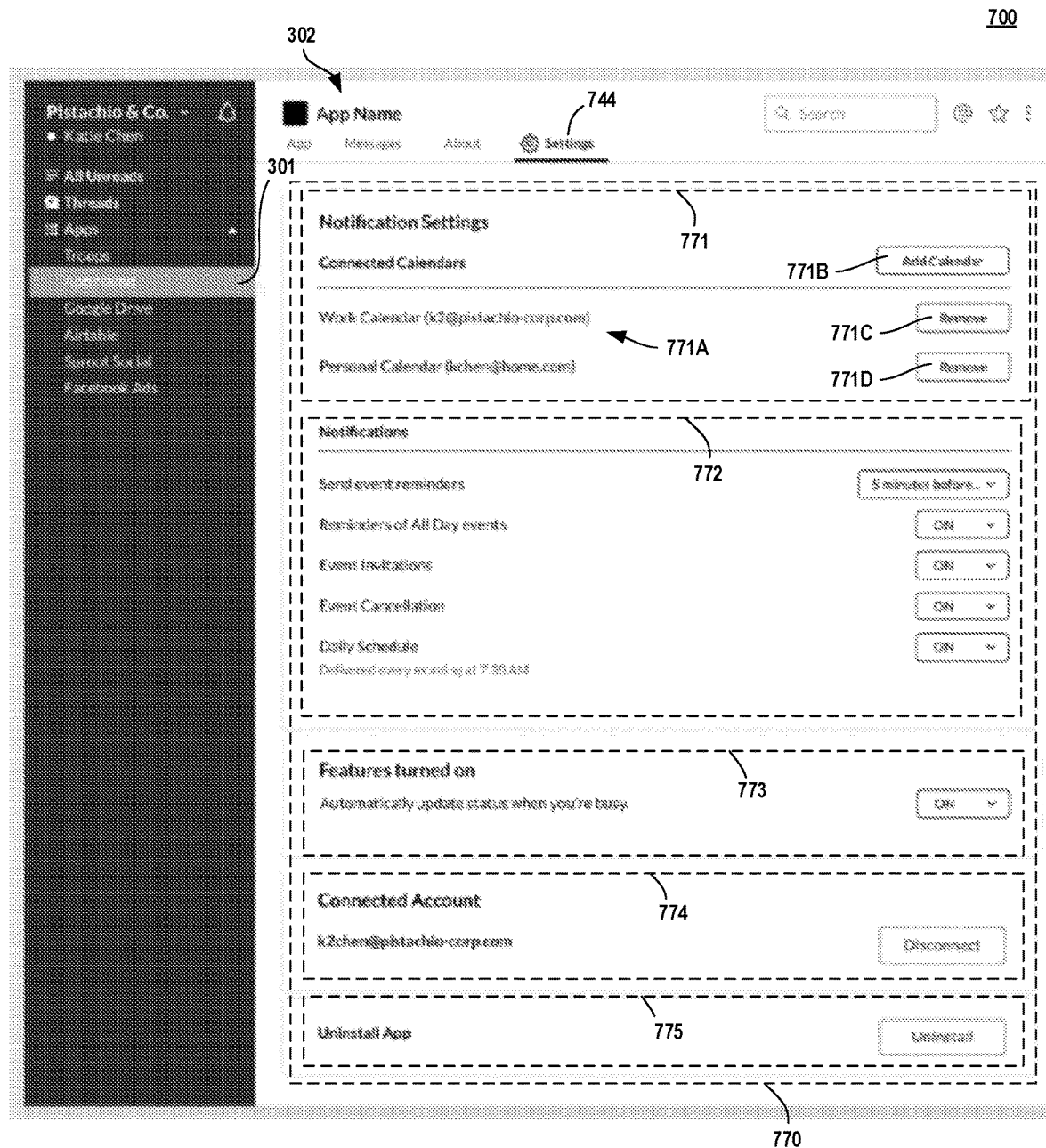
FIG. 7 shows another example group-based communication interface providing an application home interface.

Further, as shown in FIG. 6, the application contextual data displayed at the third interface element 663 may provide one or more group-based communication channel identifiers associated with respective group-based communication channels that each utilize the application (i.e. group-based communication channels that are associated with the application). In various examples, the rendered application contextual data may further comprise data such as, for example, the user identifier associated with a user who added the application to the group-based communication channel. In various examples, the application contextual data may be further associated with a user identifier associated with the client device 102, such that the application contextual data displayed within the application home interface 600 may comprise personalized usage data associated with the user identifier corresponding to the user's interaction with application throughout the group-based communication system 118. As a further example, the exemplary application home interface 600 may be configured to display at least a portion of the application informational data associated with the application at a second interface element 662. As shown, the application informational data displayed at the second interface element 662 comprises a detailed description of the application as provided by a developer and a developer user identifier associated with a developer (e.g., a developing company). In various embodiment, FIG. 7 shows another example group-based communication interface providing an application home interface. Specifically, FIG. 7 shows an exemplary embodiment of an application home interface 700 rendering an application home interface settings page 744. In various examples, an application home interface 700 may be configured to display at least a portion of application data comprising application settings data. As described herein, application settings data may comprise data associated with a user identifier, an application home interface, and an application which defines at least a portion of a settings framework associated with the application. In various examples, the application settings data may be generated at least in part based on user input at a client device associated with a developer associated with the application. For example, the application settings data may define which application settings are available to be configured by a user within the group-based communication system 118. The application settings data may be selectable and/or configurable by a developer of the application at the time of application integration into a group-based communication system or any time thereafter. Further, in various examples, at least a portion of the application settings data may be generated by the group-based communication server 110. In various examples, the group-based communication server 110 may be configured to generate application settings data defining one or more default settings for each application of the plurality of application settings implemented within the group-based communication system. As described herein, application settings preference data may represent a user-preferred method by which one or more functionalities of an application are to be executed.

As shown in FIG. 7, the application home interface 700 may comprise an interactive settings pane 770 within which the group-based communication server 110 may be configured to render at least a portion of the application settings data. In various examples, the interactive settings pane 770 may be configured for rendering application settings data. In certain examples, the interactive settings pane 770 may be configured to accept user input at one or more interactive settings pane inputs (e.g., as a selection of one or more of a plurality of available settings options, as freeform input, and/or the like), the user input defining application settings preference data. The one or more interactive settings pane inputs may be defined at least in part by application settings data. In some examples, the interactive settings pane may be further configured for rendering application settings preference data generated in response to the user input. In some examples, the interactive settings pane 770 may be a defined pane within an application home interface.

In various examples, the interactive settings pane 770 may be determined based on application settings data, which may further define one or more of the interactive settings pane inputs rendered at the interactive settings pane 770. In various examples, the application settings data associated with the user identifier and the application may be modified based on user input the application home interface 700 from the client device 102 associated with the user identifier. In various examples, each of the one or more interactive settings pane inputs may correspond to a respective application setting. The group-based communication server 110 may be configured to generate application settings preference data associated with the user identifier based on the user input. For example, application settings preference data may be generated based on user input at the one or more interactive settings pane inputs, such that the application settings preference data corresponds to at least a portion of the application settings data configured by the group-based communication server 110 and/or the developer user (e.g., at least one of the corresponding to at least one of the application settings).

As illustrated in FIG. 7, the interactive settings pane 770 may be configured at least in part by a developer associated with the application. As shown, the interactive settings pane may comprise a block kit configuration, as described herein, comprising blocks 771-775 that are collectively configured according to a customizable block configuration defined by the developer. Each block 771-771 is configured to display block data associated with one or more instructions associated with a respective function of one of the group-based communication system 118 or the application 112. As shown, each of the interactive settings pane inputs are embodied as block elements—defined by a plurality of block element values that define one or more physical attributes of the block element—that are each configured to display block data corresponding to a particular application setting and/or functionality. For example, the first block 771 comprises a first text element 771A configured to display application settings data (e.g., the connected calendars associated with application 112. Conversely, block elements 771B, 771C, and 771D each correspond to a respective functionality of the application 112 (e.g., "Add a Calendar," "Remove"). In various examples, one or more of the blocks defined by the interactive settings pane may be based at least in part on based on one or more group-based communication server default settings generated for each application of the plurality of applications implemented within the group-based communication system 188. For example, as shown in FIG. 7, Block 775 is configured to display block data associated with an "Uninstall App" functionality. In such a circumstance, each application home interface generated by the group-based communication server 110 would be configured to display application settings data corresponding to the "Uninstall App" functionality.

As described herein with respect to FIGS. 3-7, the application home interface may comprise one or more application home interface pages. In various examples wherein the application home interface comprises a plurality of application home interface pages, each of the plurality of pages may be configured for alternative display.

Figure 8:
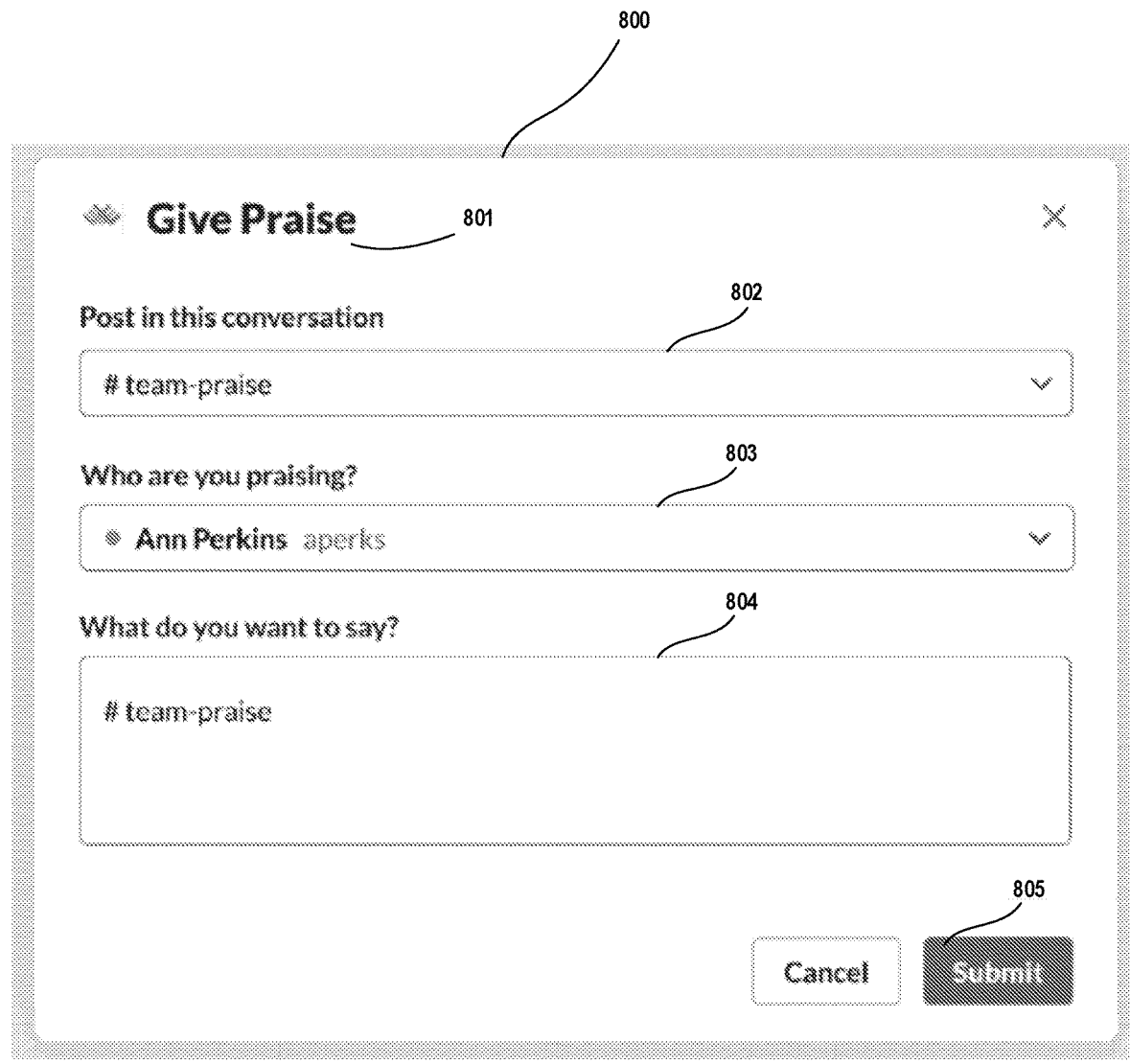
FIG. 8 shows another example group-based communication interface providing an interactive dialog associated with a processing action in accordance with one exemplary embodiment.

FIG. 8 provides an example group-based communication interface providing an interactive dialog associated with a processing action in accordance with one exemplary embodiment. As used herein, the interactive dialog may include a user interface element configured to accept user input (e.g., as a selection of one or more of a plurality of available options, as freeform input, and/or the like). The interactive dialog may be presented as a pop-up or an overlaid display element displayed visually over another portion of a user interface, or the dialog may be presented as a portion of a larger user interface element. In some examples, an interactive dialog may comprise one or more interactive dialog inputs.

As illustrated in FIG. 8, interactive dialog 800 is embodied as a fillable form associated with a processing action. The group-based communication server 110 may be configured to generate interactive dialog 800 for rendering at a client device 102 responsive to receiving a selection of an executable processing action element associated with the processing action from the client device 102. As shown, the interactive dialog is associated with the "Give Praise" processing action. In various examples, the interactive dialog 800 may comprise a processing action title element 801, which may be configured so as to display the processing action title of the processing action. Further, in various examples, the processing action title element 801 may be further configured to display an image associated with the application (e.g., an application logo) associated with the processing action.

An interactive dialog may comprise one or more dialogs based at least in part on processing action data, each corresponding to a respective processing action parameter of associated with the processing action, wherein each of the one or more processing action parameters comprises information needed by the application system 112-116 for executing the particular processing action. In various examples, each of the one or more dialogs may comprise a fillable field, drop-down, checkbox, and/or the like usable by a user to input a processing action parameter. As described herein, each of the one or more processing action parameters associated with a processing action may be designated as either an optional parameter or a required parameter. Optional parameters are not required in order to for an application system to execute the processing action associated therewith, but input corresponding thereto may facilitate additional and/or more particularized functionality of the associated processing action. The group-based communication server 110 may be configured so as to initialize a processing action only responsive to receiving information corresponding to each required parameter associated with the processing action.

As shown, the exemplary interactive dialog 800 associated with the "Give Praise" processing action comprises a first dialog 802 for selecting the group-based communication channel in which the particular message input (i.e. the exemplary praise message) is to be posted. In various examples, where the first interactive dialog 802 identifies a group-based communication channel identifier a processing action parameter of the "Give Praise" processing action, and where the channel identifier is designated as a required parameter, the "Give Praise" processing action should be understood to comprise a channel processing action, as described herein. In various examples, where the group-based communication channel identifier is designated as an optional parameter, the "Give Praise" processing action should be understood to comprise a global processing action, as described herein. Further, the interactive dialog 800 comprises a second dialog 803 and a third dialog 804 for selecting a user (e.g., a user identifier associated with a user) associated with the group-based communication system 118 to praise and for entering message input (i.e. the exemplary praise message) to be posted within the group-based communication channel associated with the channel identifier input at the first dialog 801. In various examples, the data input at each of the first, second, and third dialogs 802, 803, 804 may be respectively generated based at least in part on user input received at a client device 102 and/or contextual data retrieved from a group-based communication repository 120, as described herein. Responsive to detecting input data corresponding to each required processing action parameters associated with the processing action (e.g., at each of the corresponding dialogs within the interactive dialog 800), the group-based communication server 110 may be configured so as to initialize the processing action responsive to receiving a selection of a processing action input confirmation element 805. The group-based communication server 110 may be configured to generate an interactive dialog embodied as a fillable form partially filled with environmental contextual data at least partially in accordance with the systems and methods described in U.S. patent application Ser. No. 16/399,730, filed Apr. 30, 2019, the contents of which are incorporated herein by reference in their entirety.

Example Data Flows

FIGS. 9A-9D illustrate a lane diagram showing functionality of various components associated with an exemplary application home interface in accordance with various examples. As noted herein, application data is data associated with an application system 112-116 which defines the implementation and/or functionality of an application within a group-based communication system 118. For example, application data may comprise processing action data, application informational data, application settings data, application home interface configuration data, application contextual data (e.g., application home interface contextual data), user engagement pane data, and/or the like. In some examples, application home interface configuration data may comprise one or more executable instructions configured to facilitate the generation of an application home interface and/or the display of developer-provided information therein. For example, in some examples, application data may be generated by a developer associated with an application and the application system 112-116, such that the group-based communication server 110 may receive the application data from a client device associated with the developer and/or the application system 112-116, as reflected at Block 901 of FIG. 9A. In various examples, the application received by the group-based communication server 110 from the application system 112-116 may comprise a request URL relating to the application system 112-116. In various examples, the application data may comprise a plurality of request URLs relating to the application system 112-116, each request URL of the plurality of URLs being associated with a respective processing action of the application system 112-116. In various examples, each URL enables communication between the group-based communication server 110 and the application system 112-116 by identifying a location to which data (e.g., routing data and/or payload data included within a data packet, additional data provided from a client device 102-106 in response to an interactive dialog, and/or the like) may be provided by the group-based communication server 110 (e.g., from the group-based communication repository 120) to the application system 112-116.

As reflected at Block 902, the application data received from the application system 112-116 by the group-based communication server 110 may be associated with an application identifier comprising one or more items of data by which an application 112-116 may be uniquely identified. Once the application data is associated with a corresponding application identifier, the group-based communication server 110 transmits the application data to the group-based communication repository 120 for storage as indicated at Blocks 903 and 904. In some examples, the group-based communication server may be configured to generate an application identifier element associated with the application based at least in part on the application data as shown at Block 905.

As shown at Block 906, the group-based communication server 110 may then transmit the application identifier element to one or more client devices for rendering within a group-based communication interface displayed via a respective display device of at least one of the one or more client devices 102-106. In some examples, the application identifier element may comprise an executable element (i.e. a selectable button) configured to be displayed within the group-based communication interface. As shown at Block 907, a user selection of the application identifier element may be received at the client device 102 and transmitted to the group-based communication server 110, as shown at Blocks 908 and 909. In some examples, the selection of the application identifier element may represent a user request to generate an application home interface associated with the application associated with the selected application identifier element.

Responsive to receiving of the selection of the application identifier element, the process proceeds to Blocks 910 and 911, at which the group-based communication server 110 may retrieve, from the group-based communication repository 120, the application data relevant to the application home interface (e.g., application home configuration data, application home contextual data, processing action data, user engagement pane data, and/or the like). In various examples, the application data retrieved from the group-based communication repository 120 by the group-based communication server 110 may comprise the same application data received by the server 110 from the application 112-116 at Block 901.

In various examples, the application data retrieved from the group-based communication repository 120 by the group-based communication server 110 may comprise application data that has been modified (i.e. updated) by the developer associated with the application 112-116—via an interactive developer interface, as described herein—subsequent to the transmission of the application data received by the group-based communication server 110 at Block 901. In such circumstance, the group-based communication server 110 may provide the modified application data associated with the application 112-116 to the group-based communication repository 120 to replace and/or supplement the preexisting application data, such that the application data retrieved from the group-based communication repository 120 by the group-based communication server 110, as shown at Blocks 910 and 911, may comprise the modified application data. Responsive to retrieving the application data relevant to the application home interface, the group-based communication server 110 may be configured to generate the application home interface associated with the application, as shown at Block 912, based at least in part on the application data associated therewith. As shown at Blocks 913 and 914, the application home interface may be transmitted for rendering within the group-based communication interface displayed at the client device 102. As described herein, the generated application home interface may comprise an interactive virtual environment configured to render at least a portion of the application data within the group-based communication interface so as to facilitate user interaction with the application within the group-based communications system 118.

The application home interface generated by the group-based communication server 110 may be configured according to one or more examples described herein. For example, the application home interface may comprise one or more executable processing action elements each corresponding to a respective processing action of the application and configured to initiate the process of executing the respective processing action at an application 112-116 associated with the processing action. As described herein, the processing action associated with each of the executable processing action elements may comprise one or more steps for providing data to an application 112-116 with which the respective processing action is associated. Responsive to receiving a user selection of an executable processing action element rendered within the application home interface, the client device 102 may transmit the executable processing action element selection to the group-based communication server 110, as shown at Blocks 915 and 916.

In some examples, the selection of executable processing action element may represent a user request to initialize the processing action associated therewith. Responsive to receipt of the selection of the executable processing action element, the process proceeds to Blocks 917 and 918, at which the group-based communication server 110 may retrieve at least a portion of the processing action data associated with the selected processing action from the group-based communication repository 120. For example, the processing action data may comprise data corresponding to each of a plurality of processing action characteristics (e.g., one or more processing action parameters, and/or the like) that define the processing action. As shown at Block 919, the group-based communication server may generate an interactive dialog based at least in part on the processing action data. In various examples, the interactive dialog may comprise one or more dialog inputs configured to receive user input from the user corresponding to one or more processing action parameters associated with the processing action, as described herein. In various examples, the interactive dialog may comprise one or more elements similar to the exemplary interactive dialog shown in FIG. 8.

Figure 9A:
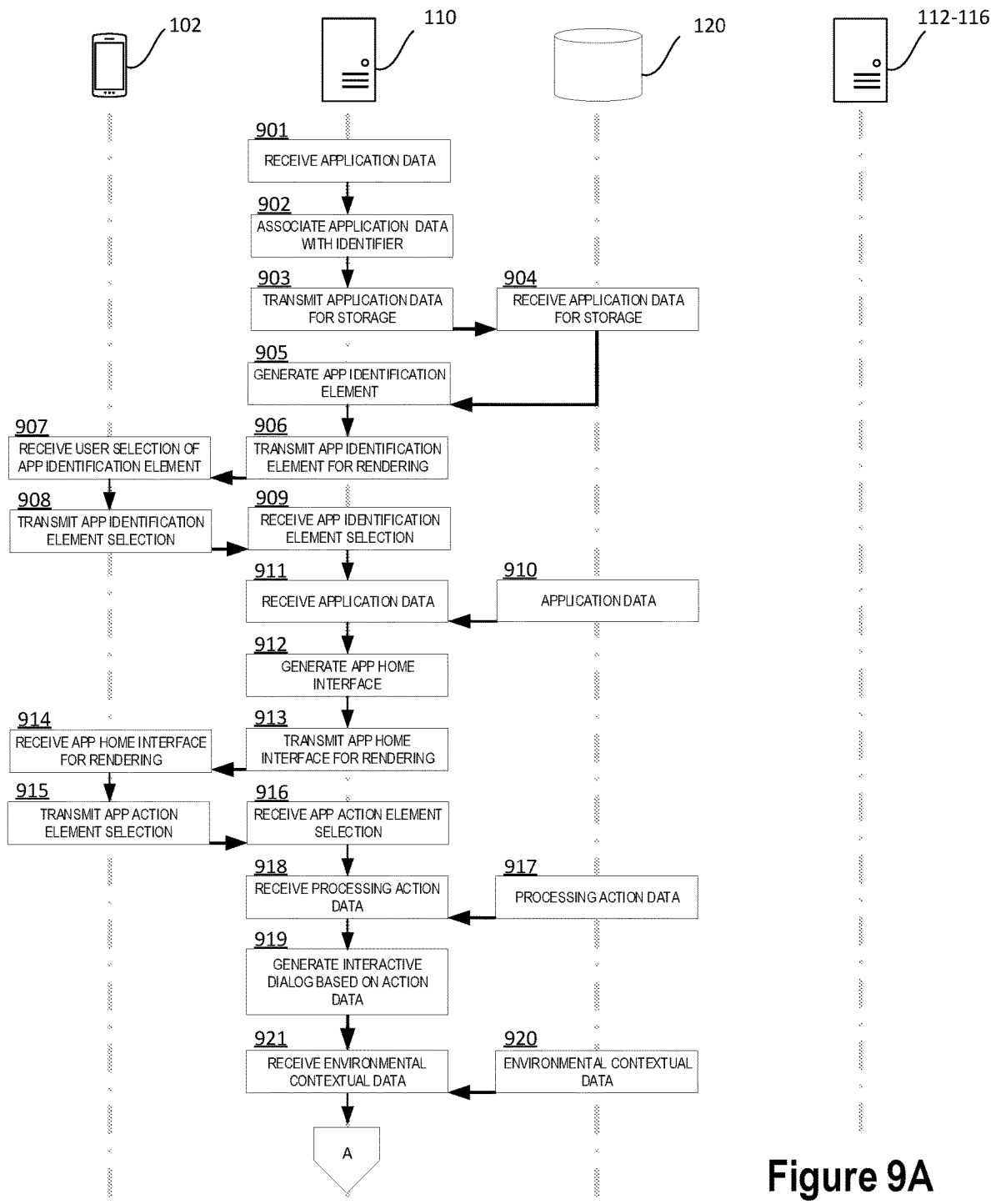
FIGS. 9A-9D illustrate a lane diagram showing functionality of various components in accordance with various examples.
Figure 9B:
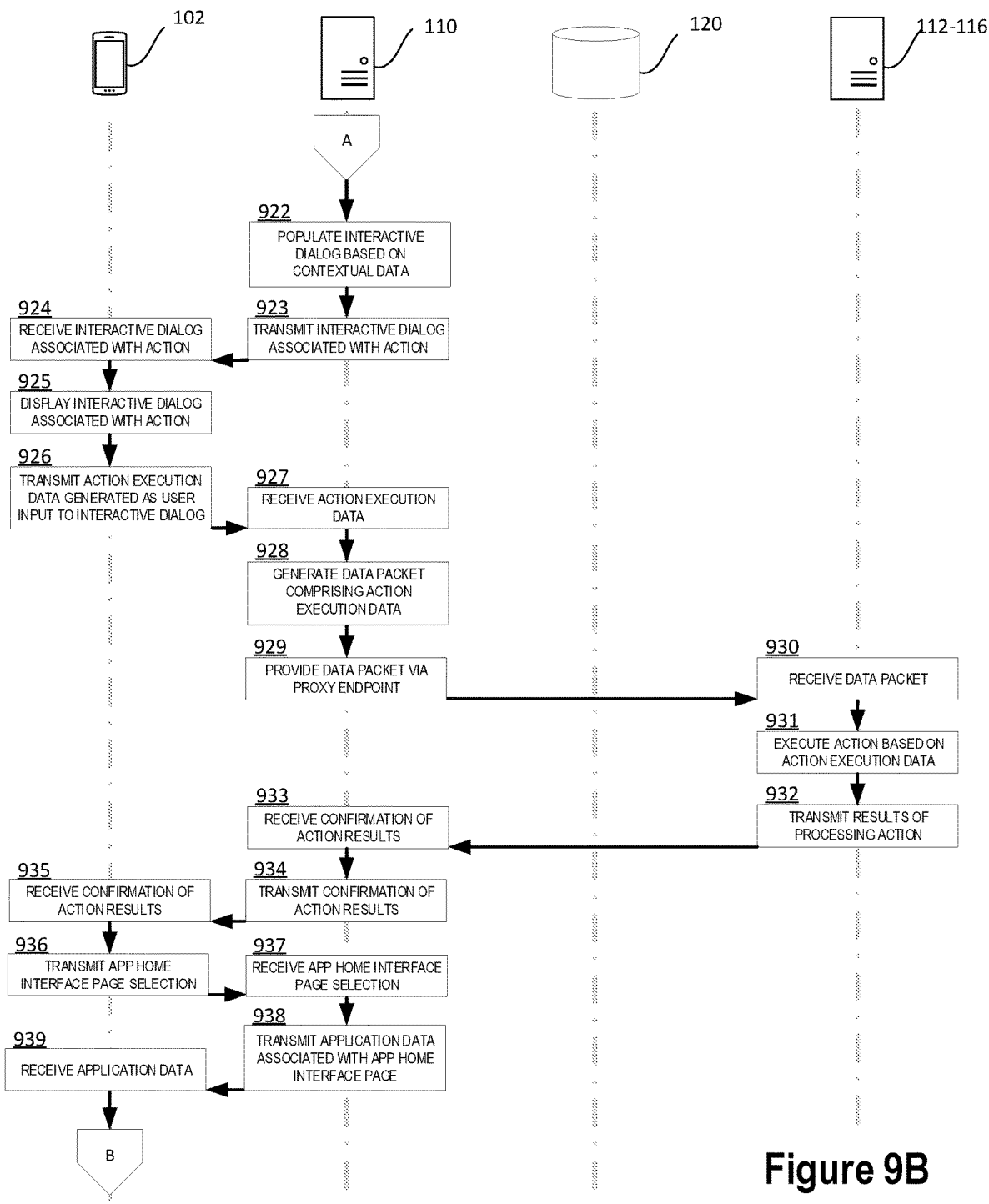

Further, in various examples, as shown at Blocks 920 and 921, the group-based communication server 110 may be configured to retrieve environmental contextual data generated for the user (and/or client device 102) from a cache memory storage area associated with the group-based communication repository 120 (and/or embodied as a memory storage area of the client device 102). As described herein, environmental contextual data is indicative of the user's interaction with a group-based communication system 118 at the time and/or before the user selects the executable processing action element. The environmental contextual data may comprise, for example, the user identifier of the user associated with the client device 102 from which the selection of the executable processing action element was received, historical data indicative of prior activities of a plurality of users when presented with circumstances similar to current circumstances under which a processing action is requested, data indicative of the initialization of the processing action via the executable processing action element within the application home interface, and/or the like. In various examples, as shown in FIG. 9B at Block 922, the group-based communication server 110 may be configured to prefill at least a portion of the interactive dialog associated with the processing action based at least in part on the environmental contextual data. In various examples, as described herein, at least a portion of the environmental contextual data retrieved by the group-based communication server 110 may be provided to the application system 112 with which the selected processing action is associated.

As shown at Blocks 923 and 924, the group-based communication server 110 may transmit the interactive dialog associated with the processing action to the client device 102 (e.g., in various examples, the group-based communication server 110 may transmit a processing action request to the client device 102 corresponding to the processing action data, rather than transmitting a generated interactive dialog, in which case the client device 102 may receive the processing action request and initialize the interactive dialog based on the processing action data). The client device 102 may display the interactive dialog associated with the action, so as to facilitate the receipt of user input corresponding to the one or more processing action parameters, as shown in Block 925. The client device 102 may generate processing action execution data based at least in part on the user input received corresponding to each of the dialog inputs at the interactive dialog, which may be transmitted to the group-based communication server 110, as shown at Blocks 926 and 927. In various examples, the processing action execution data received from the client device 102 may be comprise each of the processing action parameters associated with the processing action (e.g., each of the required parameters). As discussed herein, the processing action execution data comprising the one or more processing action parameters may be provided to the one or more dialog inputs of the interactive dialog based at least in part on either user input received at the interactive dialog displayed at the client device or environmental contextual data retrieved by the group-based communication server 110 from the group-based communication repository 120 (and/or the client device 102).

Responsive to receiving the processing action execution data, the group-based communication server 110 generates a processing action execution data packet comprising processing action routing data and payload data for the requested processing action, as indicated at Block 928. As described herein, processing action routing data may comprise data identifying data usable by the application system 112-116 to identify the requested processing action, to identify the client device requesting the processing action, and/or identifying the message, channel, and/or interface on which the processing action is to be performed. The processing action routing data may be utilized by the group-based communication system 118 to appropriately route a data packet to an appropriate proxy endpoint to trigger an application system to perform a particular processing action. The proxy endpoint may include a data transfer interface (e.g., API) between unconnected computing systems via a network.

In various examples, the proxy endpoint may be accessible over the network via a URL or other type of link. For example, a proxy endpoint may enable data transfer of a data packet (comprising routing data and/or payload data) from a group-based communication system 118 to an application system 112-116 associated with an application published and usable via the group-based communication system 118. In various examples, the proxy endpoint is defined at least in part by a URL accessible to the application system, wherein the URL may be utilized to direct the application system to a particular dataset (e.g., one or more data packets). As discussed herein, data packets provided to the application system via the proxy endpoint may comprise data formatted to enable usage by the application system to perform a desired processing action. The proxy endpoint enables transfer of the data packet to the application system while maintaining the necessary formatting of the data packet to enable the application system to use the included data. Moreover, in some examples the proxy endpoint may enable real-time transmission of data to the application system (e.g., via push-based message transmission). In other examples, the proxy endpoint may be configured to enable the application system to pull data from the group-based communication system 118 (e.g., upon the occurrence of a trigger event acting to inform the application system of the presence of data that is ready for transmission).

The processing action routing data may be further utilized by the application system 112-116 to identify the requested processing action to be performed and/or to identify any additional data that should be requested from the client device 102-106 (e.g., via one or more interactive dialogs presented via a group-based user interface). Moreover, the routing data may identify various characteristics of a message object (e.g., a message, a file, a plurality of messages (e.g., all messages within a communication channel), and/or the like), such as a timestamp indicating when a particular message object was shared via the group-based communication system, a sending-user identifier indicating a user (and/or client device) that initially shared the message object, a client token identifying the client device 102-106 requesting the processing action, and/or the like. The client token may include an identifier that uniquely identifies a particular client device 102, 104, or 106. The client token may be static (e.g., such that a client device is permanently associated with a particular client token until an affirmative action is taken to change the associated client token) or dynamic (e.g., such that a client token is assigned to a particular client device for a short duration, such as the period of time associated with performing a particular task, the period of time associated with a unique connection session between the client device and a group-based communication system, and/or the like). In some examples, the client token may be encrypted, utilizing any of a variety of encryption methodologies for added security against unauthorized usage of the client token.

The payload data may include one or more messages (e.g., message text, files attached to an exchanged message, a plurality of discrete exchanged messages, and/or the like). In some examples, the payload data may comprise processing action execution data generated in response to user input defining a configuration of one or more processing action parameters in order to execute the processing action. In some examples, the payload data may comprise environmental contextual data, and/or other data automatically selected for inclusion within the payload data for use by an application system in executing a processing action.

In various examples, the group-based communication server 110 may configure the processing action execution data packet in accordance with one or more formatting and/or content requirements of the application system 112-116, as indicated in the application data associated with the application 112-116 that is stored at the group-based communication repository 120, For example, in various examples, the group-based communication server 110 may assemble routing data for the data packet to comprise (1) one or more verification tokens (e.g., a group-based communication server 110 verification token), (2) a group-identifier, (3) a channel identifier, (4) a user identifier (e.g., a client device 102-106 specific client token identifying the client device 102-106 that requests the particular processing action), (5) a processing action identifier (e.g., a processing action name, and/or other identifying string, as described herein), (6) an action type defining a processing action type, (7) a trigger defining an interactive dialog to be presented to the client device 102-106 in response to initialization of the processing action, (8) a response URL enabling the application system 112-116 to transmit a response (e.g., a confirmation response) back to the requesting client device 102-106, (9) a timestamp indicating when the processing action is requested, (10) one or more processing action characteristics associated with the processing action (e.g., application identifier), and/or the like. In various examples, the payload data may comprise processing action execution data (e.g., environmental contextual data), message data, and/or other data selected for inclusion within the payload data for use by the application system 112-116 in executing the processing action. Specifically, with respect to the exemplary process shown at Block 928, the processing action routing data is generated based at least in part on the processing action data and identifies (1) the processing action to be performed by the application system 112-116 and (2) a client token identifying the client device 102 that requested the execution of the processing action (i.e. the client device that received the selection of the executable processing action element associated with the processing action).

Responsive to generating the processing action execution data packet, the group-based communication server 110 may provide the data packet via a proxy endpoint to the application system 112-116 identified with the routing data as shown at Blocks 929 and 930. In various examples a proxy endpoint may provide an API for passing the processing action execution data packet from the group-based communication server 110 to the application system 112-116, thereby enabling the application system 112-116 to consume the routing data and/or the payload data within the data packet while executing the processing action. The data included within the data packet is passed to the application system 112-116, for example, using the API to provide the data to the application system 112-116 in the appropriate format to execute the requested action. Providing the processing action execution data packet to the application system 112-116 causes the application system 112-116 to execute the requested processing action as identified in the processing action execution routing data based at least in part on the payload data (e.g., the processing action execution data), as shown at Block 931.

Once the application system 112-116 completes execution of the requested processing action, the application system 112-116 provides a confirmation response to the group-based communication server 110, as indicated at Blocks 932 and 933, and the group-based communication server 110 provides a confirmation message to the client device 102, as indicated at Blocks 934 and 935. In some examples, the confirmation message may be displayed via a dialog rendered within the group-based communication interface displayed at the requesting client device 102 or, specifically, within the application home interface displayed at the client device 102.

Figure 9C:
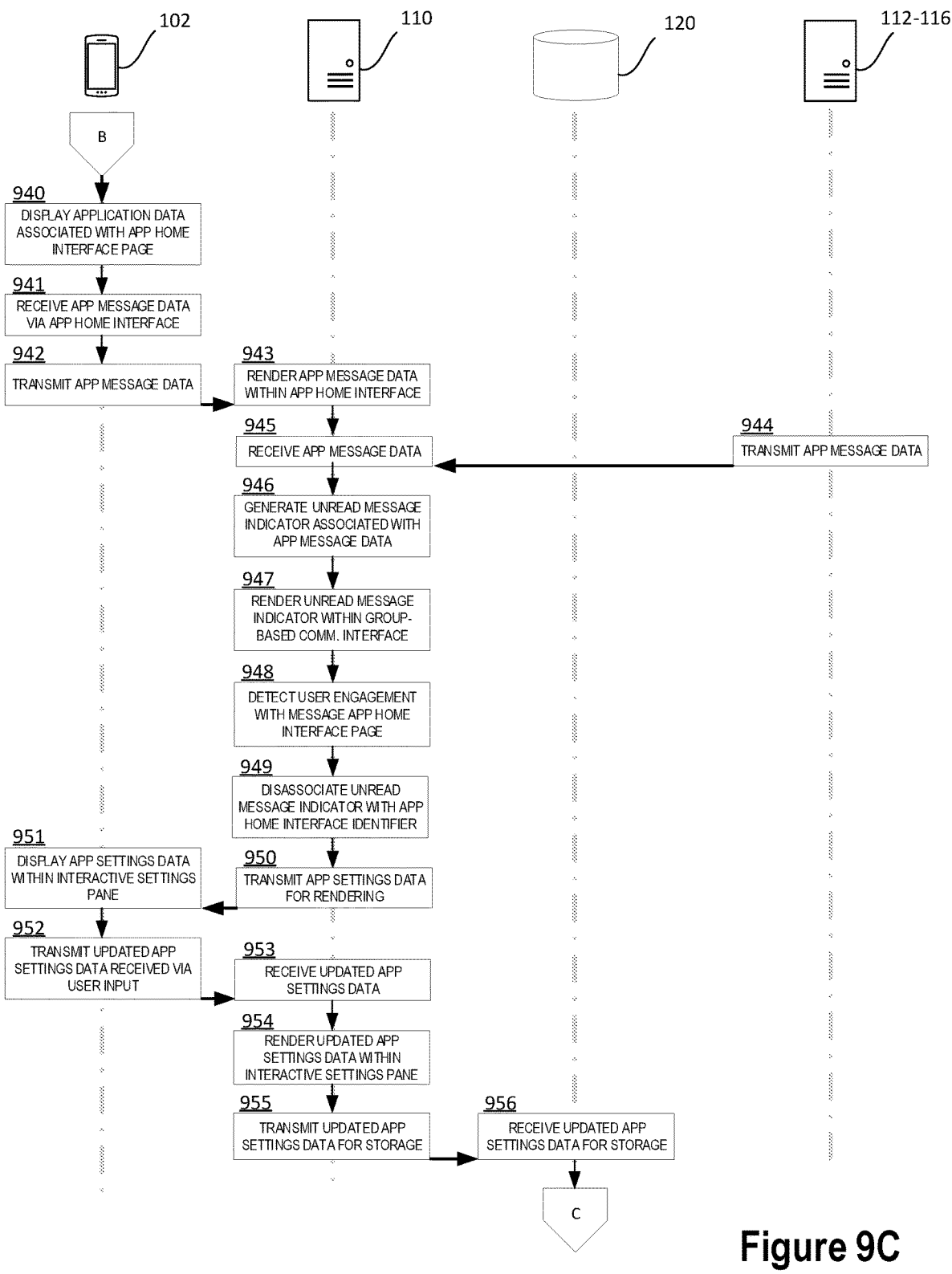

As shown at Blocks 936 and 937, the client device 102 may receive a selection of an application home interface page (e.g., an element rendered within the application home interface associated with the selected application home interface page) and may transmit the selection to the group-based communication server 110. Responsive to receipt of the selection of the application home interface page, the group-based communication server 110 may be configured to transmit at least a portion of the application data associated with the selected application home interface page to the client device 102 for rendering within the application home interface, as shown at Blocks 938 and 939. The client device 102 may display the application data associated with the application home interface page within the application home interface, as shown in FIG. 9C at Block 940. In various examples, for example, the application home interface may comprise a plurality of application home interface pages, each configured for alternative display (i.e. the group-based communication server 110 may display application data associated with a single application home interface page of a plurality of application home interface pages at a given time). In various examples, the one or more application home interface pages may comprise one or more of an application home interface home page, an application home interface message page, an application home interface about page, an application home interface settings page, and/or the like.

As shown at Block 941, a client device 102 may receive, as user input to the application home interface rendered at a display device of the client device 102, application message data associated with the application home interface and/or the application identifier associated with the application 112-116. In various examples, the application message data may be received via user input an application messaging pane within the application home interface (e.g., at the application home interface message page). The client device 102 may transmit the application message data associated with the application identifier and/or the application home interface to the group-based communication server 110, as shown at Block 942. The group-based communication server 110 may render the application message data for display within the application home interface associated therewith and/or associated with the application identifier associated therewith, as shown at Block 943. For example, the application message data may comprise message content and or various metadata as described herein. In various examples, at least a portion of the application message data may be rendered within the application messaging pane.

As shown at Blocks 944 and 945, the application system 112-116 may generate and transmit message data to the group-based communication server 110. As shown at Block 946, responsive to receiving the message data from the application system 112-116, the group-based communication server 110 may generate an unread message indicator associated with the application message data. In various examples, an unread message indicator may comprise data associated with an application home interface, application message data, a user identifier, and/or a client device identifier that indicates that a message has been received from an application system 112-116 via an application home interface in order to call a user's attention to the particular message content. In various examples, the unread message indicator may comprise a textual or graphical statement generated as a representation that a message has been received from an application system, but that the message has not yet been engaged by a user (i.e. the message has not been rendered for display at a client device). For example, a notification indicator may be a data structure comprising a flag, or a record of a data structure whereby a logic "1" indicates that a message received from an application system has been rendered for display within a group-based communication interface and a logic "0" indicates that the message has been received from the application system, but not yet rendered for display within the group-based communication interface.

As shown at Block 947, the group-based communication server 110 may be configured to render the application message data received from the application system 112-116 within the application home interface (e.g., within the application messaging pane). As described herein, in various examples, the group-based communication server 110 may operate according to various processes such that the application home interface (e.g., the application messaging pane) may function as a private group-based communication channel wherein the client device 102 and the application system 112-116 (e.g., one or more client devices associated with the application system 112-116) are associated with user identifiers with access rights to the group-based communication channel (i.e. the application home interface). In various examples, the unread message indicator may be rendered within the group-based communication interface, for example, proximate the application identifier element, within the application home interface (e.g., proximate the rendered application message data, proximate an element associated with the application home interface message page) and/or the like. Responsive to rendering the unread message indicator within the group-based communication interface, the group-based communication server may detect user engagement with the application message data rendered within the application home interface (e.g., at the application messaging pane), and may selectively disassociate the unread message indicator with the application message data and/or the application home interface, as shown at Blocks 948 and 949.

As shown at Block 950, the group-based communication server 110 may retrieve application data associated with the application 112 from the group-based communication repository 120 and transmit at least a portion of the application data comprising the application settings data to the client device 102 for rendering. As described herein, application settings data may comprise data associated with a user identifier, an application home interface, and an application which defines at least a portion of a settings framework associated with the application system 112-116. In various examples, the application settings data may be generated at least in part based on user input by developer associated with the application. For example, the application settings data may define which application settings are available to be configured by a user within the group-based communication system 118.

The application settings data may be selectable and/or configurable by a developer of the application at the time of application integration into a group-based communication system or any time thereafter. For example, in one embodiment, responsive to receiving a selection of an element associated with an application home interface settings page, the group-based communication server 110 may transmit the application settings data to the client device 120 for rendering. As shown in Block 951, the client device 102 may display the application settings data within the application home interface (e.g., at an interactive settings pane). In various examples, as described herein, the group-based communication server 110 may generate at least a portion of the application home interface (e.g., the interactive settings pane) and display there at a client device 102 the application settings data associated with the application 112-116 using one or more block kits, as described herein with respect to FIG. 7. In such a circumstance, the group-based communication server 110 may operate to display the application settings data within the application home interface at the client device 102 according to various processes similar to those described with respect to Blocks 958—Block 969 shown in FIG. 9D (e.g., analogous operations for displaying application settings data at a block-kit-configured interactive settings pane and displaying user engagement data at a block-kit configured user engagement pane).

In various examples, the client device 102 may receive user input at the application home interface (e.g., the interactive settings pane) corresponding to one or more interactive settings pane inputs that are rendered within the application home interface. Each of the one or more interactive settings pane inputs may correspond to a respective application setting associated with the application, such that the user input may represent updated application settings data (i.e. application settings preference data) with respect to one or more application settings. In various examples, the updated applications settings data (i.e. application settings preference data) may be associated with the application and the user identifier associate with client device 102. As shown at Blocks 952 and 953, the updated application settings data may be transmitted to the group-based communication server 110, where it may be rendered for display within the application home interface (e.g., the interactive settings pane), as shown at Block 954. As shown in Blocks 955 and 956, the group-based communication server 110 may transmit the updated application settings data associated with the user identifier, the application home interface, and/or the application to the group-based communication repository 120 for storage.

In various examples, the group-based communication server 110 may operate to provide the updated application settings data (i.e. application settings preference data) received at the client device 102 via the application home interface to the application system 112-116 by providing an application settings data packet to the application system 112. In such an exemplary embodiment, the applications settings data packet may comprise application settings routing data and payload data, wherein the application settings routing data identifies configurable application functionalities corresponding to one or more settings inputs defined by application settings data stored by the application system, and the payload data comprises the updated application settings data received at the client device. The application settings routing data may be utilized by the group-based communication system to appropriately route a data packet to an appropriate proxy endpoint to trigger an application system to store the corresponding payload data. The application settings routing data may be further utilized by the application system to identify the requested application setting to be configured and/or to identify any additional data that should be requested from the client device (e.g., via one or more interactive dialogs presented via a group-based user interface). In some examples, application settings routing data may be based at least in part on application settings data received from a developer client device associated with an application.

Figure 9D:
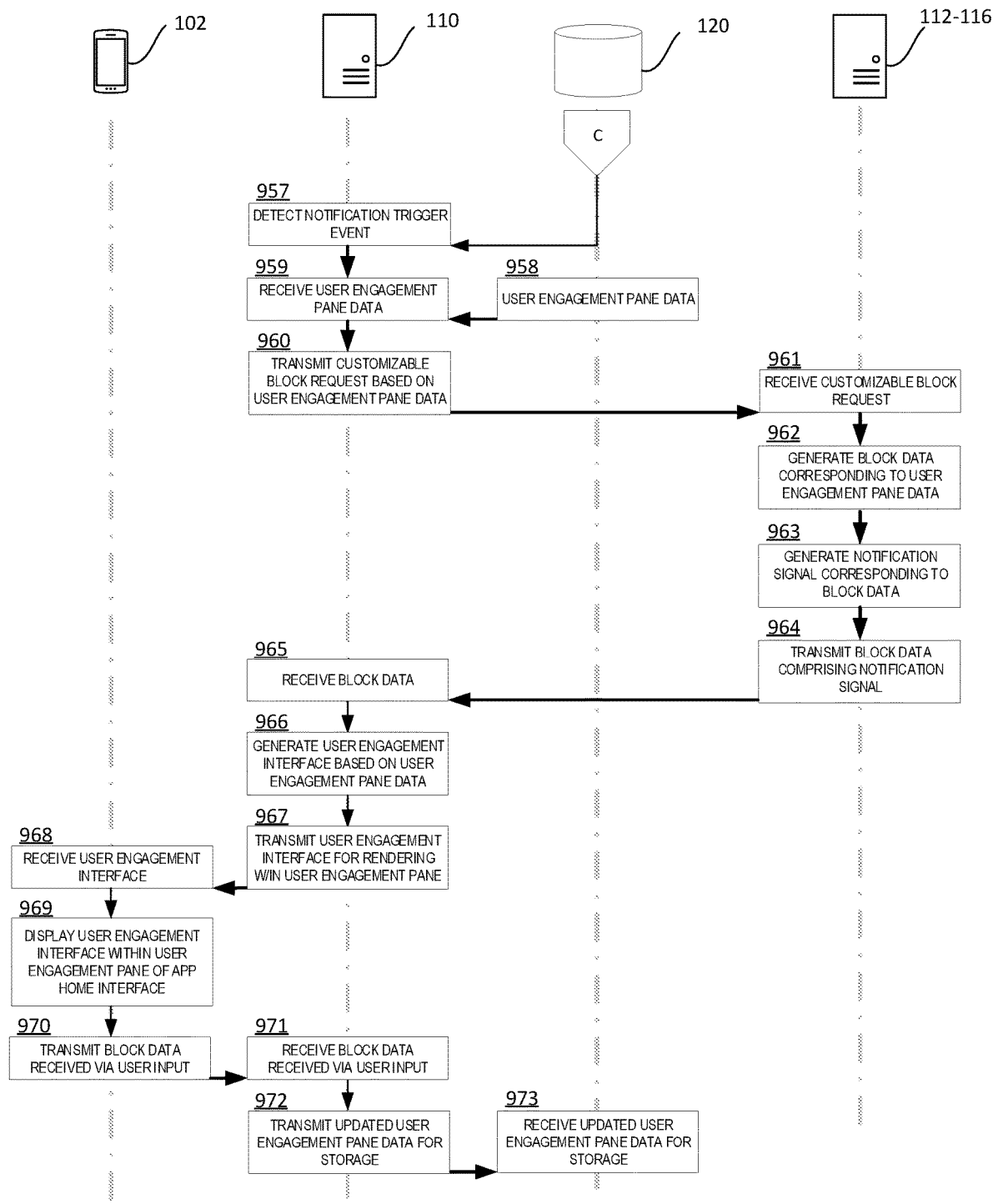

As shown at Block 957 in FIG. 9D, the group-based communication server 110 may detect a notification trigger event. As described herein, a notification trigger event may comprise an action, incident, collection of steps, or processes executed by one or more of the group-based communication server 110 the client device 102, and the application system 112-116 that initializes an updating and/or refreshing of a user engagement interface (e.g., user engagement pane data, block data) rendered within an application home interface. A notification triggering event may be detectable by the group-based communication server 110 and may be associated with one or more client devices 102. In various examples, triggering events may be pre-defined (e.g., button clicks, slash commands, etc.) or may be learned by the group-based communication system over time using machine learning models or other similar techniques.

As described herein, the notification triggering event may be based at least in part on user engagement with the application home interface at the client device 102. For example, the block data displayed with the one or more user engagement blocks may be updated and/or refreshed at each distinct instance in which the user engagement interface is rendered within the application home interface. Thus, a notification triggering event may comprise the receipt of a selection of an application identifier element from a client device 102 such that the application home interface comprising the user engagement interface is to be rendered for display. Similarly, a selection of an application home interface page configured to display the user engagement pane may comprise a notification triggering event. Responsive to detecting a notification triggering event, the group-based communication server 110 may retrieve the user engagement pane data associated with the application home interface and the application from the group-based communication repository 120, as shown with respect to Blocks 958 and 959.

Based at least in part on the user engagement pane data (e.g., the customizable block configuration as defined by the developer, the one or more user engagement pane instructions associated with the one or more user engagement blocks), the group-based communication sever 110 may generate a customizable block request and transmit the request to the application system 112-116, as shown at Blocks 960 and 961. In various examples, as described herein, the customizable block request may comprise one or more tokens, identifiers, or other authentication credentials that may be used to facilitate the communication between the group-based communication server 110 and the application system 112-116. In various examples, the customizable block request may comprise one or more block types to identify what type of block is to be rendered to the client device 102 associated with the group-based communication interface. Further a customizable block request may include one or more user engagement pane instructions and/or the inputs corresponding to various block data to be displayed at the user engagement interface. Responsive to receiving the customizable block request, the application system 112-116 may generate block data corresponding to the user engagement pane data. In various examples, the block data may be associated with the user identifier, the application identifier, a group-based communication channel identifier, and the application home interface, and may be configured for display within the one or more user engagement boxes according to the customizable block configuration, as shown at Block 962. As shown at Block 963, responsive to determining that at least a portion of the block data to be displayed at the one or more user engagement blocks has changed compared to the block data generated at the last connection session, the application system may be configured to generate a notification signal associated with at least one of the one or more user engagement blocks.

In various examples, the notification signal may include content that is "pushed" from an application system 112-116 to a user interface of a client device 102-106. For example, a notification signal (i.e., push notification) can be received from an application system 112-116 by a client device 102-106 in order to call a user's attention to particular content. By way of further example, the notification signal may be rendered, by the client device 102-106, in a user interface within a display of the client device 102-106 to call the user's attention to particular content. The notification signal may also be in the form of a sound or vibration of a mobile device (with or without rendering within the interface). Examples of notification signals include messages, badges, icons, sounds, vibrations, custom text alerts, and the like.

In various examples, the notification signal generated by the application system 112-116 may be associated with at least a part of the application data associated with the application system 112-116. The notification signal may correspond at least in part to the one or more user engagement pane instructions associated with the at least one of the user engagement blocks. The application system 112-116 may transmit the block data and the notification signal generated in response to the customizable block request to the group-based communication server 110, as shown at Blocks 964 and 965.

Responsive to receiving the block data from the application system 112-116, the group-based communication server 110 may generate a user engagement interface based at least in part on the user engagement pane data retrieved by the group-based communication server 110 at Block 959, as shown at Block 966. In various examples, as described herein, user engagement interface may comprise the block data (e.g., the notification signal) received from the application system 112-116. For example, the group-based communication server 110 may render within the user engagement pane (e.g., within the user engagement interface) the notification signal associated with at least a portion of the application data and the at least one user engagement blocks. In various examples, as described herein, the user engagement interface may be defined by the customizable block configuration comprising the one or more user engagement blocks—as well as the block data and the one or more block elements defined therein. The customizable block configuration may be based at least in part on user engagement pane data (i.e. input generated from a developer client device associated with the developer user identifier). As shown at Blocks 967, 968, and 969, the group-based communication server 110 may be configured to transmit the user engagement interface to the client device 102 for rendering within a user engagement pane displayed the application home interface. In various examples, the client device 102 may be associated with the notification triggering event.

As discussed herein, in various examples, the block data displayed within the one or more user engagement blocks may be customizable by a client device associated with the application home interface. As shown at Block 970, the client device may receive block data associated with the user identifier and the application identifier as user input at the user engagement interface displayed at the client device 102 and transmit the block data to the group-based communication server 110. In various examples, the block data may correspond to at least a portion of the block data displayed within one of the one or more user engagement blocks. The block data transmitted from the client device 102 to the group-based communication server 110 may comprise updated user engagement pane data. As shown at Blocks 971, 972, and 973, the group-based communication server 110 may be configured to receive the updated block data from the client device 102 and subsequently transmit the updated block data to the group-based communication repository for storage.

Figure 10:
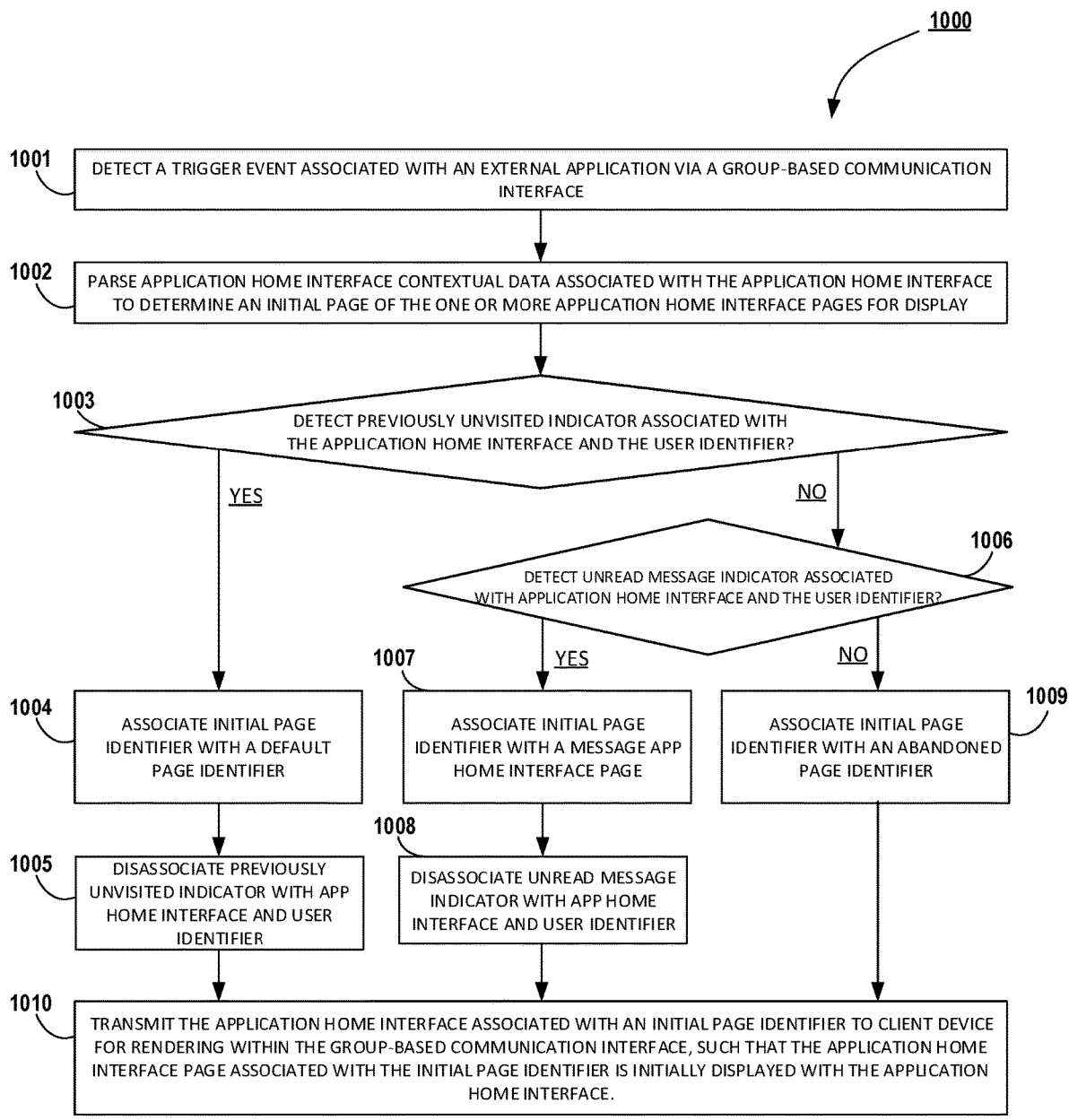
FIG. 10 is a flowchart illustrating example steps for determining an initial page of the one or more application home interface pages for display within an application home interface.

FIG. 10 illustrates an exemplary flow diagram for determining an initial page of the one or more application home interface pages for display within an application home interface according to one embodiment of the present disclosure. The method 1000 begins at Block 1001 with detecting a trigger event associated with an application via a group-based communication interface. In various examples, a trigger event may comprise an action, incident, collection of steps, or processes executed within the group-based communication system 118 and/or the application system 112-116 which may cause the group-based communication server 110 to generate an application home interface associated with the application 112-116 and the user identifier. For example, a trigger event may be the receipt by a client device 102 of a selection of an application identifier element associated with the application, as described herein.

Responsive to detecting the trigger event associated with the application via the group-based communication interface, method 1000 continues, at Block 1002, with parsing application home interface contextual data associated with the application home interface to determine an initial page of the one or more application home interface pages for display. In various examples, application home interface contextual data may comprise data indicative of user engagement with an application home interface within a group-based communication interface. In some examples, application home interface contextual data may be associated with an application identifier, an application home interface identifier, a client device identifier, and/or a user identifier. As discussed in greater detail herein, such application home interface contextual data may refer to usage data (e.g., historical data, usage rate data, and/or the like) associated with one or more user identifiers. For example, application home interface contextual data may comprise a previously visited indicator, a previously unvisited indicator, unread message indicator, and/or an abandoned page indicator associated with an application home interface identifier and a user identifier.

Responsive to parsing the application home interface contextual data, method 1000 continues, at Block 1003, with determining whether a previously unvisited indicator associated with the application home interface and the user identifier (e.g., the client device identifier) was detected. In various examples, a previously unvisited indicator may comprise one or more items of data associated with an application home interface and one or both of a user identifier and a client device identifier that indicates that the application home interface has not previously been generated and rendered for display at the client device 102 associated with the user identifier. In various examples, the previously unvisited indicator may comprise a textual or graphical statement that may be generated and associated with an application home interface as a representation that a client device associated with the user identifier has not previously displayed the application home interface. For example, a previously unvisited indicator may be a data structure comprising a flag, or a record of a data structure whereby a logic "1" indicates that an application home interface has not previously been displayed at a client device associated with the user identifier and a logic "0" indicates that the application home interface has previously been generated and accessed by the user associated with the user identifier via a client device. In various examples, a previously unvisited indicator may be generated by a group-based communication server 110 upon the initial receipt of application data associated with an application (e.g., application home interface configuration data).

In various exemplary circumstances wherein a previously unvisited indicator associated with the application home interface and the user identifier (e.g., the client device identifier) was detected, the method 1000 continues, at Block 1004, with associating an initial page identifier with a default page identifier, such that the initial page of the application home interface comprises the application home interface page associated with the default page identifier. For example, an application home interface home page of the one or more application home interface pages may be associated with the default page identifier.

Responsive to associating an initial page identifier with a default page identifier, method 1000 continues, at Block 1005, with disassociating the previously unvisited indicator with the application home interface and the user identifier. Disassociating the previously unvisited indicator with the application home interface and the user identifier may represent that the user has previously visited the application home interface associated with the application. In various examples, disassociating the previously unvisited indicator with the application home interface and the user identifier may further comprise associating the application home interface and the user identifier with a previously visited identifier. In various examples, the group-based communication server 110 may disassociate the previously unvisited indicator with the application home interface and the user identifier responsive to rendering the initial page of the application home interface (i.e. the application home interface page associated with the default page identifier) for display at the client device 102.

Referring back to Block 1003, responsive to parsing the application home interface contextual data in various exemplary circumstances wherein a previously unvisited indicator associated with the application home interface and the user identifier was not detected, the method 1000 continues, at Block 1006, with determining whether an unread message indicator associated with the application home interface and the user identifier was detected. As described herein in greater detail, an unread message indicator may comprise data associated with an application home interface, application message data, the user identifier, and/or a client device identifier that indicates that a message has been received from an application system 112-116. In various examples, an unread message indicator may be generated by a group-based communication server 110 upon the receipt of application message data associated from the application 112-116.

In various exemplary circumstances wherein an unread message indicator associated with the application home interface and the user identifier was detected—and where a previously unread indicator was not detected—the method 1000 continues, at Block 1007, with associating an initial page identifier with an application home interface message page so as to select the application home interface message page as the initial page of the application home interface.

Responsive to associating an initial page identifier with the application home interface message page, method 1000 continues, at Block 1008, with disassociating the unread message indicator with the application home interface and the user identifier. Disassociating the unread message indicator with the application home interface and the user identifier may represent that the group-based communication server 110 has—or will at a time at least substantially soon after the disassociation operation—rendered the application message data within an application home interface at the client device 102. In various examples, the group-based communication server 110 may disassociate the unread message indicator with the application home interface and the user identifier upon rendering the initial page of the application home interface (i.e. the application home interface message page) for display at the client device 102.

Referring back to Block 1006, responsive to parsing the application home interface contextual data, in various exemplary circumstances wherein an unread message indicator associated with the application home interface and the user identifier was not detected—and where a previously unread indicator was not detected—the method 1000 continues, at Block 1009, with associating an initial page identifier with an abandoned page indicator, such that the initial page of the application home interface comprises the application home interface page associated with the abandoned page indicator. For example, an application home interface home page of the one or more application home interface pages may be associated with the abandoned page indicator. In various examples, an abandoned page indicator may comprise one or more items of data associated with an application home interface, one or both of a user identifier and a client device identifier, and an application home interface age identifier that indicates that the application home interface page with which it is associated was the application home interface page being displayed at the end of the previous application home interface session (i.e. a subset of a connection session that is defined by the duration that the application home interface is rendered at the client device 102).

In various examples, an application home interface session may be terminated by the group-based communication server 110 responsive to detecting user engagement at the client device 102 with an element of the group-based communication interface to the application home interface. In various examples, the group-based communication server 110 may associate the abandoned page indicator with the application home interface page identifier of the application home interface page being rendered at the client device 102 responsive to detecting the user engagement, as described above. In various examples, responsive to associating an application home interface home page of the one or more application home interface pages with the abandoned page indicator, the group-based communication server 110 may be configured to parse the application contextual data and disassociate each of the other application home interface pages from an abandoned page indicator that may be determined to be associated therewith.

Responsive to the selection of the initial page of the application home interface, as described herein, the method 1000 continues, at Block 1010, with transmitting the application home interface associated with the initial page identifier to the client device 102 for rendering within the group-based communication interface, such that the initial page (i.e. the application home interface page associated with the initial page identifier) is initially displayed at the client device 102 within the application home interface.

Providing an Interactive Developer Interface of a Group-Based Communication System As noted above, systems and methods for providing an interactive developer interface of a group-based communication system according to various examples are discussed herein. The interactive developer interface provided by the group-based communication server 110 may comprise elements renderable to display an area by which a developer associated with an application 112-116 may input data to implement and/or configure various aspects of an application (e.g., a processing action, an application home interface) within a group-based communication system 118.

An exemplary interactive developer interface may be rendered within a group-based communication interface at a client device 107 associated with the developer. The interactive developer interface may be configured to accept user input from the developer client device (e.g., as a selection of one or more of a plurality of available settings options, as freeform input, and/or the like), the user input defining, at least in part, the application data (e.g., the processing action data, application home interface configuration data, and/or the like). As described herein, the interactive developer interface transmitted to the developer client device 107 may comprise a plurality of elements and/or fillable forms configured to facilitate the receipt of plurality of application data associated with a plurality of applications, wherein each of the application data is configured in a consistent manner such that the group-based communication server may operably and efficiently implement various functionalities of with the respective applications throughout the group-based communication system 118. The systems and methods described herein enable the group-based communication server 110 to present and/or execute application data that is customizable by a developer associated therewith, in a manner configured by the group-based communication server 110 that is consistent throughout the group-based communication system 118 with respect to each of the plurality of applications.

Figure 11:
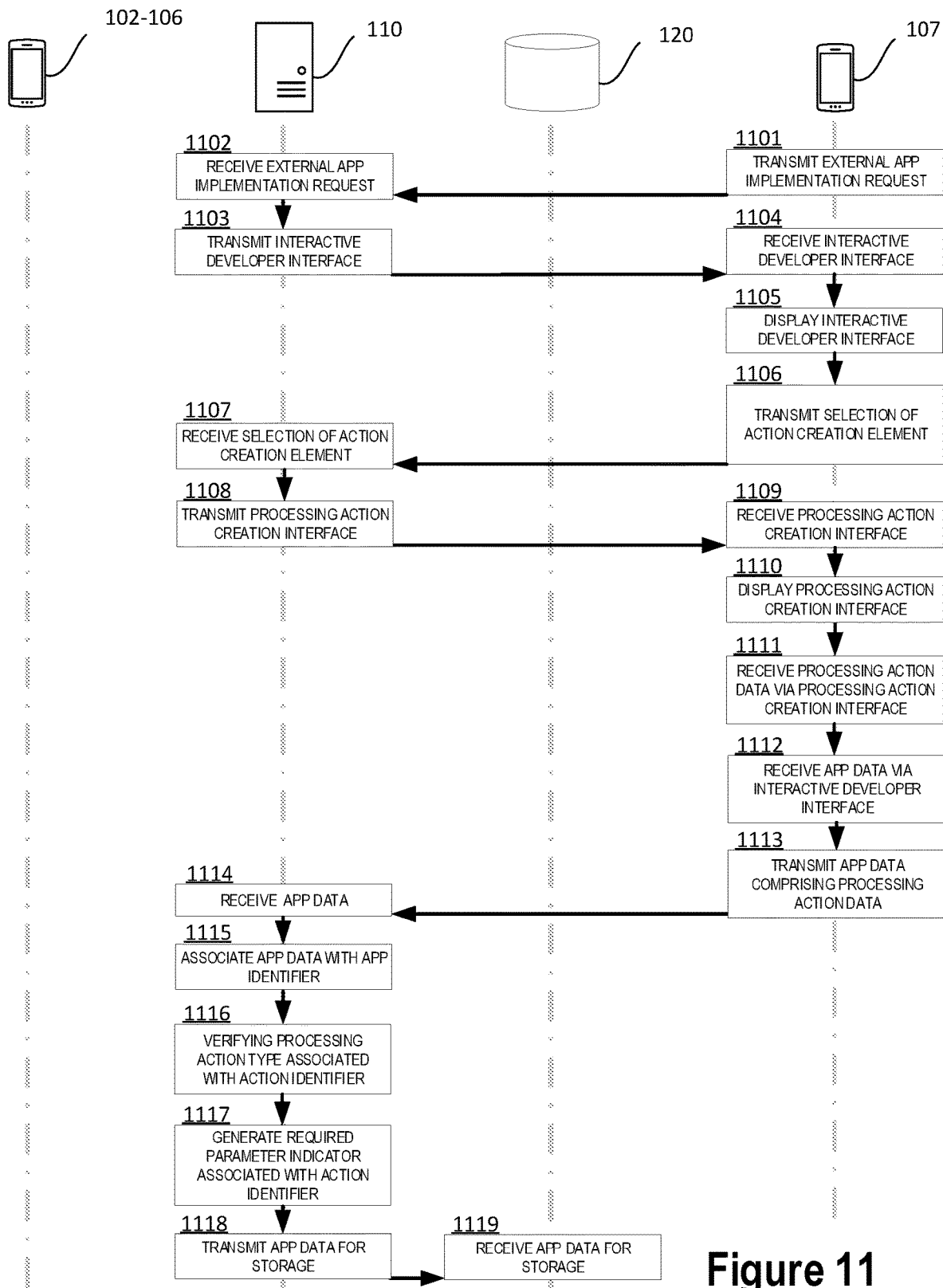
FIG. 11 illustrates a lane diagram showing functionality of various components in accordance with various examples.

FIG. 11 illustrates a lane diagram showing functionality of various components associated with an exemplary interactive developer interface in accordance with various examples. As shown at Blocks 1101 and 1102, in various examples, an application implementation request may be transmitted from the developer client device 107 and received by the group-based communication server 110. In various examples, the application implementation request may comprise a collection of data transmitted by a developer client device 107 to the group-based communication server 110 as a result of a developer associated with an application indicating a desire to implement the application within the group-based communication system 118. An application implementation request may be associated with a user identifier associated with the developer and/or a client device associated therewith, and an application identifier. For example, an application implementation request may be transmitted from the client device 107 responsive to receiving a selection of an element associated with the interactive developer interface at the client device 107 via the group-based communication interface.

Responsive to receiving the application implementation request from the client device 107, as shown at Blocks 1103 and 1104, the group-based communication server 110 may transmit an interactive developer interface to the client device 107 for rendering at a display device associated therewith. As described herein, the interactive developer interface transmitted to the client device in response to receiving an application implementation request may be embodied as a universal template with one or more predefined input parameters (i.e. input fields corresponding to a functionality of the application) configured according to one or more executable instructions defined by the group-based communication server 110. For example, the interactive developer interface may comprise a plurality input elements, at least two of which are configured to receive user input from the developer client device 107 corresponding to processing action data and user engagement pane data, as described herein. As shown at Block 1105, the interactive developer interface may be displayed at the client device 107 within the group-based communication interface.

As shown at Blocks 1106 and 1107, the client device 107 may receive a selection of a processing action creation element rendered within the interactive developer interface at the client device 107 and may transmit the selection to the group-based communication server 110. For example, the processing action creation element may be an interactive "Create New Action" element that may be selected to initiate the process for providing relevant data to the group-based communication server 110. Responsive to receiving the selection of the processing action creation element, the group-based communication server 110 may initiate said process by generating and transferring to the client device 107 a processing action creation interface, as shown at Blocks 1108 and 1109. As described herein, the processing action creation interface may comprise a secondary interactive developer interface configured to receive developer user input regarding the functionality of a processing action to be made available to users of the group-based communication system 118.

In various examples, as shown at Block 1110, the processing action creation interface may be rendered for display at the client device 107 within the interactive developer interface. Further, in various examples, the processing action creation interface may be an interactive dialog comprising one or more input dialogs configured to receive user input from the developer that may define one or more functionalities and/or characteristics of the processing action (i.e. processing action data). As shown at Block 1111, the client device 107 may receive processing action data defined by the developer user input at the processing action creation interface. In various examples, each input dialog may correspond to a respective processing action characteristic, such that the processing action data is defined based at least in part on the user input received from the client device 107 at each of the input dialogs. For example, the processing action creation interface may receive user input at the client device 107 via the one or more input dialogs that may define one or more processing action parameters (e.g., what the one or more parameters and/or and whether each one is a required parameter or an optional parameter), a processing action title, a processing action description, a processing action type, and/or the like. In various examples, the group-based communication server 110 may generate one or more additional and/or different interactive dialogs depending on the processing action type designated by the developer user input, each of the interactive dialogs generated being configured to further curate the input dialogs contained therein based on one or more requirements of the particular processing action type.

As shown at 1112, the client device 107 may receive application data defined by the developer user input at the interactive developer interface (i.e. at a portion of the interactive developer interface not defined by the processing action creation interface). In various examples, the application data received by the client device 107 may comprise application home interface configuration data. In various examples, application home interface configuration data may comprise one or more executable instructions configured to facilitate the generation of an application home interface and/or the display of developer-provided information (e.g., application data) therein. In some examples, application home interface configuration data may comprise application informational data, application settings data, application home interface welcome pane data, and/or the like, as described herein.

In various examples, the application home interface configuration data may comprise an executable processing action element priority order, which may be configured based on user input from the developer client device 107, and which defines the organization of each of the one or more executable processing action elements rendered within the application home interface relative to the other executable processing action elements. In various examples, the application home interface configuration data may comprise various data corresponding to one or more application home interface pages, such as, for example, an indicator generated based on a determination (e.g., by either the group-based communication server 110 or the developer) that a particular application home interface page is not applicable based at least in part on one or more functionalities of the application, and thus that the application home interface page should not be displayed within the interface. Further, as discussed above, the client device 107 may receive application data comprising user engagement pane data. User engagement pane data, as described herein, may define a customizable block configuration so as to reflect the developer's desired configuration of the one or more user engagement blocks—and the block elements displayed therein—within the user engagement interface. In various examples, at least a portion of the user engagement pane data may comprise block data associated with one or more user engagement blocks configured to reflect execution of one or more user engagement pane instructions corresponding to one or more functionalities of an application.

As shown at Blocks 1113 and 1114, the client device 107 may transmit the application data received via the interactive developer interface to the group-based communication server 110. The application data received by the group-based communication server 110 may comprise processing action data and user engagement pane data. Further, in various examples, the application data received by the group-based communication server 110 may comprise application home interface configuration data. The group-based communication server may selectively associate the application data received from the client device 107 with an application identifier, as shown at Block 1115. In various examples, the group-based communication server 110 may associate the application data with the application identifier associated with the client device 107 and/or the user identifier associated with the developer. As shown at Block 1116, responsive to receiving processing action data associated with a processing action from a developer client device, the group-based communication server 110 may verify the processing action type associated with the processing action identifier so as to ensure that the particular requirements associated with the processing action type selected by the developer are satisfied by the one or more processing action parameters (e.g., required parameters) associated with the processing action. For example, where a developer selects at the interactive developer interface that she would like to create a message processing action, the group-based communication server may be configured to verify that at least one of the one or more processing action parameters associated with message processing action is a "message ID."

As shown at Block 1117, the group-based communication server may generate a required parameter indicator associated with a processing action (e.g., a processing action parameter) based at least in part on the processing action data received from the developer client device 107. The group-based communication server 110 may prevent a processing action from being initialized and/or transmitted to an application system 112-116 for execution until each of the required parameters comprises a corresponding input value. As shown in Blocks 1118 and 1119, the group-based communication server 110 may transmit the application data associated with the application (e.g., the application identifier) to the group-based communication repository 120 for storage.

Figure 12:
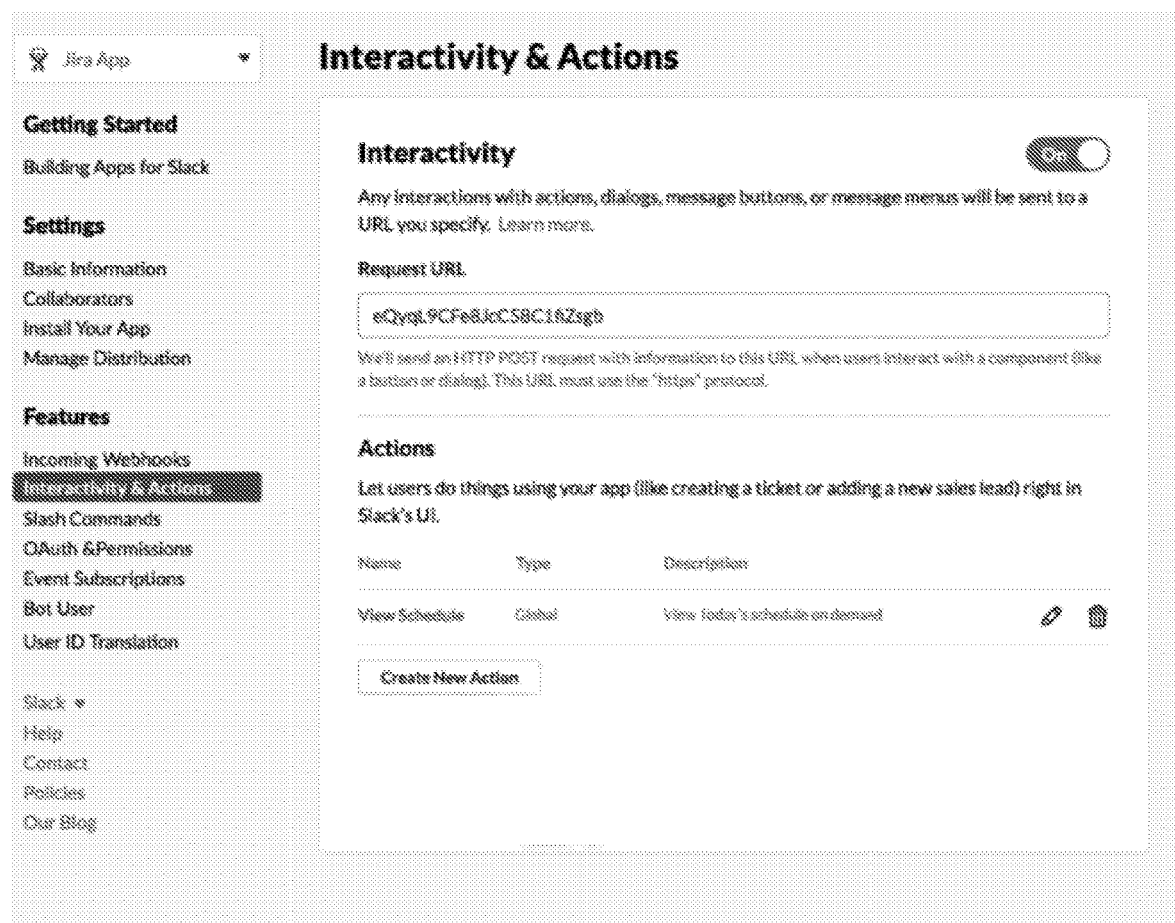
FIG. 12 shows an example group-based communication interface providing an interactive developer interface.

FIG. 12 illustrates a wireframe 1200 of an exemplary interactive developer interface presented to a developer associated with an application 112-116 (e.g., via a developer client device 107 associated with a user identifier associated with the developer and the application 112-116) enabling the usage of one or more particular processing actions and the generation of an application home interface within a group-based communication system 118. As shown in FIG. 12, the interactive developer interface is configured to receive developer input specifying a request URL relating to the application system 112-116 for a particular processing action. The URL identifies the location to which any data (e.g., routing data and/or payload data included within a data packet, additional data provided from a client device 102-106 in response to an interactive dialog, and/or the like) is provided to the application system 112-116 to enable the application system 112-116 to identify the requested processing action and to execute the requested processing action. Moreover, the interactive developer interface is additionally configured to receive user input (e.g., via a client device 107) initiating a process for making a particular processing action available to users of the group-based communication system 118, as discussed herein. Specifically, as shown in the example wireframe 1200 of FIG. 12, the user interface includes an interactive "Create New Action" interface element that may be selected to initiate the process for providing relevant data to the group-based communication system 118, for example, via the exemplary processing action creation interfaces illustrated as wireframes 1300A and 1300B in FIGS. 13A and 13B, respectively.

Moreover, as shown in FIG. 12, the group-based communication system 118 may be configured to present within the interactive developer interface a list of all of the processing actions associated with the application, the list may be organized by one or more processing action characteristic (e.g., processing action name, processing action type, processing action description, and/or the like). In various examples, the interactive developer interface, as described herein, may be accessible to a developer and/or one or more user profiles associated with the application, at any point subsequent to the implementation of the application in the group-based communication system 118.

Figure 13A:
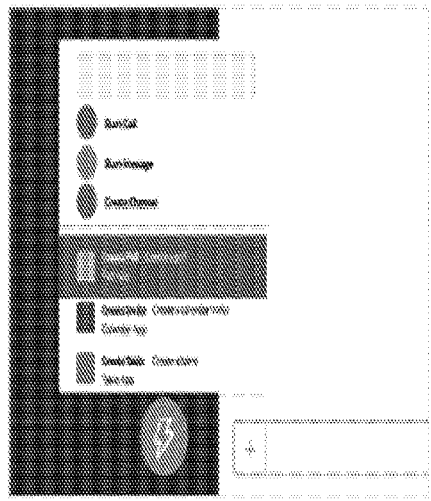
FIGS. 13A-13B show another example group-based communication interface providing an interactive developer interface.
Figure 13A:
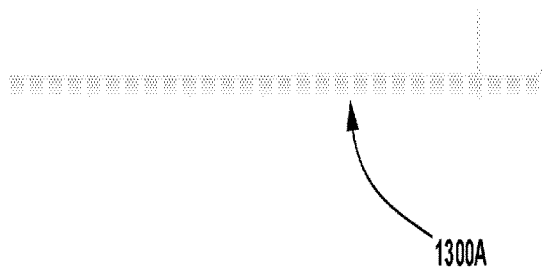
Figure 13B:
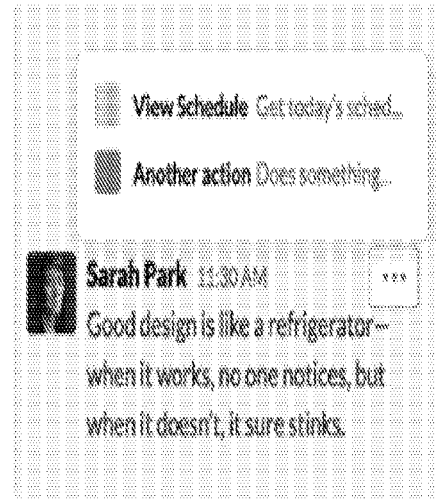
Figure 13B:
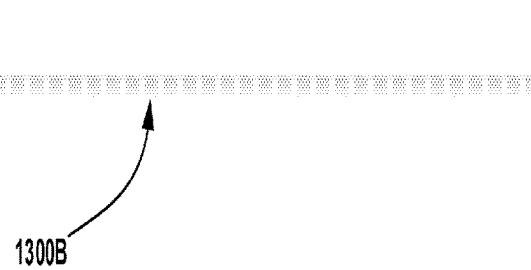

As mentioned above in reference to FIG. 12, the exemplary wireframes 1300A and 1300B shown in FIGS. 13A and 13B, respectively, each provide at least a portion of a processing action creation interface embodied as a secondary interactive developer interface configured to receive additional data regarding the functionality of a processing action to be made available to users of the group-based communication system 118 (e.g., client devices 102-106 associated with a particular group). As discussed herein, the processing action characteristics associated with a processing action of some examples comprises a processing action name and description to be presented to client devices 102 106 (e.g., via appropriate user interfaces), an icon or other image to be associated with the processing action, and a callback ID that may be included with processing action data packets to identify the relevant processing action to be utilized with the data included in the data packet. In some examples, the executable portions of the processing action are stored locally at the relevant application system, such that the group-based communication system 118 provides relevant data in an appropriate format (e.g., via an API providing data via the URL specified during setup of the processing action) to the application system, and provides various interactive dialogs and/or other messages relevant to the processing action to a requesting client device 102-106. As shown, the exemplary wireframes 1300A and 1300B shown in FIGS. 13A and 13B, respectively, highlight two different exemplary types of processing action creation interfaces which the group-based communication server 110 may be configured to generate based on various user input received from the developer client device 107 via the interactive developer interface.

Indexing Processing Actions Associated with a Plurality of Applications Implemented in a Group-Based Communication System As noted above, systems and methods for indexing processing actions associated with a plurality of applications within a group-based communication system according to various examples are discussed herein. The group-based communication server 110 may be configured to receive processing data associated with a plurality of processing actions of a plurality of applications implemented within the group-based communication system 118 and facilitate the execution of each processing action at the application system 112-116 respectively associated therewith. As described herein, the group-based communication server 110 may be configured to index each of the processing actions based one or more processing action characteristics associated therewith so as to effectively characterize each of the processing actions and optimize action availability and operability throughout a group-based communication interface.

Figure 14A:
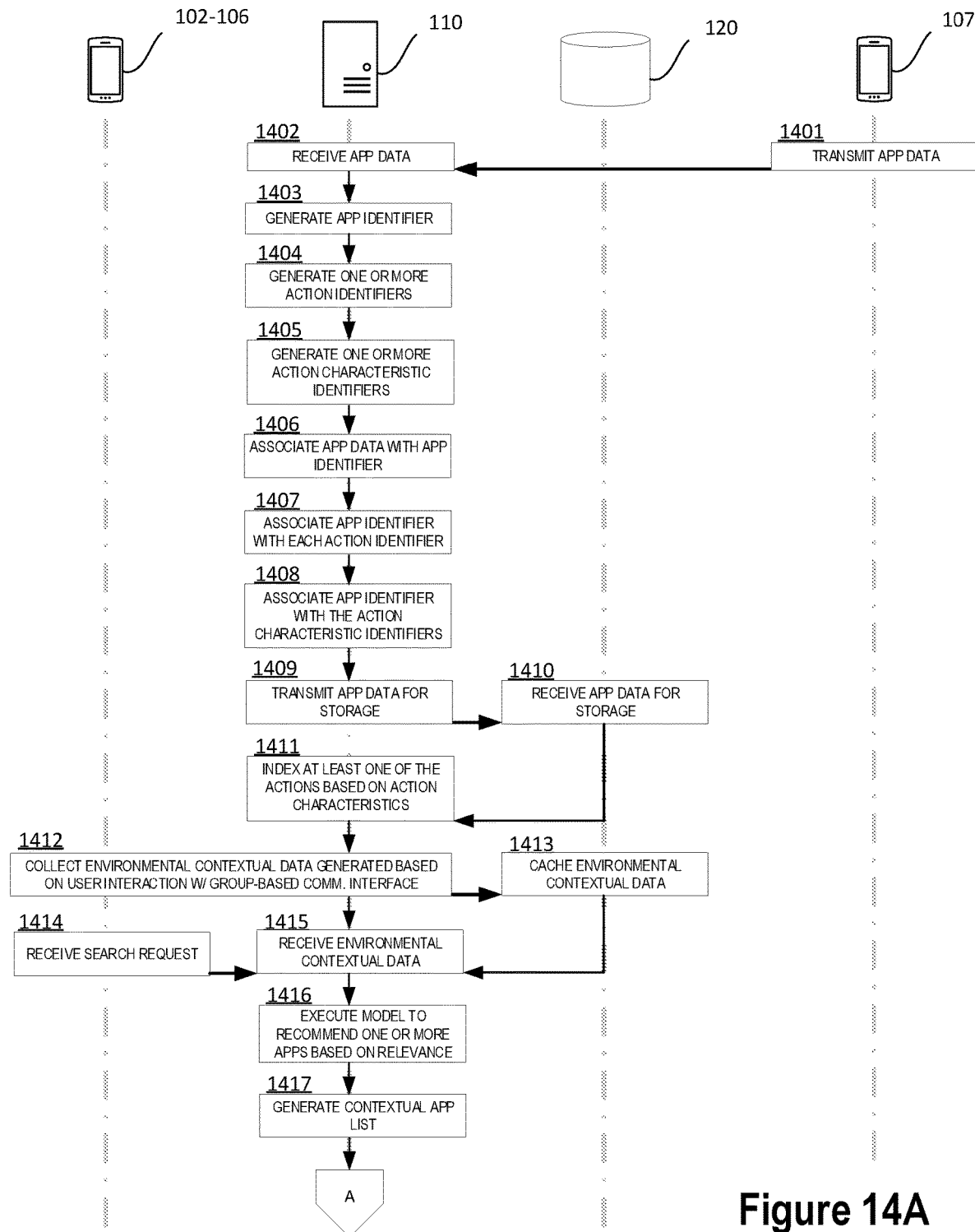
FIGS. 14A-14C illustrate a lane diagram showing functionality of various components in accordance with various examples.

As shown at Blocks 1401 and 1402 in FIG. 14A, a developer client device associated with a developer user associated with an application system 112-116 may receive application data generated as user input at the client device 107 via an interactive developer interface, as described herein, and transmit the application data to the group-based communication server. The application data may comprise processing action data corresponding to one or more processing actions executable by the corresponding application 112-116 of a plurality of applications implemented within the group-based communication system 118. In various examples, each processing action is defined by a plurality of processing action characteristics.

As shown at Block 1403, the group-based communication server 110 may generate an application identifier associated with the application 112-116. In various examples, an application identifier may comprise one or more items of data by which an application may be uniquely identified within the group-based communication system 118. Further, the group-based communication server 110 may generate one or more processing action identifiers, each respectively associated with a processing action of the one or more processing actions and the application identifier associated with the application 112-116, as shown at Block 1404. In various examples, a processing action identifier may comprise one or more items of data by which a processing action may be uniquely identified within the group-based communication system 118 (e.g., a processing action name, and/or other identifying string, as described herein). Further, the group-based communication server 110 may generate one or more processing action characteristic identifiers, each associated with a processing action characteristic and a processing action identifier associated with a corresponding processing action, as shown at Block 1405. In various examples, a corresponding processing action comprises a processing action of the one or more processing actions that is defined at least in part by the processing action characteristic. For example, each processing action may be defined by a plurality of processing action characteristics comprising an application identifier and a processing action identifier.

As shown at Blocks 1406 and 1407, the group-based communication server 110 may associate the application data received from the client device 107 with application identifier and, further, associate the application identifier with each of the processing action identifiers generated at Block 1404 such that the application data comprises each of the processing action identifiers. Further, as shown at Block 1408, the group-based communication server 110 may associate the application identifier with each of the one or more processing action characteristic identifiers generated at Block 1405, such that the application data comprises each of the processing action characteristic identifiers.

As shown at Blocks 1409 and 1410, the group-based communication server 110 may transmit the application data associated with the application identifier and comprising each of the one or more processing action identifiers and each of the one or more processing action characteristic identifiers to an application table for a group within the group-based communication repository 120 for storage. As described herein, an application table may identify each of the applications available for a user within the group-based communication system 118. In some examples, the application table may identify one or more applications available for a user within a group-based communication system 118. In some examples, the application table may include a processing action table and/or one or more processing action characteristics (e.g., included in a processing action characteristic table).

In various examples, the processing action table may identify one or more processing actions available for a user. The identified processing actions within processing action tables may be updated under various circumstances, such as when new processing actions are installed/uninstalled and/or otherwise made available/unavailable to a user. As noted herein, contextual processing action lists of processing actions recommended to a particular user may encompass a subset of all those processing actions listed within a processing action table for a particular user.

In some examples, the processing action characteristic table may identify one or more processing action characteristics associated with a processing action that is available to a user. In some examples, each processing action may be defined by a plurality of processing action characteristics. In some examples, the group-based communication system 118 may be configured to recommend one or more processing action characteristics to a user, such as in a contextual list (e.g., contextual processing action characteristic list). In such examples, the recommended processing action characteristic(s) may include a subset of the processing action characteristics associated with the processing action characteristic table. In some examples, the group-based communication system 118 may be configured to recommend one or more applications and/or processing actions to a user, such as in a contextual list (e.g., contextual applications list, contextual processing action list). In such examples, the recommended application and/or processing action may include a subset of the applications and/or processing actions available to a user via the group-based communication system 118.

In various examples, application data may be stored individually for various groups, and accordingly the application data may be stored in an application table associated with the particular group, such that client devices 102-106 associated with the particular group have access to the stored application data (and accordingly the application data associated with the one or more processing action identifiers). For example, when providing updates to application functionality provided by the application system 112-116, updates are disseminated and stored via each application table such that the updated application data is available to individual groups. In some examples, updates may be disseminated to individual application tables only upon approval from an administrator associated with the particular group and application table. Similarly, when introducing a new processing action associated with the application identifier, the application data associated with the new processing action is disseminated to all application tables (e.g., processing action tables) having application data associated with the particular application system 112-116.

As shown at Block 1411, the group-based communication server 110 may index at least one of the one or more processing actions within the application table for the group based at least in part on processing action characteristics. In various examples, the at least one of the one or more processing actions may be indexed in order to facilitate various facets of searching (i.e. search queries that return results from the group-based communication repository 120 (e.g., the application table)).

As shown at Block 1412, environmental contextual data may be generated and/or collected at least in part by the group-based communication system 118 (e.g., the group-based communication server 110) and/or the client device 102-106. As described herein, environmental contextual data is indicative of a user's interaction with a group-based communication system 118 at and/or before the time the user requests execution of a processing action. In various examples, environmental contextual data is generated and/or collected based at least in part on data utilized to generate a group-based communication interface to be presented to a user via a client device 102-106. The environmental contextual data encompasses current environmental contextual data indicative of a current display provided to a user via a client device (e.g., embodied as an active channel identifier stored as at least a portion of the environmental contextual data for a particular user and/or client device), and/or prior environmental contextual data indicative of immediately prior displays provided to the user (e.g., that a user navigated through to reach the current display, which may be embodied as one or more prior channel identifiers (and/or associated time stamps) stored as at least a portion of the environmental contextual data for a particular user and/or client device). Moreover, as noted, the environmental contextual data may be stored in a cache memory storage area (associated with a group-based communication repository 120 in communication with the group-based communication servers 110 as reflected at Block 1413 of FIG. 14A; or embodied as a memory storage area of the client device 102-106), such that the environmental contextual data may reflect both current environmental contextual data and prior environmental contextual data.

As shown at Block 1414, the client device 102-106 may receive a user input comprising a search request. The user input may be provided as a user selecting a particular user interface element utilized to initialize a processing action menu. As noted above, some examples may comprise a plurality of user interface elements within the group-based communication interface, each corresponding to a different type of processing action. Alternatively, in various examples, the user input received at the client device 102-106 may comprise an at least partial search query entered at a search element rendered within the group-based communication interface.

Responsive to receiving the search request, the process proceeds to Block 1415, at which time the environmental contextual data collected and stored for a client device (e.g., the user) at the time the search request is received is passed to the group-based communication server 110, wherein at least a portion of the environmental contextual data received from the client device 102-106 may be generated based at least in part on interactions of the client device 102-106 with the group-based communication system 118 during a current connection session. For example, environmental contextual data may comprise user input embodied as an at least partial search query entered into a search element rendered within the group-based communication interface. As shown at Block 1415, the user input indicative of the search request may be provided to the group-based communication server 110, which may retrieve cached environmental data relevant to the search request (e.g., from the group-based communication repository 120 or from a storage area associated with the client device 102-106).

As shown at Block 1416, the group-based communication server 110 may generate relevance scores for each of a plurality of applications identified within the application table based at least in part on the environmental contextual data generated for the client device. In various examples, the group-based communication server may utilize one or more models and/or algorithms generated via machine learning and/or artificial intelligence based at least in part on training data to determine (and/or generate) one or more recommended applications (e.g., application identifiers) for presentation to the user. The training data in some examples comprises sets of training data, wherein each set of training data comprises environmental contextual data (e.g., active channel identifiers; prior channel identifiers (and their respective order of presentation to the user); active group identifiers; time stamps; and/or the like) presented when a processing action was requested, and the processing action(s) ultimately selected by the user (and the order of processing actions selected, if multiple processing actions are selected). Training data may be group-specific (or other subset of user-specific) and may be utilized to generate models and/or algorithms specific to a particular group. Moreover, the training data as well as the resulting models and/or algorithms may be stored in a memory storage area accessible to the group-based communication server 110, such that the group-based communication server may quickly access and apply the stored models and/or algorithms based on the environmental contextual data retrieved for either the at least partial search query or the particular requested processing action.

In examples in which one or more applications are determined to be recommended, the group-based communication server 110 may utilize training data to determine one or more user interactions with the group-based communication system 118 (as well as their respective order of interaction) initiated by a user, as well as the contextual data associated therewith.

As indicated at Block 1417, once recommended applications are determined, the group-based communication server 110 generates a contextual application list of one or more of the plurality of applications to be presented to the user. The contextual application list may include at least a subset (or all) of the applications listed within an application table identifying applications that are available to a user under particular circumstances. In some examples, the contextual application list may include a number of recommended applications (e.g., the most-highly recommended applications) and may end with an option for searching for other applications that may not be listed within the contextual application listing. The number of recommended applications may be pre-defined (e.g., 5 processing actions, 5 processing action characteristics, 5 applications) or may be determined based on contextual data associated with the user interaction with the group-based communication system. In some examples, the number of applications may be determined based on one or more display criteria. In some examples, the display criteria may be determined based at least in part on environmental contextual data.

In some examples, a contextual list may be generated based at least in part on data stored at an individual client device and/or data stored in a group-based communication repository. Moreover, the applications (and/or processing actions, processing action characteristics associated therewith) presented to a user within a contextual list may be organized in accordance with one or more suggestion algorithms such that a most-suggested/recommended item (e.g., processing action, processing action characteristic, application) is presented at a top of the contextual list, and other alternative items may be presented lower (e.g., reflecting a lower priority) within the contextual list. For example, the items displayed within the contextual list may include items to have the highest relevance scores based on a predictive textual analysis executed by a stored model and/or algorithm (e.g., such that the environmental contextual data comprises user input at a search interface of the group-based communication interface).

Figure 14B:
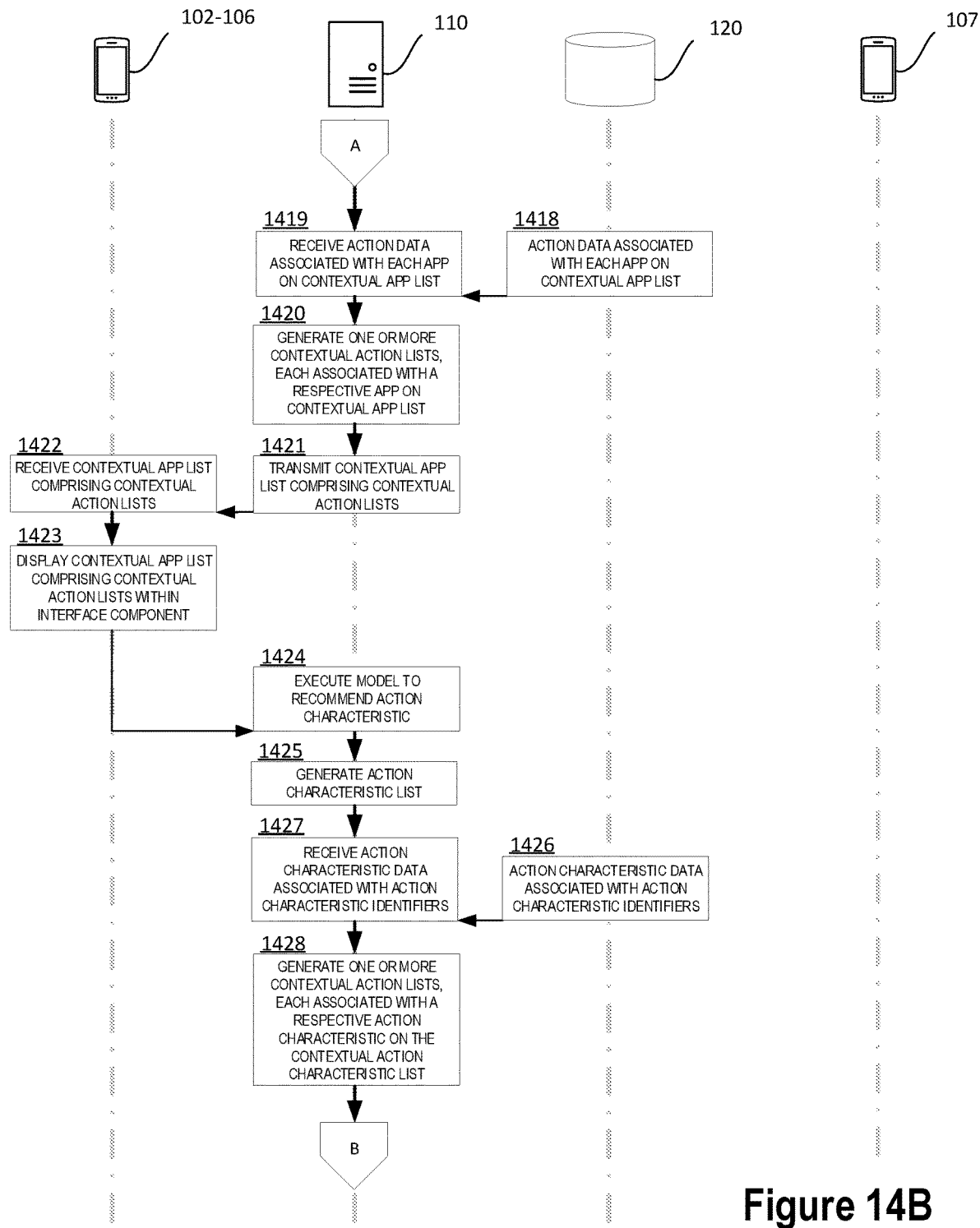
Figure 14C:
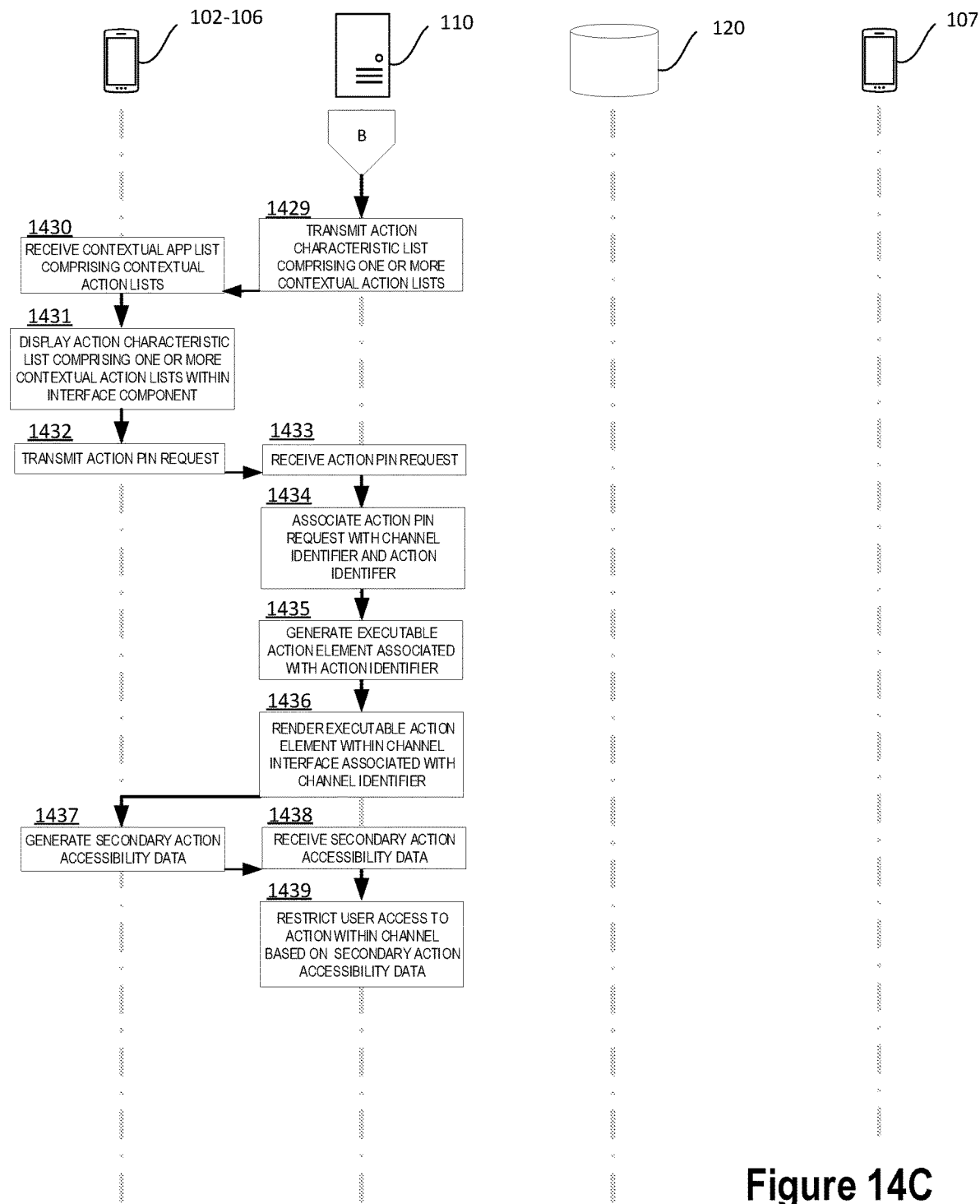

With respect to Blocks 1418 and 1419 in FIG. 14B, the group-based communication server 110 may retrieve processing action data associated with each of the processing action identifiers associated with each of the one or more of the plurality of applications. As shown at Block 1420, the group-based communication server 110 may generate one or more contextual processing action lists based at least in part on environmental contextual data, each of the one or more contextual processing action lists corresponding to a respective application of the contextual application list generated at Block 1417.

As shown at Blocks 1421, 1422, and 1423 the group-based communication server 110 may transmit the contextual application list of the one or more of the plurality of applications to the client device 102-106 for presentation via a group-based communication interface, wherein the contextual application list further comprises each of the one or more contextual processing action lists. In various examples, each of the one or more contextual processing action lists comprises one or more processing actions associated with one or more processing action identifiers, each of the one or more processing action identifiers being associated with an application of one or more of the plurality of applications. For example, the one or more contextual processing action lists may comprise a single recommended application (e.g., application identifier) rendered within an interface element, with the corresponding contextual processing action list displayed proximate the application identifier. In such a circumstance, the group-based communication server 110 may provide a user searching for an application with one or more recommended processing actions associated therewith based at least in part on environmental contextual data.

In various examples, the application table may comprise a processing action characteristic table identifying each of the plurality of processing action characteristics of each plurality of processing action characteristics defining each of the one or more processing actions. In such a circumstance, similar to the process discussed above at Block 1416, the group-based communication server 110 may generate relevance scores for each of one or more processing action characteristics identified within the processing action characteristic table based at least in part on the environmental contextual data generated for the client device 102-106, as shown at Block 1424.

As indicated at Block 1425, once recommended processing action characteristics are determined, the group-based communication server 110 may generate a contextual processing action characteristic list of one or more of the plurality of processing action characteristics to be presented to the user. The contextual processing action characteristic list may comprise a defined number of recommended processing action characteristics (e.g., the most-highly recommended processing action characteristics) and may end with an option for searching for other processing action characteristics that may not be listed within the contextual processing action characteristic listing. The contextual processing action characteristic list may include a subset (or all) of the processing action characteristics listed within a processing action characteristic table identifying each of the processing action characteristics associated the processing actions available to a user under particular circumstances. The contextual processing action characteristic list may comprise a listing of processing action characteristics associated with either one or more processing actions performed by a single application system or a plurality of processing actions respectively performed by a plurality of application systems. In some examples, the one or more processing action characteristics listed in a contextual processing action characteristic list may each be associated with a common processing action identifier. In some examples, the contextual processing action characteristic list of processing action characteristics may exclude certain processing action characteristics associated with one or more processing actions to the user.

With respect to Blocks 1426 and 1427, the group-based communication server 110 may retrieve processing action characteristic data associated with each of the processing action characteristic identifiers associated with each of the one or more processing action characteristics. As shown at Block 1428, the group-based communication server 110 may, based at least on the environmental contextual data, generate one or more contextual processing action lists of one or more processing actions associated with a processing action characteristic identifier associated with the one or more processing action characteristics of the contextual processing action characteristic list generated at Block 1420. A contextual processing action list may include a listing of processing actions performed by one or more application systems (e.g., a single application system, multiple application systems, etc.). In some examples, the one or more processing actions listed in a contextual processing action list may each be associated with a common processing action characteristic identifier and/or a common application identifier. In some examples, the contextual processing action list of processing actions may exclude certain processing actions to the user, such that the contextual processing action list of processing actions includes a subset of all of the processing actions available to a user.

In various examples, each of the one or more contextual processing action lists may respectively correspond to the at least one of the one or more of processing action characteristics of the contextual processing action characteristics list. As shown at Blocks 1429, 1430, and 1431 in FIG. 14C, the group-based communication server 110 may transmit the contextual processing action characteristic list and the corresponding one or more contextual processing action lists to the client device 102 106 for presentation via a group-based communication interface. In various examples, each processing action of the one or more contextual processing action lists is associated with an application of the plurality of applications. For example, the contextual processing action characteristic list may comprise a single recommended processing action characteristic (e.g., processing action characteristic identifier) rendered within an interface element, with the contextual processing action list corresponding thereto being displayed proximate the processing action characteristic identifier. In such a circumstance, the group-based communication server 110 may provide a user searching for a processing action characteristic with one or more recommended processing actions associated therewith based at least in part on environmental contextual data.

As shown at Blocks 1432 and 1433, the client device 102-106 may receive user input at a group-based communication interface embodied as a processing action pin request and transfer the processing action pin request to the group-based communication server 110. In various examples, a processing action pin request may comprise a collection of data transmitted by a client device 102-106 to the group-based communication server 110 that is representative of a user's request to pin an executable processing action element to a group-based communication channel interface, such that the executable processing action element may be accessible to within the group-based communication channel interface to each user with access rights to the group-based communication channel. A processing pin request may be associated with a client device, a user identifier of user with access rights to the group-based communication channel, a group-based communication channel identifier, and/or a processing action. In various examples, a processing action pin request may be represented via a temporary code that notifies at least one entity of the group-based communication system 118 that a user has made the request.

In various examples, a processing action pin request may be generated in response to a user interaction with a group-based communication interface presented on a display screen of a client device 102-106 associated with the user identifier. A user causes the client device to generate a processing action pin request by interacting with, for example, a specific pin-processing-action actuator button that forms part of the group-based communication interface. The processing action pin request may be associated with a user identifier associated with the client device 102-106, a group-based communication channel identifier, and a processing action associated with an application 112-116. The user identifier may be associated with access rights to a group-based communication channel associated with the group-based communication channel identifier. In various embodiment, the group-based communication server 110 may receive the processing action pin request from client devices associated with a channel admin identifier associated with the group-based communication channel identifier. Further, in various examples, the processing action pin request may be further associated with a processing action identifier and an application identifier associated with the application 112-116.

As shown at Block 1434, the group-based communication server 110 may associate the group-based communication channel identifier and the processing action identifier associated with the processing action pin request. Responsive to associating the processing action pin request to the group-based communication channel identifier, the group-based communication server 110 may generate an executable processing action element corresponding to the processing action identifier associated with the processing action pin request and render the executable processing action element for display within the group-based communication channel interface associated with the group-based communication channel identifier, as shown at Blocks 1435 and 1436. In various examples, wherein an executable processing action element is pinned at a group-based communication channel interface, the executable processing action element may be accessible to each of the users associated with access rights to the group-based communication channel. Similarly, where an executable processing action element is pinned at a group-based communication channel interface, a corresponding executable processing action element associated with the same processing action identifier may be pinned to one or more action lists accessible via the group-based communication channel interface (e.g., global action list, channel action list, message action lists).

As shown at Blocks 1437 and 1438, the client device 102-106 associated with the processing action pin request may generate secondary processing action accessibility data associated with the group-based communication channel identifier and the processing action identifier based on user input received via the group-based communication interface and transmit the secondary processing action accessibility data to the group-based communication server 110. The secondary processing action accessibility data may include one or more executable instructions associated with a processing action configured to at least partially restrict access to the processing action within a designated part of the group-based communication system (e.g., a group-based communication channel). For example, secondary processing action accessibility data may be generated based at least in part on user input received from a user who pins a processing application, such that the user input defines a request to selectively limit one of the processing action parameters associated with the processing action to be the group-based communication channel identifier associated with the group-based communication channel. In some examples, for example, secondary processing action accessibility data may define instructions received from an owner of a group-based communication channel which prevent a user from accessing a particular processing action from within the group-based communication channel.

As indicated at Block 1439, the group-based communication server 110 may restrict access to a particular processing action at one or more locations within the group-based communication platform 119 based on secondary processing action accessibility data. Secondary processing action accessibility data may comprise one or more executable instructions configured to at least partially restrict access to a particular processing action when initialized from a designated part of the group-based communication system (e.g., within a group-based communication channel). For example, secondary processing action accessibility data may be generated based at least in part on user input received from a client device associated with a processing action pin request associated with a group-based communication channel. The secondary processing action accessibility data may define a request by the user to selectively limit a processing action parameters associated with the processing action to be the group-based communication channel identifier associated with the group-based communication channel. Further, for example, secondary processing action accessibility data may define instructions received from an owner (e.g., channel admin) of a group-based communication channel that may prevent those users associated with the group-based communication channel from initializing a particular processing action via the group-based communication channel. In various examples, the group-based communication server 110 may be configured to transmit at least a portion of the secondary action accessibility data associated with an application and/or a processing action to a group-based communication repository 120 for storage.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
 receiving, from a client device of a user and via an interface of a communication platform, an input associated with a third-party application;
 identifying application data associated with the third-party application;
 generating an application setting interface associated with the third-party application based at least in part on the application data, the application setting interface comprising a settings pane, the settings pane comprising an element configured to customize access parameters for a plurality of users of the communication platform;
 receiving, from the client device and in response to an indication of selection of the element, a request to prevent the plurality of users from accessing a particular action provided by the third-party application; and
 based at least in part on the request, modifying a setting associated with the third-party application to prevent the plurality of users from accessing the particular action, while causing the third-party application to remain accessible to the plurality of users.

2. The method of claim 1, wherein the settings pane comprises one or more interactive settings pane inputs configured based at least in part on user input received from the client device.

3. The method of claim 1, wherein a server associated with the communication platform generates at least a portion of the settings pane associated with the third-party application using one or more block kits.

4. The method of claim 1, wherein the settings pane comprises a block kit configuration comprising one or more blocks that are collectively configured according to a customizable block configuration.

5. The method of claim 4, wherein the customizable block configuration is based at least in part on user input generated from a developer client device associated with a developer user identifier associated with a developer user associated with the third-party application.

6. The method of claim 1, further comprising:
 identifying one or more third-party application settings associated with the third-party application and a user account of the user;
 identifying a subset of the one or more third-party application settings that are configured to be modified via the communication platform; and
 causing display, via the application setting interface, of the subset of the one or more third-party application settings.

7. The method of claim 6, further comprising:
 receiving, from the client device and via the application setting interface, an update to a third-party application setting of the subset of the one or more third-party application settings;
 generating, based at least in part on the update, a modified third-party application setting by modifying the third-party application setting associated with the third-party application and the user account; and
 causing display, via the application setting interface, of the modified third-party application setting.

8. The method of claim 1, wherein:
 the application setting interface further comprises a user engagement pane configured to display the application data received from an application system associated with the third-party application, and
 the user engagement pane is configured to reflect execution of one or more user engagement pane instructions associated with the third-party application, the one or more user engagement pane instructions corresponding to one or more functionalities of the third-party application.

9. The method of claim 1, wherein the indication of selection is a first indication of selection and the element is a first element, the method further comprising:
 receiving, from the client device a second indication of selection of a second element of one or more elements displayed within the application setting interface;
 responsive to receiving the second indication of the selection, retrieving processing action data associated with a processing action corresponding to the element;

generating a processing action execution data packet comprising processing action routing data and payload data, the processing action routing data being generated based at least in part on the processing action data and identifying:

the processing action to be performed by an application system associated with the third-party application; and a client token identifying the client device requesting the processing action routing data and the payload data; and providing the processing action execution data packet to the application system associated with the third-party application to enable the application system to execute the processing action based at least in part on the payload data.

10. The method of claim 1, wherein the request to prevent access is received from within a communication channel of the communication platform.

11. A system comprising:

one or more processors; and one or more non-transitory computer readable media storing instructions that, when executed, cause the system to:

receive, from a client device of a user and via an interface of a communication platform, an input associated with a third-party application;

identify application data associated with the third-party application;

generate an application setting interface associated with the third-party application based at least in part on the application data, the application setting interface comprising a settings pane, the settings pane comprising an element configured to customize access parameters for a plurality of users of the communication platform;

receive, from the client device and in response to an indication of selection of the element, a request to prevent the plurality of users from accessing a particular action provided by the third-party application; and based at least in part on the request, modify a setting associated with the third-party application to prevent the plurality of users from accessing the particular action, while causing the third-party application to remain accessible to the plurality of users.

12. The system of claim 11, wherein the instructions further cause the system to:

identify contextual data associated with at least one previous user interaction by the user with the third-party application via the communication platform, wherein the application setting interface comprises the contextual data associated with the at least one previous user interaction.

13. The system of claim 11, wherein the input comprises a triggering event associated with the third-party application.

14. The system of claim 11, wherein the instructions further cause the system to:

identify one or more third-party application settings associated with the third-party application and a user account of the user;

identify a subset of the one or more third-party application settings that are configured to be modified via the communication platform; and cause display, via the application setting interface, of the subset of the one or more third-party application settings.

15. The system of claim 14, wherein the instructions further cause the system to:

receive, from the client device and via the application setting interface, an update to a third-party application setting of the subset of the one or more third-party application settings;

generate, based at least in part on the update, a modified third-party application setting by modifying the third-party application setting associated with the third-party application and the user account; and cause display, via the application setting interface, of the modified third-party application setting.

16. The system of claim 11, wherein the indication of selection is a first indication of selection, and the element is a first element, wherein the instructions further cause the system to:

receive, from the client device, a second indication of selection of a second element of one or more elements displayed within the application setting interface;

responsive to receiving the second indication of the selection, retrieve processing action data associated with a processing action corresponding to the second element;

generate a processing action execution data packet comprising processing action routing data and payload data, the processing action routing data being generated based at least in part on the processing action data and identifying:

the processing action to be performed by an application system associated with the third-party application; and a client token identifying the client device requesting the processing action routing data and the payload data; and provide the processing action execution data packet to the application system to enable the application system to execute the processing action based at least in part on the payload data.

17. The system of claim 11, wherein the instructions further cause the system to:

receive, from the client device, a request to associate a processing action associated with the third-party application with the application setting interface, wherein at least one indicator selectable to initialize an action associated with the third-party application comprises an indicator associated with the processing action.

18. The system of claim 11, wherein the request to prevent access is received within a communication channel of the communication platform.

19. One or more non-transitory computer readable media storing instructions that, when executed, cause one or more processors to perform operations comprising:

receiving, from a client device of a user and via an interface of a communication platform, an input associated with a third-party application;

identifying application data associated with the third-party application;

generating an application setting interface associated with the third-party application based at least in part on the application data, the application setting interface comprising a settings pane, the settings pane comprising an element configured to customize access parameters for a plurality of users of the communication platform;

receiving, from the client device and in response to an indication of selection of the element, a request to prevent the plurality of users from accessing a particular action provided by the third-party application; and based at least in part on the request, modifying a setting associated with the third-party application to prevent the plurality of users from accessing the particular action, while causing the third-party application to remain accessible to the plurality of users.

20. The one or more non-transitory computer readable media of claim 19, the operations further comprising:

identifying contextual data associated with at least one previous user interaction by the user with the third-party application via the communication platform, wherein the application setting interface comprises the contextual data associated with the at least one previous user interaction.

* * * * *